(12) United States Patent
Rao et al.

(10) Patent No.: US 8,935,597 B2
(45) Date of Patent: Jan. 13, 2015

(54) RECEIVERS, CIRCUITS, AND METHODS TO IMPROVE GNSS TIME-TO-FIX AND OTHER PERFORMANCES

(71) Applicant: Texas Instruments Incorporated, Dallas, TX (US)

(72) Inventors: Sandeep Rao, Karnataka (IN); Jawaharlal Tangudu, Karnataka (IN); Karthik Ramasubramanian, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/860,907

(22) Filed: Apr. 11, 2013

(65) Prior Publication Data

US 2013/0227377 A1  Aug. 29, 2013

Related U.S. Application Data

(62) Division of application No. 12/726,611, filed on Mar. 18, 2010, now Pat. No. 8,441,398.

(30) Foreign Application Priority Data

Feb. 3, 2010  (IN) .............................. 274/CHE/2010

(51) Int. Cl.
*H03M 13/00* (2006.01)
*G06F 11/10* (2006.01)
*G01S 19/27* (2010.01)

(52) U.S. Cl.
CPC ................. *G06F 11/10* (2013.01); *G01S 19/27* (2013.01)
USPC ......................................................... 714/776

(58) Field of Classification Search
CPC ... H04L 1/0057; H04L 1/0061; H04L 1/0041; H04L 1/0083; H04L 1/0072
USPC ......................................................... 714/776
See application file for complete search history.

(56) References Cited

U.S. PATENT DOCUMENTS

| | | | | |
|---|---|---|---|---|
| 4,499,553 | A * | 2/1985 | Dickinson et al. | 715/257 |
| 5,210,518 | A * | 5/1993 | Graham et al. | 375/351 |
| 5,517,508 | A * | 5/1996 | Scott | 714/776 |
| 7,365,681 | B2 * | 4/2008 | Yu | 342/357.63 |
| 8,046,671 | B2 * | 10/2011 | Farkas | 714/821 |
| 2007/0216540 | A1 * | 9/2007 | Riley et al. | 340/903 |
| 2008/0263174 | A1 * | 10/2008 | Manson et al. | 709/217 |
| 2010/0030553 | A1 * | 2/2010 | Ball | 704/9 |

* cited by examiner

*Primary Examiner* — Albert DeCady
*Assistant Examiner* — Enam Ahmed
(74) *Attorney, Agent, or Firm* — Dawn Jos; John R. Pessetto; Frederick J. Telecky, Jr.

(57) ABSTRACT

An electronic circuit (2250) for a satellite receiver (100, 2200). The electronic circuit (2250) includes a correlator circuit (2310) operable to supply a data signal including ephemeris data and a subsequent satellite time datum, and a data processor (2370, 2380) operable to infer satellite time $T_S$ from as few as one of the ephemeris data prior to the satellite time datum. Other circuits, devices, receivers, systems, processes of operation and processes of manufacture are also disclosed.

6 Claims, 20 Drawing Sheets

RECEIVERS, CIRCUITS, AND METHODS TO IMPROVE GNSS TIME-TO-FIX AND OTHER PERFORMANCES

CROSS-REFERENCES TO RELATED APPLICATIONS

This application is a division of U.S. patent application Ser. No. 12/726,611, entitled "RECEIVERS, CIRCUITS, AND METHODS TO IMPROVE GNSS TIME-TO-FIX AND OTHER PERFORMANCES," filed Mar. 18, 2010, which is hereby incorporated by reference in its entirety for all purposes and which claims priority under the Paris Convention and 35 U.S.C. 119 and all other applicable law to India Patent Application 274/CHE/2010 entitled "Processes and Apparatus to Improve GNSS Time-To-Fix Receiver Performance", filed Feb. 3, 2010, which is also incorporated herein by reference in its entirety.

US published patent application 20090054075 Feb. 26, 2009, "Satellite (GPS) Assisted Clock Apparatus, Circuits, Systems and Processes for Cellular Terminals on Asynchronous Networks," of Ser. No. 11/844,006, filed Aug. 3, 2007, is incorporated by reference herein in its entirety.

US published patent application 20090168843 dated Jul. 2, 2009 of U.S. Patent Application "Power-Saving Receiver Circuits, Systems and Processes" Ser. No. 12/244,060, filed Oct. 2, 2008, is incorporated herein by reference in its entirety.

U.S. Patent Application "Enhanced Cross Correlation Detection or Mitigation Circuits, Processes, Devices, Receivers and Systems" Ser. No. 12/719,965, filed Mar. 9, 2010, is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

GPS (Global Positioning System) is an earth-satellite-based electronic system for enabling GPS receivers in ships, aircraft, land vehicles and land stations to determine time and their geographic and spatial position such as in latitude, longitude, and altitude. GPS is an example of a GNSS (global navigation satellite system) and several different such systems exist. Discussion of GPS herein is without limitation to other GNSS and other analogous electronic systems as well as applicable receiver circuits in a variety of telecommunication systems.

It would be desirable to even more accurately, reliably, rapidly, conveniently and economically maintain accurate time, position, velocity, and/or acceleration estimation in a communication device having a satellite positioning receiver (SPR) or other receiver and its clock source.

Current GPS (Global Positioning System) receivers and other positioning and communications receivers are expected to operate in high dynamic range (e.g., a range of 35 db or so) of receive powers from different satellites and other transmitting sources. Even when received signals are strong the wait time to obtain time information (called a time to fix, total time to first fix TTFF, or otherwise) can be undesirably lengthy. Moreover, some positioning receivers such as GPS receivers need to operate in indoor environments and/or for urban canyon environments and otherwise where the dynamic range of receive satellite signal powers is high, typically 25-30 db or more. These challenging environments exacerbate the problems.

A GPS receiver tracks signals from multiple satellites each of which is transmitting GPS navigation data. The receiver decodes (a) the ephemeris and (b) the Satellite Time from the satellite signals, before computing the receiver position. However, ephemeris is sent only once every 30 seconds in GPS, which problematic for getting faster fixes. Predicted ephemeris (EPT) may be available and in such cases a key factor affecting the time to fix and the position accuracy is the time taken to find the satellite time. The satellite time is transmitted every six (6) seconds, which is still a long time from the point of view of a user.

Further solutions and alternative solutions are desirable to tackle accuracy of time and position obtained, processor real estate and processing burden, as well as power and energy dissipation in lengthy GNSS processing operations, and other problems.

SUMMARY OF THE INVENTION

Generally, a form of the invention involves an electronic circuit for a satellite receiver. The electronic circuit includes a correlator circuit operable to supply a data signal including ephemeris data and a subsequent satellite time datum, and a data processor operable to infer satellite time from as few as one of the ephemeris data prior to the satellite time datum.

Generally, a process form of the invention is for an electronic circuit and for satellite signals having ephemeris data and a subsequent satellite time datum, and the process includes inferring satellite time from as few as one of the ephemeris data prior to the satellite time datum.

Generally, another process form of the invention is for an electronic circuit and for at least one received satellite signal carrying successive satellite transmission parameters according to a predetermined succession. The process includes storing predicted parameters and information defining their positions in the predetermined succession, extracting a received satellite transmission parameter from at least one received satellite signal, searching for and identifying the stored predicted parameter that is closest to matching the received satellite transmission parameter, and using that closest predicted parameter and the information defining its position in the predetermined succession to derive satellite time.

Generally, another form of the invention involves an electronic circuit for a satellite receiver. The electronic circuit includes a correlator circuit operable to acquire one or more satellite signals supplying parameters, a processor coupled to the correlator circuit, and a memory coupled to the processor and having parameter estimation software and parameter matching software accessible by the processor to determine which estimated parameter matches a received parameter.

Generally, a power management process form of the invention is for an electronic circuit for use with a satellite system sending ephemeris data and a subsequent satellite time datum. The power management process includes supplying a data signal at first including a said ephemeris datum, and operating a circuit to infer satellite time from the ephemeris datum and then perform a position fix and transition to a lower-power mode, whereby less overall energy is consumed.

Generally, a further process form of the invention is for operating an electronic circuit to supply a more-accurate satellite time based on at least one satellite signal having frames and words in frames and each word having a word duration. The process includes maintaining an approximate time, computing a word position of a received word as a function of the approximate time when the received word is received, and supplying the more-accurate satellite time as a second function of at least the word position value.

Generally, an additional process form of the invention is for an electronic circuit to determine word alignment based on at least one satellite signal having a stream of words having data bits and parity bits in each word and satisfying pre-specified parity relations. The process includes hypothesizing different word alignment possibilities parity-checking each of the word alignment possibilities until one of them satisfies parity, and determining the word alignment as being the hypothesized alignment that satisfies parity.

Generally, an additional process form of the invention is for an electronic circuit to select for an estimated parameter set a correctly-applicable estimated almanac parameter predictive of an almanac parameter transmitted by one satellite but that can pertain to another satellite, wherein satellites send words in frames. The process includes maintaining an approximate time and providing a time uncertainty of the approximate time, providing a table of almanac parameters related to word positions in a frame, some of the almanac parameters pertaining to one satellite and other almanac parameters pertaining to another satellite; establishing low and high range-end word positions whereby to specify a range of an estimated parameter set as a function of the approximate time and the time uncertainty, electronically providing an actual satellite number $S_A$ as a function of the approximate time and a word position of an almanac parameter in the range; and accessing the table of almanac parameters and writing from the table the estimated almanac parameter, having that word position in the almanac table for the satellite $S_A$, as an applicable estimated almanac parameter into the estimated parameter set.

Generally, a word-position error recovery process form of the invention is for a signal processing circuit wherein a signal carries words. The process includes initially determining an unknown word-position of a received word, and performing the word-position determining for at least one subsequent received word to determine a subsequent received word position, and if inconsistent word positions result then adopting the more-probable word position.

Generally, a mobile satellite receiver device form of the invention includes an antenna, a front end coupled to the antenna for receiving and converting satellite signals, a correlator circuit coupled to the front end and operable to supply a data signal including ephemeris data and a subsequent satellite time datum, a data processor operable to infer satellite time from as few as one of the ephemeris data prior to the satellite time datum and to compute a position fix based on the inferred satellite time, a wireless modem coupled to the data processor, and a user interface coupled to the data processor.

Other circuits, devices, receivers, systems, processes of operation and processes of manufacture are also disclosed and claimed.

Corresponding numerals or letter symbols in different Figures indicate corresponding parts except where the context indicates otherwise. A Glossary of Symbols is provided to assist the reader, but the meaning of a particular symbol in a particular portion of the description or Figure is the sense its context indicates there, if contrary to the glossary.

DETAILED DESCRIPTION OF EMBODIMENTS

Figure 1:
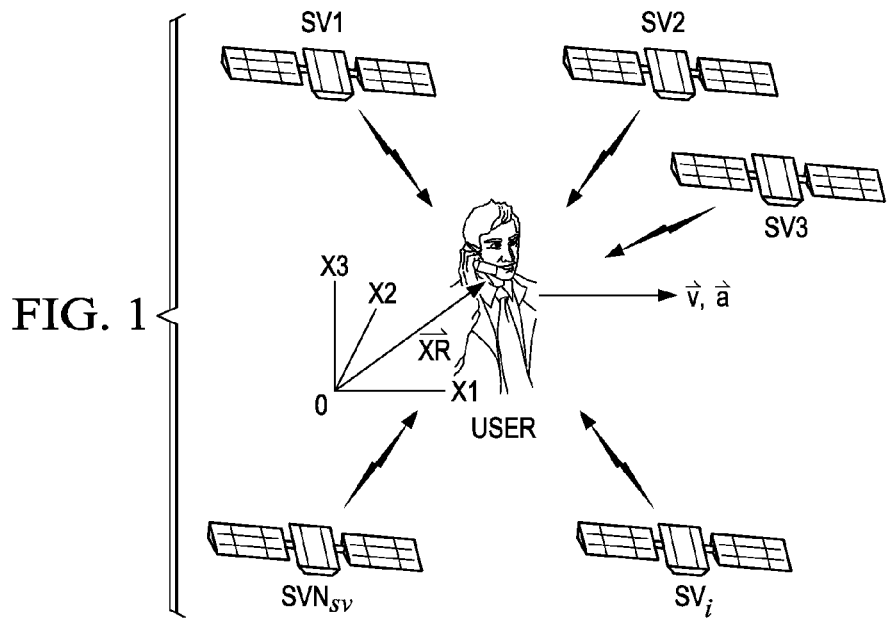
FIG. 1 is a pictorial diagram of a user with an inventive hot-fix mobile device according to other Figures herein and supported by a positioning system with satellite vehicles (SVs).

In FIG. 1 a user has a mobile device for use in a positioning system with satellite vehicles SV1-SV$_N$. The mobile device includes a receiver 100 as in FIG. 2 that searches for and tracks the satellites, recovers the transmitted information from each of them, and solves navigation equations as discussed later hereinbelow to yield the position X$_R$ of the receiver for user applications involving position, velocity and/or acceleration relative to the ground or water or at some elevation.

Figure 2:
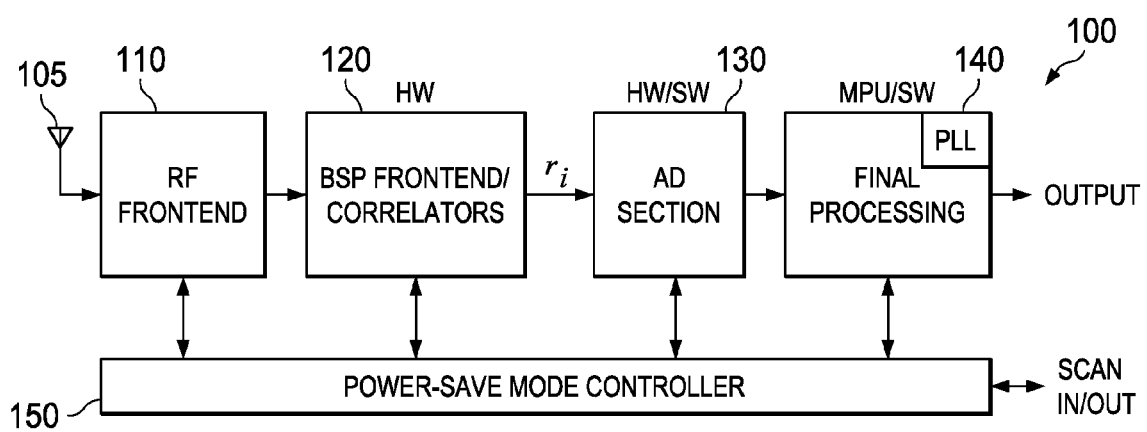
FIG. 2 is a block diagram of an inventive hot-fix positioning receiver for use in the mobile device of FIG. 1 and improved according to the inventive structures and processes depicted in the other Figures.

In FIG. 2 and the other Figures herein, accumulate-and-dump (AD) receiver circuits, systems and processes of operation and manufacture are disclosed. AD receivers accumulate an incoming signal in order to boost the signal-to-noise ratio (SNR) of the signal. Accumulate-and-dump refers to either or both coherent and noncoherent accumulation and transfer of the results in either case to a following stage or to a memory. The AD receiver is suitably used for GPS and modernized GPS reception, and code-division multiple-access (CDMA) cellular communications and other systems.

Figure 14:
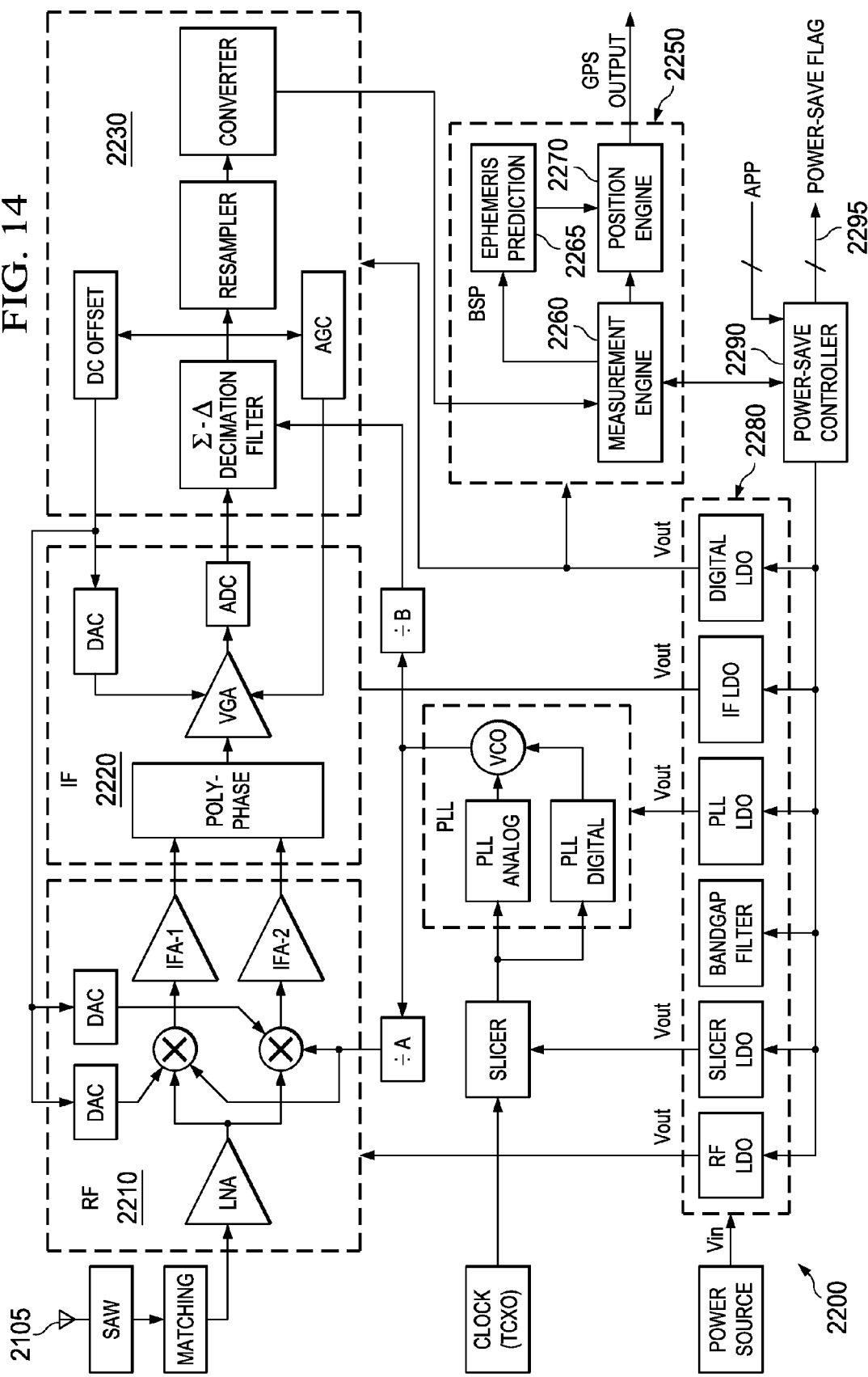
FIG. 14 is a block diagram for a front end and power management circuitry for the inventive receiver processes and structures in FIG. 2 and other Figures.

In FIG. 2, the receiver 100 converts the incoming signal to a digital baseband signal using a radio-frequency (RF) front end 110 such as in FIG. 14 and coupled to one or more antennas 105 to receive satellite signals from the satellites. RF front end 110 delivers a baseband signal in digital form to a block 120 having a baseband signal processor BSP and correlators of FIG. 15. Block 120 delivers a received signal r$_i$ to an accumulate-and-dump AD section 130 followed by a block for final processing 140 including a microprocessor MPU with software SW. A power-save mode controller 150 intelligently powers up and down the various blocks 110-140 to save energy and power. The receiver 100 has serial scan-in/out circuitry for debug and test.

One category of embodiments involves GPS navigation receivers and other GNSS receivers. GPS satellites transmit time of transmission, satellite clock correction parameters and ephemeris data. The receiver 100 is used to provide navigational data to a user. Examples of the devices include, but are not limited to, personal navigation devices, computers, laptops, palmtops, mobiles, personal digital assistants, data processing units, and computing devices.

The spread spectrum transmissions of GPS have either of two microwave carrier frequencies (both above 1 GHz). The modulation involves two pseudorandom noise PN code types—a high-rate Precision P code and a lower rate one-millisecond period C/A (Coarse/Acquisition) code. C/A is discussed here without limitation. Each PN code type has various possible orthogonal PN sequences, and a particular unique PN sequence is assigned to each satellite SV.

In FIGS. 1, 2 and 14-16, receiver 100 finds satellites by locally generating different PN sequences and electronically correlating or synchronizing them with each unique PN sequence assigned to receptions from available satellites. In the receiver processing, Doppler frequency removal (wipe-off) is performed for each satellite ahead of the correlating, so that correlation produces narrower single peaks with higher strengths. The receiver monitors for high correlations to individually receive (and distinguish) satellite signals of different satellites from each other. The information data modulated on a given received satellite signal then is demodulated to obtain the information, including the time of transmission, satellite clock correction parameters and ephemeris data.

Figure 3A:
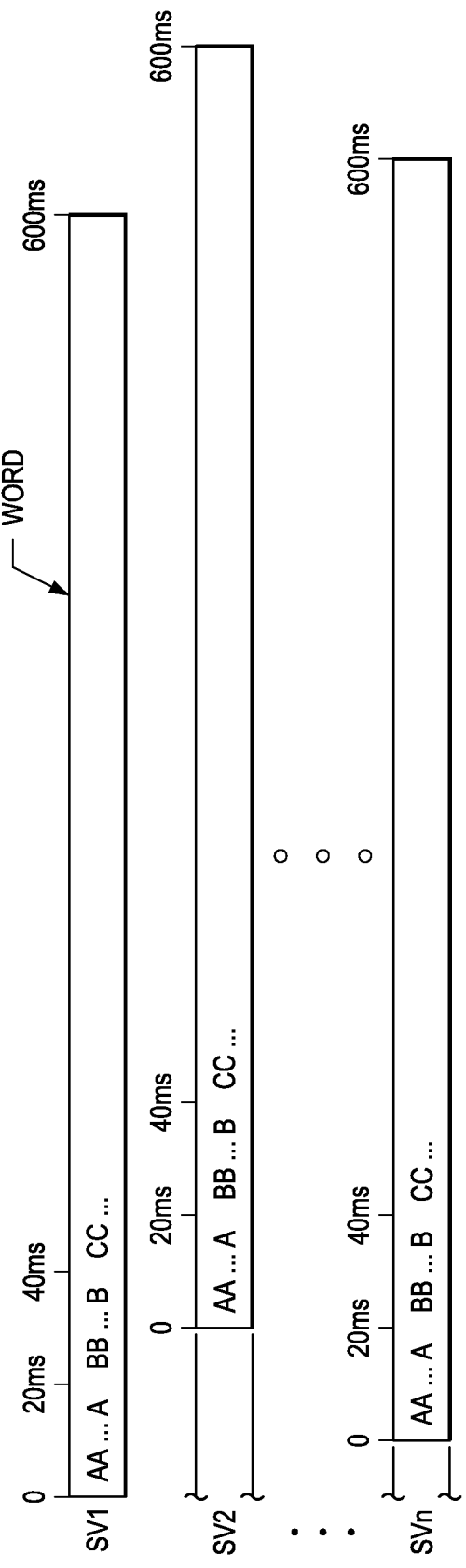
FIG. 3A is a diagram of received signal information versus time for the receiver of FIG. 2 showing one same word for different satellites including repetition of a 20 millisecond symbol A followed by repetition of another 20 millisecond symbol B with independently displaced inter-symbol bit edges as between signals from different satellites.

In FIG. 3A, this information comes modulated on the unique PN sequence from the satellite as binary phase shift keyed BPSK (+1/−1) data bits each called a symbol and lettered in FIG. 3A and repeated each millisecond for signal-enhancing correlation and accumulation in blocks 120 and 130 of the AD receiver 100. Repetition of a symbol A twenty (20) times over one 20 millisecond interval is followed by a similar repetition of another symbol B over a succeeding 20 ms interval, etc. In FIG. 3A, different satellites SV1, SV2, . . . SVn have independently or randomly displaced inter-symbol bit edges because of the different distances of the satellites from receiver 100.

For position computations for user applications involving position on and above the surface of the earth, the receiver 100 can track four or more satellites (FIG. 1), recover the transmitted information from each of them, and operate a microprocessor or other solution block to act as a Position Engine (FIG. 14) to solve navigation equations to yield the position X$_R$ of the receiver in FIG. 1. A simple example of navigation equations in three position coordinates x indexed i=1, 2, 3 that are simultaneously solved based on signals from satellites S=1, 2, 3, 4, . . . is given in rectangular coordinates by $$D_S^2 = \sum_{i=1}^{3} (x_{i_S} - x_{i_R})^2 = c_L^2((t_{RS} + e) - T_S)^2 \qquad (1)$$

In words, the equation says that the square of the distance D$_S$ from each S-indexed satellite S to the receiver is equal to the square of the product of the speed of light times the propagation time to traverse the distance. Parameters x$_{i_S}$ represent each (known) coordinate position i of satellite S communicated by or derivable from the ephemeris data. Variables x$_{iR}$ represent each (unknown) coordinate position i of the receiver itself, see X1, X2, X3 of FIG. 1.

Time T$_S$ is the time of transmission from satellite S received with the data signal and is also called satellite time. Satellite time is a parameter in Equation (1), but it is only explicitly transmitted from a satellite every six (6) seconds in GPS. So, accurately determining satellite time sooner is an important problem confronted and solved herein to achieve faster fixes. The receiver 100 maintains a receiver local time t$_{RS}$ that has a bias error e relative to the atomic time base of the GPS system, so the GPS time at the receiver is t$_{RS}$+e. Speed of light $c_L$ times the GPS time difference between the times of reception and transmission is expressed by the term $c_L((t_{RS}+e)-T_S)$ and equals the distance to the particular satellite S. For initially understanding Equation (1), let the receiver local time $t_{RS}$ and the satellite time $T_S$ be knowns and let the bias error e be an unknown. Actually herein, embodiments are provided to rapidly determine the satellite time $T_S$ so that it can be a known in Equation (1) and thereby promote fast fixes.

Figure 15:
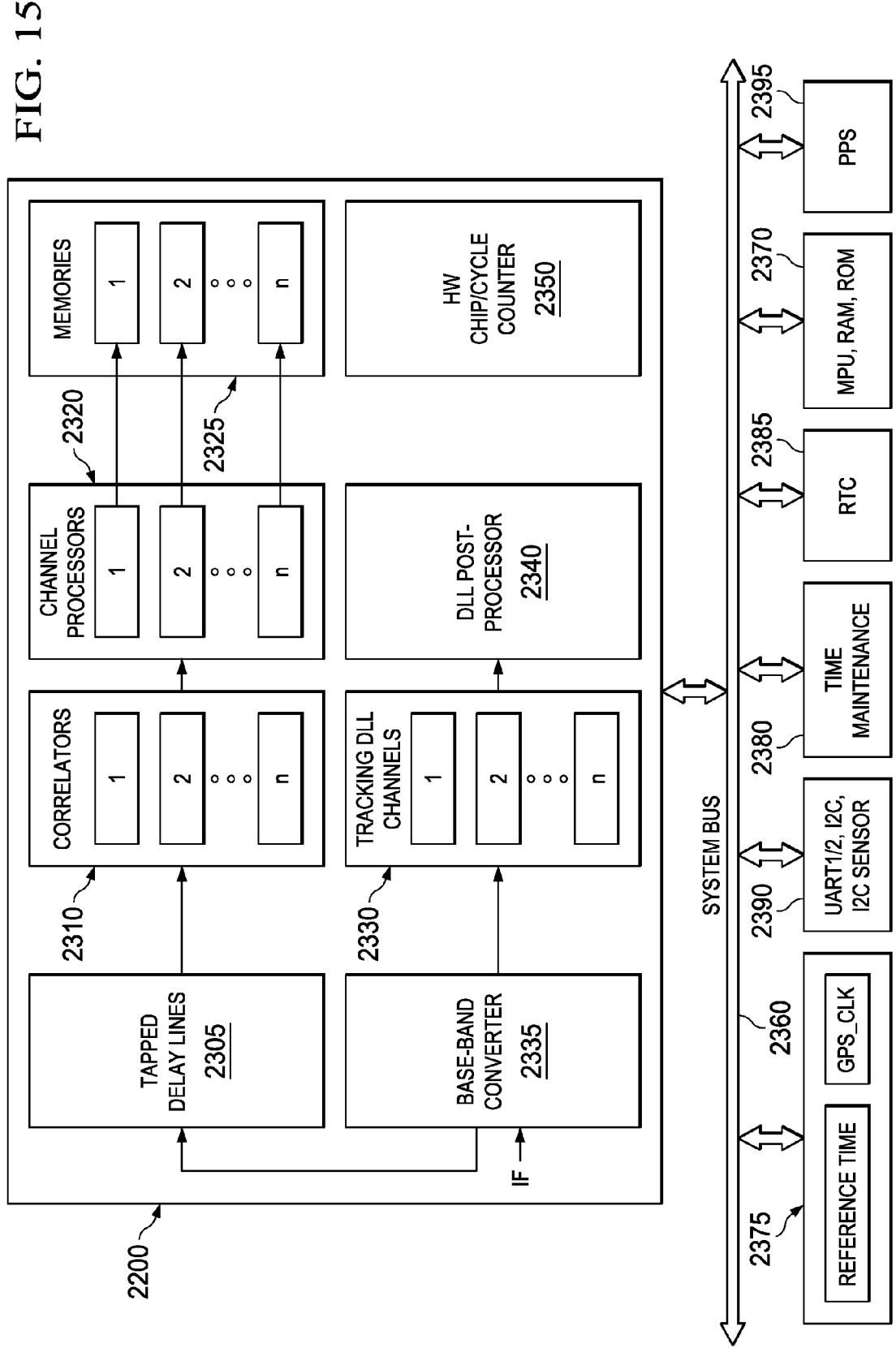
FIG. 15 is a block diagram of a portion of the positioning receiver of FIG. 2 and improved according to inventive processes and structures detailed in the other Figures.

A modulo 1 ms time difference $(t_{RS}-T_S)_{mod\ 1\ ms}$ is called the code phase or code lag and is found by operating a correlator 120 in FIGS. 2 and 15 with different hypothesized values of code lag and Doppler shift until a valid satellite correlation peak is found. However, since the code phase is modulo-one-millisecond, the determination of code phase is insufficient to determine the actual difference $(t_{RS}-T_S)$ for use in Equation (1) unless the satellite time $T_S$ is known to within less than 1 ms. And for fast fix purposes, the satellite time is not known that accurately, which is precisely one of the problems presented and solved here. Given enough information such as from four or more satellites SVj, the navigation equations (1) are solved for position coordinate unknowns $x_{iR}$ and unknown bias error e. In spherical coordinates or other coordinates, the three satellite position parameters $x_{iS}$ and the three receiver position variables $x_{iR}$ in the navigation equations are each replaced by a trio of expressions appropriately subscripted and with a summation over the applicable three coordinates in such coordinate system explicitly written out.

In a 'hot fix' process embodiment and mode of operation a key factor determining the 'time to first fix' and the 'position accuracy' is the time taken by the receiver to find Satellite Time. A significant advance in reducing the time taken to deduce the Satellite Time from the satellite navigation data is provided by embodiments herein to result in faster fixes. Fast fix performance in various different use cases and challenging reception conditions is a key care about for users and consequently for system manufacturers and integrated circuit suppliers.

In this 'hot fix' mode of operation, the predicted values of the Ephemeris parameters are available to the receiver. In other words, the receiver accesses the predicted satellite ephemeris (using ephemeris prediction software residing on the host). In such cases the receiver does not need to decode the satellite ephemeris, and instead can just determine whether a match to it exists and which word is the word for which that match occurs. Thus, some embodiments match these parameters to the data broadcast by the satellite Ephemeris. Since these parameters are broadcast by the satellite in a specific known sequence, then identifying which parameter is being currently transmitted by the satellite delivers sufficient information to derive Satellite Time $T_S$. Satellite Time is still desirably decoded by deriving it herein.

Among other aspects of various embodiments that allow them to provide dramatically enhanced fast fixes, some of the embodiments herein do any one, some or all of the operations that include:
1) Exploiting the approximate knowledge of the broadcast data to perform Parameter Estimation and similarity comparison of closeness of various predicted values of the parameters with the parameters received on the broadcast satellite data;
2) Performing 'Word Alignment' to reduce the probability of false estimation; and
3) Using 'Solve for Time' fix to narrow down the uncertainty of satellite time, not alone but as a seeding mechanism for the similarity comparison process 1) above.

The predicted ephemeris that is available to the receiver will be close but not exactly match or be the same as the true ephemeris values being broadcast by the satellite. Hence, bit matching predicted ephemeris to true received ephemeris is impeded. By contrast, some embodiments, extract the ephemeris parameter or other transmitted parameter that is currently being broadcast by the satellite and identify the predicted ephemeris parameter that the receiver has that is closest to it. Then the receiver 100 uses the position of the word that has that closest predicted ephemeris parameter to derive the Satellite Time. In some embodiments, however, this matching can be or is performed across all visible satellites to reduce the probability of false match. Applying the above extraction calls for the receiver to determine the word alignment. The broadcast ephemeris is transmitted in words, with each word (or two adjacent words together) containing one parameter. One type of process embodiment performs word alignment, and specifically, reduces the probability of false word alignment using information across multiple visible satellites. Furthermore, some embodiments derive a coarse time estimate using the Solve for time technique (SFT), and use this time estimate to narrow the probability of false outputs.

GNSS satellites transmit navigation data that include satellite time and satellite ephemeris. The receiver 100 may use an hypothesis search process that issues hypothesized values of Doppler shift f and code lag to search for a satellite so the receiver will have a satellite signal to demodulate in the first place. Then both the time and ephemeris would be demodulated by receiver 100 to compute a position solution. Various embodiments are adapted to GPS or to GNSS systems in general.

However in GPS, as pointed out earlier hereinabove, satellite time is transmitted once every 6 seconds. Satellite ephemeris is transmitted every 30 seconds and takes 18 seconds to completely transmit. An ephemeris once demodulated is valid for a period of 2 hours after which a new set of ephemerides are to be demodulated from satellites. Hence a GPS receiver that is switched on even in very good signal conditions can very often take at least 30 seconds to compute a position (the bottleneck being the time to decode the ephemeris from the satellite). Known ephemeris prediction technology (EPT herein) as described later hereinbelow (Section 5) helps receiver predict ephemeris for a significant time into the future (e.g., 3-7 days depending on the specific technology used).

EPT obviates the need for the GPS receiver 100 to demodulate ephemeris in most use cases and nevertheless leaves the receiver challenged to rapidly demodulate the satellite time to find a position solution. Since the satellite time is transmitted once every 6 seconds, then demodulating satellite time even with good signal conditions can take up to 6 seconds.

Giving a position solution as soon as possible, so that end user perceives an almost 'instant fix,' would be highly desirable in a GPS receiver. In addition to better user experience, the GPS receiver according to embodiments herein is switched on for less time, which means less energy consumption, an important benefit for mobile receivers. Moreover, this fast fix capability desirably increases the probability of a fix in constrained conditions such as indoors and urban canyons where good satellite visibility is intermittent and infrequent. Furthermore, in some applications (e.g. digital cameras), the receiver might first store the digitized samples of the GPS signal in a memory and process this stored data in non-real time. In such cases, the fast fix capability directly translates to lesser memory usage.

Hence the need arises for a GPS receiver that can give a position fix without waiting to demodulate satellite time from the actual word allocated for satellite time in the satellite signal itself. A technique called Solve For Time (SFT) might, without more, allow the receiver to give a fix without demodulating the satellite time. SFT can provide a fix after the receiver has acquired at least five satellites. SFT basically regards satellite time $t_j$ as an unknown to be solved for in Equation (1) along with the other three position coordinate unknowns $x_{iR}$ and the bias error unknown e. However, since SFT computes a position based on reception from at least five visible satellites, that many satellites might not be available to receive, and significant waiting and acquisition time might be consumed until they become all available and acquired. Moreover, the SFT fix, without more, is subject to error and is not as likely to be as accurate as a fix that demodulates the satellite time word and uses it.

Some embodiments herein involve structures and processes in a receiver to give an almost instant fix in good signal conditions while overcoming the challenges posed by EPT and SFT alone. Such structures and processes derive and use information from small chunks of satellite navigation data (as small as 600 ms) to infer the satellite time. Receiver 100 derives exact knowledge of satellite time without waiting for the satellite time to be explicitly transmitted.

A process is next described for deriving satellite time from the ephemeris parameter currently broadcast from satellite and predicted ephemeris. GNSS satellites transmit navigation data in a specific structure and in a specific sequence that is known a priori to the GNSS receiver. For example, in FIGS. 3B-3C, each GPS satellite transmits data in 30 second frames, and each frame is further sub-divided into 5 subframes of 6 seconds each. Each subframe in FIG. 3C comprises of 10 words, each as in FIG. 3A having 30 bits and each bit 20 ms long. The data in each 30 second frame of FIG. 3C is transmitted in a specific sequence with each word carrying specific information about the satellite, such as a specific ephemeris or almanac parameter.

Figure 6:
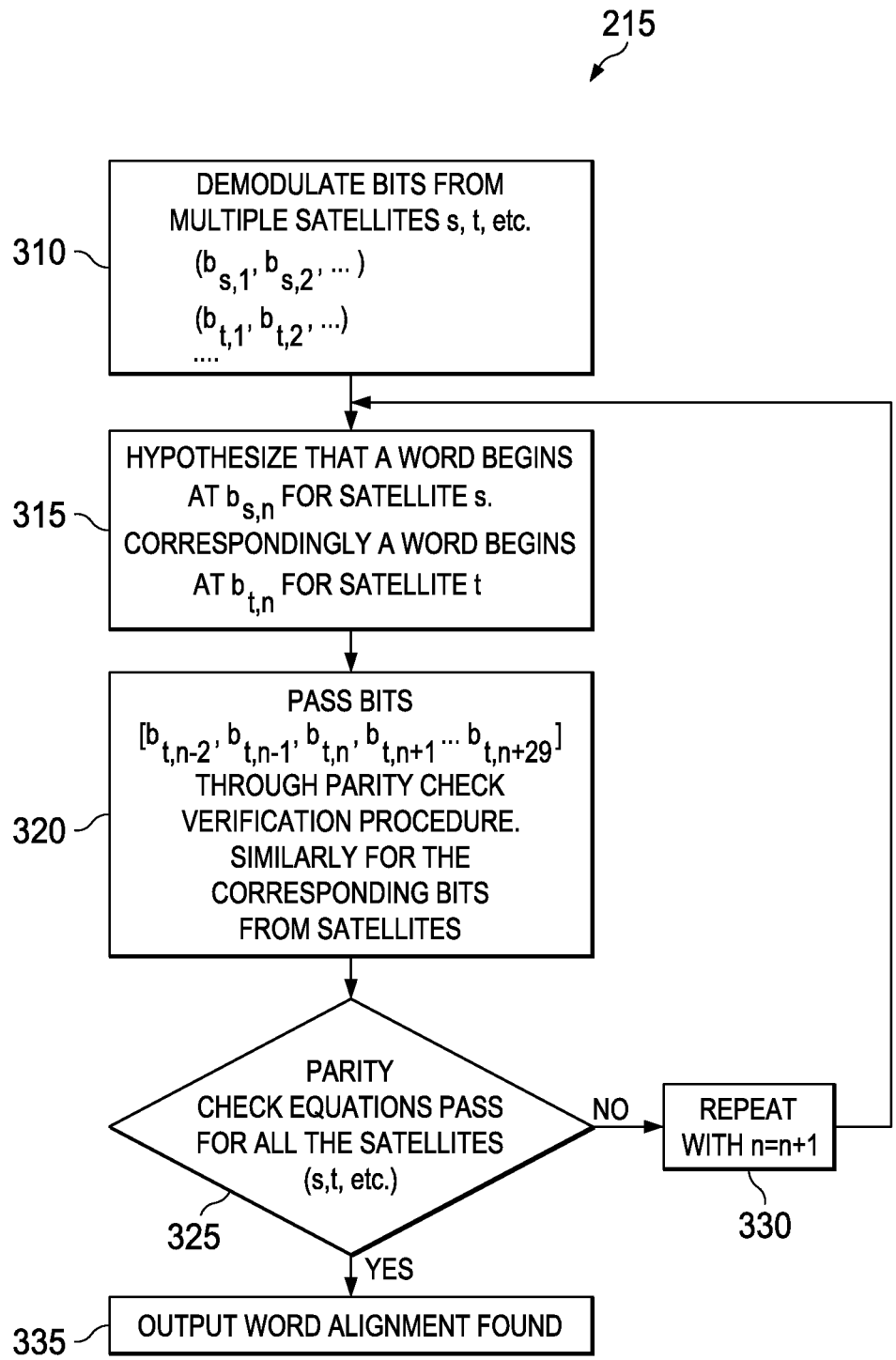
FIG. 6 is a flow diagram of an inventive process of operation detailing a Word Alignment step 215 in FIG. 4.

In SAGPS (Self Assisted GPS), ephemeris is already provided (predicted ephemeris). Using the provided ephemeris, decoding or deriving satellite SV time as taught herein provides a significant contribution to reducing total time to first fix TTFF. This contribution is enhanced further in high powered signal cases where satellite signal acquisition time by receiver 100 is small, e.g., less than one second (1 sec) or so. In SAGPS and/or with EPT, the ephemeris parameters are predicted, not exactly but to some degree of accuracy. Since the parameters are not known exactly, bit matching with the broadcast ephemeris itself is problematic. Nevertheless, parameter matching of predicted parameters with actual received parameters in FIG. 3D can be performed as taught herein and depicted in FIG. 4 or FIG. 9 or FIG. 12 or 12A. A bit-edge alignment process of FIG. 7 combined with a word alignment process of FIG. 6 is executed. Word alignment is found by selecting that alignment which passes parity. Then the process performs parameter matching on the word aligned word as in FIG. 4, for instance.

When receiver 100 obtains or has the satellite time corresponding to a received word, it can then determine the type of information transmitted in that word. From pre-stored information specifying each type of information and its position in order in the pre-defined information sequence over time, the receiver 100 in some embodiments determines what type of information is being transmitted currently. For example, at a particular obtained time of a particular received satellite word, the receiver 100 determines which small set of predicted parameters probably includes a prediction of the specific parameter (say satellite orbit eccentricity) that is being transmitted on that particular word. Conversely, then the receiver 100 determines the satellite time at which a given type information is transmitted by deciphering what type of information is being transmitted currently.

Figure 3B:
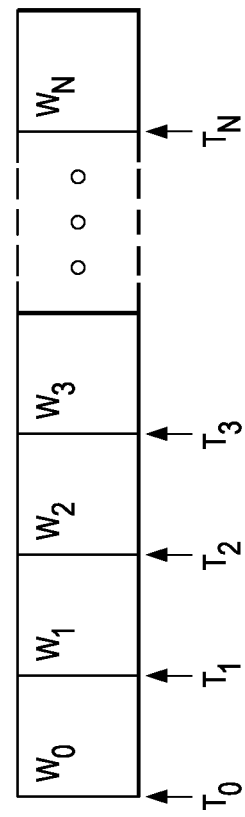
FIG. 3B is a diagram of received signal information versus time for the receiver of FIG. 2 showing successive 0.6-second words each as in FIG. 3A and distributed in a line.
Figure 3C:
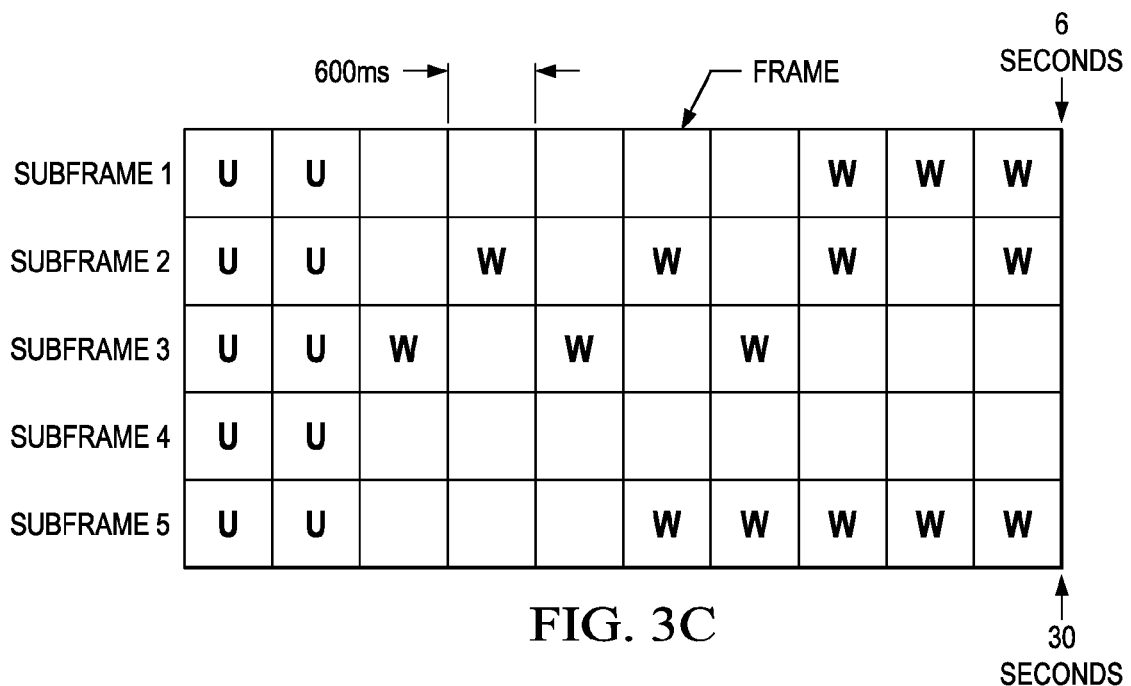
FIG. 3C is a diagram of 50 successive words in a 30-second frame, words of FIG. 3B distributed along successive columns and diagrammatically wrapped into successive rows in FIG. 3C to show qualitative similarities of some of the information in different words.

In FIG. 3B, satellite navigation data is sent by a GNSS satellite as a sequence of words W0, W1, W2 ... at times T0, T1, T2 ... respectively. Given an approximate value of time as a proxy for the satellite time Tn of a received word Wn, receiver 100 can determine the type or nature of information being transmitted on word Wn. Once the type of information on word $W_n$ is known, the satellite time can be much more accurately deduced or determined, prior to reception of the actual word carrying satellite time data that is sent every six seconds.

Figure 4:
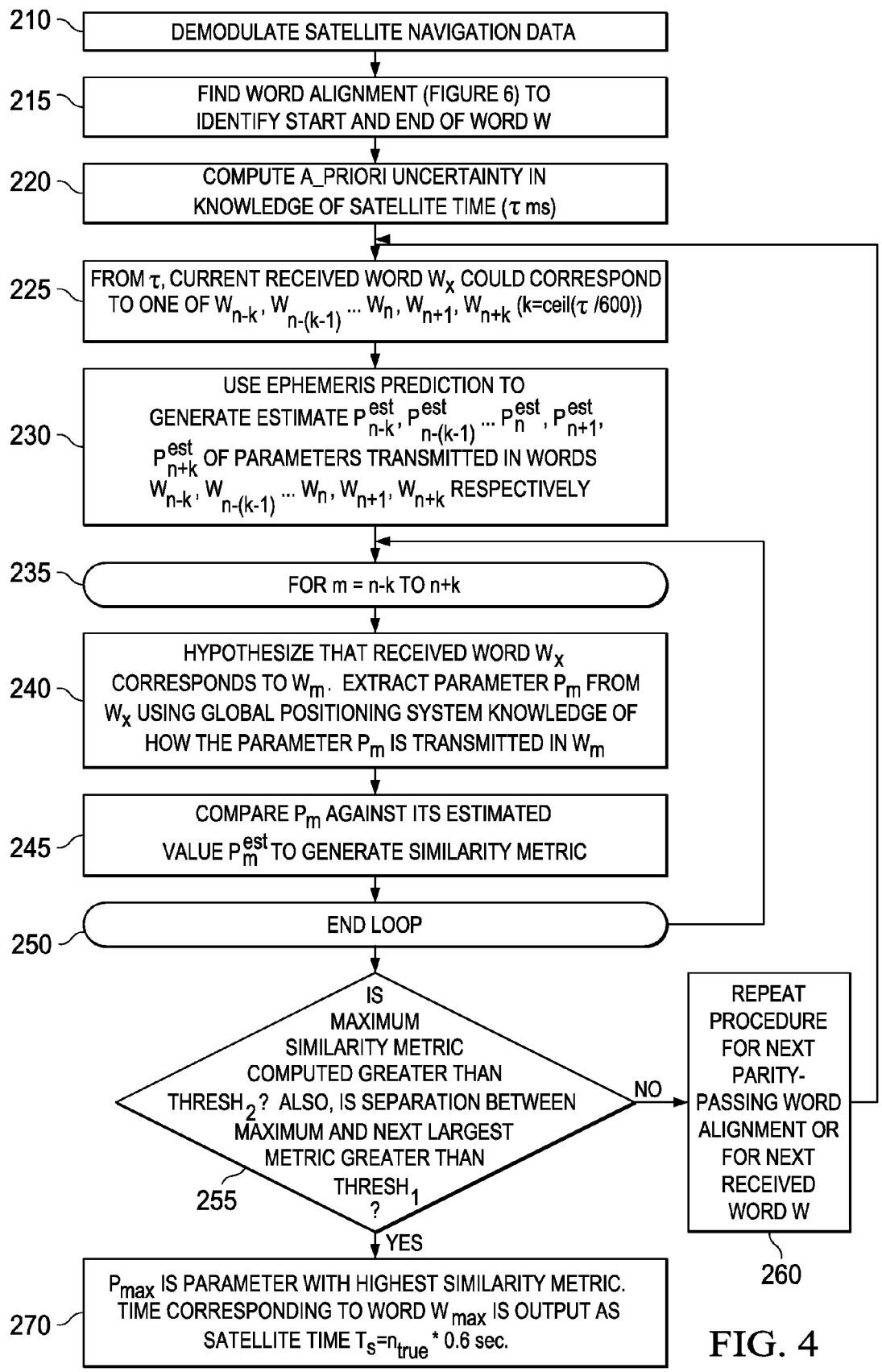
FIG. 4 is a flow diagram of an inventive process of operation for using a satellite signal of FIGS. 3A, 3B, 3C and the parameters P of FIG. 3D to determine Satellite Time.

Hot Fix embodiments provide for Word Alignment in FIG. 6 and use Parameter Matching such as taught in FIG. 4 herein for dramatically improved fast fixes, and time and position determinations. In FIG. 3A, GPS data is transmitted by each GPS satellite in bits: each bit being 20 ms long (50 bits per second), and thirty (30) such consecutive bits make up one word. Word alignment is the process by which the improved receiver determines the word boundaries, i.e., the bits where each word begins and ends. For example, if there are string of bits: b1,b2,b3,b4 ... etc, and if an actual word begins at bit b3, then determining the word alignment means indeed determining that consecutive words start at b3, b33, b63 and so on for all the successive 30 bit words.

A Glossary of symbols is provided.

| GLOSSARY OF SYMBOLS | |
|---|---|
| Symbol | Meaning |
| a, b, c, d, ... | Generalized identifying numbers for satellites S |
| b | bit |
| C | Closeness, value of similarity metric |
| $c_L$ | Speed of Light |
| $D_S$ | Distance to satellite S |
| $d_S$ | Uncertainty in distance to satellite S |
| e | Receiver time bias error |
| i | General index symbol |
| j | Index variable in the range n − k, ... n + j, ... n + k. Index j expresses a position displacement away from expected word index n. In separate area of phasors, j represents sq. rt. of −1. |
| k | Uncertainty in word position due to time uncertainty $\tau_S$ prior to similarity maximization. Uncertainty k is relative to the expected word index n that corresponds to receiver-estimated approximate time $t_S$. Uncertainty k defines range ends n +/− k for parameter set $S_P$. In another context, k may signify a general index instead. |
| $k_F$ | Word position of currently-received word $W_X$ relative to beginning of frame $n_F$, as determined by similarity maximization. |
| L | Number of matching MSBs (see rollover) |
| m | Another general index for each parameter. |
| n | Expected grand total word index of currently received word using approximate time. Index n is words since beginning of week. In another context, n may signify a bit index instead. |
| $n_{true}$ | Actual grand total word index of currently received word resulting from similarity comparison. |
| N | Number of bits of parameter, specified by format |
| $n_F$ | Actual frame number of frame in which currently-received word $W_X$ is situated |
| $n'_F$ | Expected frame number of frame of currently-received word $W_X$, based on approximate receiver time $t_S$. Expected frame $n'_F$ may be one frame away from $n_F$. |
| $N_S$ | Number of Satellites in the GNSS |
| P | Parameters received in successive words from satellite.-or alternatively: Parameter extracted from word $W_X$ as if $W_X$ has GPS parameter format hypothesized for that parameter in GPS that Pest is estimating. |

-continued

GLOSSARY OF SYMBOLS

| Symbol | Meaning |
|---|---|
| P( . . . ) | Probability of . . . |
| p( . . .\|. . . ) | Conditional probability. Probability of . . . given . . . |
| $P_c$ | Cumulative probability |
| $P_{g,i}$ | Conditional probability. Indexed on i. "g" for "given." |
| $P_m$ | mth received parameter |
| Pest, $P^{est}_m$ | Estimated parameter, e.g., from ephemeris prediction. mth estimated parameter. |
| S, T | Satellite index S, and independent satellite index T. |
| $S_C$ | Set of Closeness values. (Values of similarity metric) |
| $S_L$ | Set of differences of L MSBs relative to different thresholds Th1, Th2, . . . |
| $S_P$ | Set of estimated Parameters. |
| $t_R$, $t_{RS}$ | Receiver local time, of reception of a satellite S signal edge for which satellite time $T_S$ is computed or pertains. |
| $t_S$ | Approximate satellite time determined by receiver for satellite S. |
| $T_S$ | Accurate satellite time determined by embodiment, for satellite S. |
| $\tau_S$ | Time uncertainty in approximate receiver estimation of satellite time |
| Th | Threshold |
| W | Ephemeris or almanac parameter that can be estimated |
| $W_X$ | Currently-received word having word position X in an actual satellite signal |
| $x_{iS}$ | Position coordinate (i = 1, 2 or 3) of satellite S |
| $x_{iR}$ | Position coordinate (i = 1, 2 or 3) of receiver |

In FIG. 4, receiver 100 demodulates satellite navigation data in a step 210. Then a step 215 uses the process like that shown in FIGS. 6 and 7 to find word alignment to identify the start and end of a word W and beneficially supports the further processing shown in FIG. 4.

In FIG. 4, a step 220 is performed by receiver 100 and computes a time uncertainty value of ±τ ms of the satellite time of the current received word. Ways of determining the time uncertainty are described later hereinbelow in connection with FIG. 7. Since each word has a predetermined length (e.g., 600 ms), this time uncertainty of ±τ ms corresponds to a numerical uncertainty value of ±k words where number k is the first integer greater than or equal to τ/600 ms in the word position of the current word being transmitted in the predetermined word sequence, per the function ceil( ) in Equation (2.1).

$$k = \mathrm{ceil}(\tau/600\ \mathrm{ms}) \tag{2.1}$$

If the time uncertainty τ is initially is large, then it can be narrowed down to an amount on the order of a second or a few seconds such as by using SFT as discussed in connection with FIG. 8 or by any other suitable method as discussed elsewhere herein.

Thus the accuracy of initial time estimate determines the number k of parameter hypotheses to be tried: $P_{est}(n-k)$, $P_{est}(n-(k-1)) \ldots P_{est}(n)$, $P_{est}(n+1)$, $P_{est}(n+k)$. All the foregoing indices (n−k) . . . (n+k) are modulo 50, the number of words in a GPS frame. The expected word index n is expressed by Equation (2.2), where round(arg) is defined as closest integer to its argument:

$$n = \mathrm{round}[(t_R - (D_S/c_L))/600\ \mathrm{ms}] \tag{2.2}$$

Equation (2.2) basically says that the expected grand total word position n is equal to a receiver-estimated approximate satellite time $t_S$ divided by a 600 ms word length, and rounded to the nearest integer. Expected word position in a GPS frame, such as to retrieve a Pest to try, further involves an operation of modulo 50 the words in a GPS frame. Current local time-of-week $t_R$ is maintained and/or calculated by the receiver R from its clock and is lagged back by distance $D_S$ divided by speed of light $c_L$ to form the approximate satellite time $t_S$. If the approximate satellite time is over a week, then it is revised modulo a week to provide approximate satellite for the current week to be comparable to GPS satellite time. Any GPS satellite is at a distance $D_S$ of between about 18,000 and about 27,000 kilometers from a given place on the earth when that satellite is visible. So, on average and in the absence of other information, the average distance $D_S$=22500 km, and $D_S/c_L$=75 ms. This distance $D_S$ estimate can be refined with the help of an a priori estimate of satellite coordinates $X_{iS}$ computed from predicted ephemerides and a rough estimate of the receiver position $X_{iR}$.

In a step 225, the process then determines that the current position X of received word $W_X$ corresponds to one of the words Wn−k, Wn−(k−1) . . . Wn, Wn+1, Wn+k. Resolving this ambiguity (i.e., identifying exactly which word Wx was transmitted) confers and delivers accurate satellite time in and to the receiver.

Figure 3D:
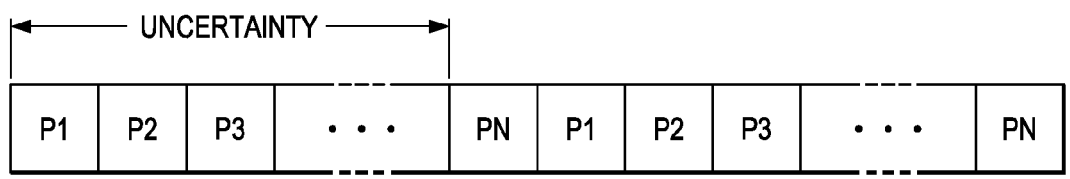
FIG. 3D is a diagram of successive parameters P estimated by Extended Ephemeris and that approximate the words labeled W in FIG. 3C.

Briefly speaking, after word alignment has been found, the estimated parameters Pest are accessed and a Parameter Matching subprocess attempts to estimate which parameter P of FIG. 3D is being carried or passed in that word $W_X$. Parameter lengths range from 16-32 bits. Comparison with estimated parameters determines which parameter the received word $W_X$ is carrying. Thus in FIG. 3D, pre-stored value(s) of the received parameter along with a coarse estimate of time (to within +/−τ), allow the FIG. 4 embodiment to accurately estimate satellite time. Determining which parameter the received word is carrying automatically leads to the satellite time associated with the position of that received word and thereby enables the satellite time to be inferred or deduced.

In more detail, the inference process of FIG. 4 is further described as follows. Designate actually received navigation parameters by Pn−k, Pn−(k−1) Pn, Pn+1, Pn+k being sent on each of the words Wn−k, Wn−(k−1) . . . Wn, Wn+1, Wn+k respectively. The currently-received word $W_X$ is among those words and position X is to be determined. Many words transmitted in the satellite navigation data contain an ephemeris or almanac parameter. The receiver 100 has Ephemeris prediction technology (EPT) that estimates values Pest of these ephemeris and almanac parameters. In a step 230, receiver 100 accesses these estimated almanac and ephemeris parameters, denoted here by a set $S_P$ having estimated parameters given by Equation (3). (Some embodiments may also use some of the ancillary Equations (3.1)-(3.5) described later hereinbelow after Equation (13.5).

$$S_P = \{P_{est}(n-k), P_{est}(n-(k-1)) \ldots P_{est}(n), P_{est}(n+1), P_{est}(n+k)\} \tag{3}$$

Further in FIG. 4, receiver 100 executes a loop 235, 240, 245, 250, 235, etc. A step 240 extracts the parametric information P embedded in the received word Wx and compares or matches it with each of the parameter estimates $P_{est}(n-k)$, $P_{est}(n-(k-1)) \ldots P_{est}(n)$, $P_{est}(n+1)$, $P_{est}(n+k)$ by computing a value of a similarity metric for each comparison. Notice that the way of representing a parameter value in its bitwise form or format should be the same way for both the parameter value obtained from the currently-received word $W_X$ and the parameter Pest for the word position being compared. So, to compare a particular Pest(m) with word $W_X$ in step 245, the bits in word $W_X$ are supplied in or converted by step 240 to the same form or format for purposes of comparison assuming (hypothetically) that word $W_X$ is word $W_m$. In other words, the bits in word $W_X$ are supplied in or converted to a form or format for purposes of comparison with Pest(m) as if word $W_X$ were word $W_m$. This process of setting up values in step 240 in comparable format is called extraction here. The form or format depends on that defined for the parameter in the particular GNSS of which the satellite is part as well as the format in which the corresponding ephemeris prediction value is generated in a particular implementation of the device and process of FIG. 4. See for instance, the GPS word formats at 11-page FIG. 20-1 in GPS ICD pp. 67-76a.

A Similarity Metric is defined for each comparison performed by step 245. Based on the similarity metric, if a close match for purposes of step 255 is found between the parametric information in one of the parameters Pn-k, Pn-(k-1)) . . . Pn, Pn+1, Pn+k extracted from word $W_X$ and one of the parameter estimates $P_{est}$(n-k), $P_{est}$(n-(k-1)) . . . $P_{est}$(n), $P_{est}$(n+1), $P_{est}$(n+k), the receiver 100 thereby identifies the exact word being transmitted and then goes on to exactly compute, establish, or identify the satellite time using a step 270.

Put another way, the loop 235-250 generates a series of closeness values C of the similarity metric. The series of closeness values are indexed in any suitable way and for clarity here they are designated as a set $S_c$ in Equation (4) wherein:

$$S_C = \{C(n-k), C(n-(k-1)) \ldots C(n), C(n+1), C(n+k)\} \quad (4)$$

The similarity metric in one definition here and for FIG. 4 is monotonically increasing in one example, meaning it has an increasingly larger value if the closeness is increasingly closer. Step 255 finds the particular closeness value $C_{max}$ that is the maximum of all the closeness values in the set $\{C(n-k), C(n-(k-1)) \ldots C(n), C(n+1), C(n+k)\}$ according to Equation (5):

$$C_{max} = MAX[C(n-k), C(n-(k-1)) \ldots C(n), C(n+1), C(n+k)] \quad (5)$$

Then step 255 finds the value of an index j in the range −k to +k that solves Equation (6), i.e. is such that:

$$C(n+j) = C_{max} \quad (6)$$

Then the word $W_X$ is that word with index X=n+j where n+j is the particular index of the maximum closeness value $C_{max}$, see Equation (7).

$$W_X = W_{max} = W_{n+j} \quad (7)$$

Describing it another way, a particular estimated parameter $P_{max}$ pre-stored and accessible by receiver 100 is the one most closely similar to the parameter P received on word $W_X$ from a satellite. The latter parameter P arrived in the word $W_X$ having unknown time position X. The particular estimated parameter $P_{max}$ is among the estimated parameters in the set $\{P_{est}(n-k), P_{est}(n-(k-1)) \ldots P_{est}(n), P_{est}(n+1), P_{est}(n+k)\}$ in receiver 100. Note also, that since some word positions are unmarked (white) in FIG. 3C, parameters either are not estimated for those word positions in the set, or dummy parameters are entered to yield negligible similarity metric value at those unmarked word positions. If a match is possible, currently-received parameter P from the satellite is in effect matched up with the most closely similar estimated parameter $P_{max}$ in that set $\{P_{est}(n-k), P_{est}(n-(k-1)) \ldots P_{est}(n), P_{est}(n+1), P_{est}(n+k)\}$. Once the closest match is determined, then the position X of the particular word $W_{max}$ on which parameter P must be riding is thereby established and found. The satellite time corresponding to the word $W_{max}$ is then computed and output as the satellite time $T_S$ by step 270, as detailed in FIG. 5.

The estimated parameters in the set $\{Pest(n-k), Pest(n-(k-1)) \ldots Pest(n), Pest(n+1), Pest(n+k)\}$ of Equation (3) represent estimates for the words marked W and U in the FIG. 3C word checkerboard. If the currently-received word $W_X$ is a particular word marked U or W, the similarity metric process is able to match the currently-received word $W_X$ with a particular estimate in the set $S_P$ of Equation (3). Thus, when a particular estimate Pest(n+j) in the set is found that matches, that specific parameter P that has matched becomes identified.

The Ephemeris Prediction software may generate estimates for fewer than all the 50 words in a frame (see labeled words U and W in FIG. 3C). Therefore, a storage table in receiver 100 may list and index various estimates of parameters output by the ephemeris prediction software in the numerical order of the occurrence of the parameter without regard to the white spaces in FIG. 3C, as indicated by numerals 1-25 in column 1 of TABLE 1. In that case, TABLE 1 is suitably used to relate the indexing of the various estimated parameters to the word position 1-50 in the frame.

The position X of the word marked U or W in FIG. 3C is obtained and found from index n+j in Pest(n+j) by electronically executing Equation (7.1) that maps Pest(n+j) to $k_F$=X and accessing it for the word position $k_F$ in the range 0-49 relative to beginning of frame in FIG. 3C.

$$k_F = (n+j)_{mod 50} \quad (7.1)$$

In FIG. 4, step 255 is suitably crafted to avoid unclear cases wherein the closeness values C are all small, or they lie so close together near the maximum in Equation (5) that there is not-insignificant uncertainty which index value for a parameter should be regarded as the solution position. Accordingly, step 255 checks, for instance, whether the maximum closeness value C of the similarity metric in Equation (5) is greater than some threshold value Thresh2 to avoid unclear cases where all the values C are small. Further, step 255 also checks that the separation between the maximum value $C_{max}$ and the next-largest value C of the similarity metric in the set $\{C(n-k), C(n-(k-1)) \ldots C(n), C(n+1), C(n+k)\}$ is indeed greater than some separation threshold value Thresh1. If not, there is too much uncertainty which word position to pick for maximum closeness.

A threshold value for the thresh2 threshold, or numerical range for setting thresh2, is on the order of, e.g., 0.3 to 0.4. A threshold value for the thresh1 threshold, or numerical range for setting thresh1, is a, e.g., similar 0.3 to 0.4. However, different threshold values than those in the just-mentioned numerical ranges for thresh2 and thresh1 may be suitably used in some embodiments. For instance, different threshold values may be called for when comparing closeness in different parameter sets (different n and k defining different index intervals n−k to n+k in Equation (3)), or when certain predicted parameters can be predicted to a greater or lesser degree of accuracy by ephemeris prediction software than other ones of the predicted parameters.

If either check fails in step 255, then operations branch from step 255 back through a step 260 to repeat the procedure with steps 225-255 for the next received word $W_{X+1}$ instead of the currently-received word $W_X$ for which the check failed. Since the next received word $W_{X+1}$ arrives 600 ms after the current word $W_X$, this does not unduly delay the hot fix process, and the next received word $W_{X+1}$ or one soon after it will likely pass step 255. Indeed, some embodiments are even quicker and look for a soon-occurring alternative parity-passing word alignment, called Method 3 discussed in connection with FIG. 6 elsewhere hereinbelow. Then step 260 repeats the similarity metric procedure of FIG. 4 on the currently-received word $W_X$ itself based on the alternative word alignment, and a match may even sooner pass step 255 than would be the case when proceeding to the next received word $W_{X+1}$.

If a current received word $W_X$ is one of those not marked U or W in FIG. 3C, then the similarity metric values C in Equation (5) do not normally exceed the similarity metric threshold thresh2 in step 255. However, a small false matching probability exists that this threshold (thresh2) might nevertheless be exceeded. This probability of false matching is reduced in some embodiments by computing the similarity metric values across satellites as discussed later hereinbelow with FIG. 9.

In FIG. 4, if operations fail to establish a similarity metric value due to metric not exceeding thresh2 or the separation not exceeding thresh1, then the procedure in FIG. 4 proceeds to establish similarity with the next received word W. While establishing similarity with the next received word W, some embodiments also take into account the information derived from all previous failed attempts as discussed elsewhere hereinbelow.

The ephemeris prediction in the system can be performed in any convenient or economical way, such as (a) on a dedicated remote server with which the mobile device communicates, such as by a wireless data connection, or (b) on a processor in the mobile device itself. The quality of the prediction is feasible on a processor on the mobile device, and may be lower than that provided by a remote server if the mobile device has less computational power than the server. The thresh2 and thresh1 values used for similarity metric threshold identification that are used based on ephemeris prediction on the mobile device may have different values as compared with the similarity metric threshold values utilized when using ephemeris predicted at a remote server if the degree of accuracy of the ephemeris prediction software is different.

A process embodiment can also use the similarity metric of FIG. 4 to directly identify the position of the second word of a two-word ephemeris parameter (blank box in a marked-blank pair in FIG. 3C) without benefit of the first word. In a two word ephemeris parameter, the first word usually contains the most significant bits (MSB) and the second word contains less-significant bits LSBs. In GPS for instance, the first word often contains 8 bits of a 32 bit parameter, while the second word contains the remaining 24 bits of the parameter. If the ephemeris prediction accuracy is sufficiently high, computing a similarity metric with just the second word can be feasible in some cases and represents one way of increasing the number of words marked W beyond the fifteen (15) words W in FIG. 3C. At lower ephemeris prediction accuracy, the lower end (LSB) bits might not match sufficiently, due to the inaccuracy in the ephemeris prediction, to exceed a threshold value thresh2 that is set high enough to have an acceptably-low false prediction probability. With bits starting from the MSB (most significant bit), and because ephemeris prediction can predict the more significant bits well, the similarity metric can be feasibly applied using the first, more significant part of a two-word parameter. The latency can be 0.6 seconds or less when only one word (either more significant bits or less significant bits) of a two-word parameter is successfully matched using the similarity metric. If both words of the two-word parameter are involved in the similarity metric process, then the latency can be 1.2 seconds or less for successful matching.

Parameters from current broadcast ephemeris (e.g., by satellites) can be compared with predicted ephemeris parameters (24 hour prediction). The number of matching MSB's appears to range from 8 to 12 bits as between a predicted ephemeris parameter and the broadcast ephemeris parameter. So probability of false alarm for each parameter is about $1/2^{12}$ (i.e., 1/4096). Even this low probability can be reduced or brought down further by using information from multiple SVs when multiple SVs are visible. Even if false matching occurs, it is not catastrophic since it will just bring down the accuracy of the fix to the pre-existing level of time uncertainty, such as that achievable by SFT or represented by or deduced from other available information by receiver 100.

Note that an alternative definition for the similarity metric can be monotonically decreasing such that a smaller and smaller value of the metric is generated if the closeness is increasingly closer. In that case a minimum MIN is used instead of maximum MAX in step 255.

In FIG. 3C, many additional words (e.g., 15 more words W) are recognizable by a parameter matching embodiment of FIG. 4 herein as compared with only 10 words by handover word HOW and telemetry word TLM. This means that some of the embodiments can recognize 25 total words, an increase of 150%.

FIG. 3C depicts a checkerboard of words in subframes and is described in further detail here. The checkered diagram shows the frame structure of the GPS satellite signal that includes 5 sub-frames in respective sub-frame rows. The frame structure repeats itself every 30 seconds on the exact minute or half-minute of atomic time. A cell in the checkerboard refers to a single word—there are ten 30-bit words in a sub-frame—hence 10 cells are present in each row of the diagram of FIG. 3C.

The first two words of each row refer to the TLM and HOW respectively. The telemetry word TLM contains an 8 bit preamble. The preamble is a fixed sequence of bits defined in the GPS Interface Control Document (ICD). Since the preamble is always the same, a hardware detection block or software module in receiver 100 is operated to detect occurrence of that fixed sequence of bits in the preamble at the beginning of a word. When such occurrence is detected, the word in which the fixed sequence appears is the TLM word, and in this way the detection block detects the reception of the TLM word.

In GPS, the word following the TLM word in each sub-frame is the Hand-over Word or HOW word. The HOW contains information that specifies the satellite time at the start of the HOW word. Accordingly, receiver 100 recognizes the TLM word by detecting an occurrence of its preamble, and then outputs a signal edge derived from the leading edge of the first bit in the following word (i.e. the HOW word). This signal edge signals the instant of time which is represented by the satellite time data bits embedded in the HOW word. Receiver 100 thus receives and looks at or decodes the HOW word following TLM and reads out the satellite time of the signal edge. If the TLM/HOW word is fortuitously occurring when the receiver is taking a fix, then the satellite time $T_S$ is recovered almost immediately. The time is represented by information for time-of-week and GPS week number.

However, note that the TLM/HOW word UU in FIG. 3C repeats only every 6 seconds, and the receiver 100 herein may take the fix at some other point in the six-second subframe. Rather than wait for several seconds for the next TLM/HOW, various embodiments herein derive exact satellite time $T_S$ from any sooner-occurring one (or more) of e.g., fifteen of the other received words in a frame and thereby substantially and desirably abbreviate time-to-fix. These other words W are those which transmit parameters which are well predicted by Extended Ephemeris technology or other technologies available currently or available in the future. The words in the unmarked cells of FIG. 3C are believed to be currently not predicted by Extended Ephemeris. When and if any of the unmarked cells become predictable by future technology, they are then also marked (W) and operated upon as taught herein.

Extended Ephemeris (EPS) and its manner of utilization herein is described in more detail next. When the GPS receiver is able to download the ephemeris from the satellite navigation data, it provides this data to the Ephemeris prediction software (EPS). The EPS has prediction software to predict ephemeris for a certain number of days into the future. Such software can use a certain number (e.g., two) of past-received values provided by or stored in the GPS receiver for a given ephemeris and then extrapolate them into the future. Prediction operations estimate or predict the information GPS specifies to be transmitted by each satellite in the following respective particular words W in FIG. 3C.

(a) Subframe 1, Words 8-10:
These words respectively contain the three parameters needed to correct for errors in the satellite clock. These three parameters are referred to as $t_{oc}$, $a_{f0}$, $a_{f1}$, $a_{f2}$.

(b) Subframe 2, Words 4, 6, 8, 10
Words 4 and 5 together contain 32 bit parameter Mean Anomaly at Reference Time (Mo)
Words 6 and 7 together contain 32 bit parameter Eccentricity (e)
Words 8 and 9 together contain 32 bit parameter Square root of Semi-Major Axis (A)
Word 10 contains 16 bit parameter Reference Time of Ephemeris ($t_{oe}$).

(c) Subframe 3, Words 3, 5, 7
Words 3 and 4 together contain 32 bit parameter Longitude of Ascending Node of Orbit Plane at Weekly Epoch ($\Omega$o)
Words 5 and 6 together contain 32 bit parameter Inclination Angle at Reference Time (Io)
Words 7 and 8 together contain 32 bit parameter Argument of Perigee ($\omega$)

(d) Subframe 5, Words 6-10.
These are almanac parameters that can also be identified using ephemeris prediction algorithms since they are the same parameters as in ephemeris.
Word 6 contains 24 bit parameter Square Root of Semi-Major Axis (A)
Word 7 contains 24 bit parameter Longitude of Ascending Node of Orbit Plane at Weekly Epoch ($\Omega$o)
Word 8 contains 24 bit parameter Argument of Perigee ($\omega$)
Word 9 contains 24 bit parameter Mean Anomaly at Reference Time (Mo)
Word 10 contains clock correction parameters $a_{f0}$ and $a_{f1}$ (each occupying 11 bits).

Each satellite transmits ephemeris parameters about itself and also transmits an almanac of information pertinent to all of the GPS satellites. Many frames, each 30 seconds in duration, are used to communicate the entire almanac, which has a list of satellites and coarse ephemeris information for each of them. Some parameters in the almanac relate to corrections for ionospheric signal propagation. The almanac also has information for converting GPS time to Coordinated Universal Time.

TABLE 1 tabulates estimated parameters indexed in order and shown corresponding respectively to their known word positions in the 50 words in a GPS frame of FIG. 3C. The Ephemeris Prediction software may generates a list of predicted values Pest that are indexed on an index number i according to some order in which they are generated or stored. TABLE 1 is used to convert index number i to word position $k_F$ in the frame relative to the beginning of the frame.

TABLE 1

WORD POSITION LOOK UP TABLE

| Index Nr. i of Est. Parameter in Frame | Word Position $k_F$ + 1 in Frame |
|---|---|
| 1 | 1 |
| 2 | 2 |
| 3 | 8 |
| 4 | 9 |
| 5 | 10 |
| 6 | 11 |
| 7 | 12 |
| 8 | 14 |
| 9 | 16 |
| 10 | 18 |
| 11 | 20 |
| 12 | 21 |
| 13 | 22 |
| 14 | 23 |
| 15 | 25 |
| 16 | 27 |
| 17 | 31 |
| 18 | 32 |
| 19 | 41 |
| 20 | 42 |
| 21 | 46 |
| 22 | 47 |
| 23 | 48 |
| 24 | 49 |
| 25 | 50 |

Ephemeris Prediction Technology, referred to here as EPT or Extended Ephemeris, is discussed in some further detail. Ephemeris assistance might in one approach involve downloading the satellite ephemeris from a remote server and using it in an embodiment herein. This approach involves the receiver having real time connectivity via either a mobile phone network or the internet. In some other embodiments, Extended Ephemeris is situated and used locally and does not require any cellular or other terrestrial connectivity in the real-time receiver 100. In such approaches, the receiver 100 itself has EPT processes for predicting ephemeris for an extended period of time (e.g., 3 to 6 days).

The GPS Interface Control Document (ICD) http://www.navcen.uscg.gov/pubs/gps/icd200/icd200cw1234.pdf describes these ephemeris and almanac parameters in more detail and how to use them in computing the satellites position and velocity. It suffices herein to know that these parameters are predictable by ephemeris prediction software. A parameter can straddle two words (e.g. eccentricity straddles word 6 and 7 in subframe 2). Both those words are received by the receiver to extract all of the bits in that parameter. If a parameter straddles two words, the first word containing the parameter is identified with the letter W in FIG. 3C. Subframes 1, 2 and 3 in each frame contain ephemeris parameters for the specific satellite that is broadcasting the information.

Subframe 5 transmits almanac parameters for all the satellites in sequence. i.e, each satellite transmits almanac parameters for all GPS satellites (1 to 32) in sequence. So the frame with a first occurrence of subframe 5 has almanac parameters for satellite 1. The next frame has its subframe 5 that has almanac parameters for satellite 2 and so on. Once almanac has been transmitted for all satellites, it cycles back and starts from satellite 1 again. Several of the almanac parameters in each frame are basically a coarse version of ephemeris parameters. For example, each satellite transmits its own Mean Anomaly at Reference Time parameter as a 32 bit number in Words 4-5 of Subframe 2. And it also transmits the Mean Anomaly at Reference Time parameter for all other GPS satellites in sequence as a part of the almanac in Word 9 of Subframe 5. The Mean Anomaly at Reference Time parameter in the almanac is a coarser version and is represented using only 24 bits. Several other almanac parameters are analogously coarse.

Some of these words W in FIG. 3C contain ephemeris parameters and some contain almanac parameters. For the purposes here of some embodiments, Almanac parameters are similar to ephemeris parameters except that the particular almanac parameters located in some of the words W have a lower accuracy. For example and without limitation, the words marked W in FIG. 3C are sufficiently-well predictable by current Ephemeris prediction software (EPS) that some similarity based on metric embodiments taught herein can use such EPS with the processes like FIG. 4 for ascertaining the word position of such words when received and then employ the word position for hot fixes.

Suitable EPS algorithms are known and/or available commercially.

For mathematical computational background see U.S. Published Patent Applications 20080111738, S. Han, May 15, 2008, and S. Han, 20080270026, Oct. 30, 2008, each of which is incorporated herein by reference.

See also description of ephemeris prediction software, for instance, at http://www.rxnetworks.ca/products/gpstream_sagps.aspx and in a U.S. Published Patent Application 20080018527 of Rx Networks, Jan. 24, 2008, which is incorporated herein by reference. An Rx-Networks product for Extended Ephemeris (called SAGPS or Self Assisted GPS) is found at http://www.rxnetworks.ca/Technology/GPStream-SAGPS/tabid/78/Default.aspx.

An abstract of a paper on an Rx-Networks Solution is found at http://www.ion.org/search/view_abstract.cfm?ip=p&idno=8038.

An Extended Ephemeris solution from Nemerix is described briefly at: http://www.lbsinsight.com/?id=865.

For instance, if the GPS receiver downloads ephemeris (as broadcast on the satellite navigation data) once on Monday and again on Tuesday, the EPS can generate ephemeris parameters for Wednesday, Thursday and Friday. When such a GPS receiver is switched on, it queries the EPS with its current receiver local time $t_R$ (this does not have to be very accurate), and the EPS generates the predicted ephemeris parameters for that current time. Embodiments of receiver 100 use these parameters to derive the exact satellite time $T_S$ as taught herein to calculate the user position. The GPS receiver 100 also uses these predicted ephemeris parameters to compute the exact position coordinates $X_{iS}$ of several satellites. Those coordinates $X_{iS}$ and the satellite time $T_S$ are applied in suitable equations such as Equations (1) to calculate the user position.

Returning to FIG. 4, to compare parametric information P1 extracted from a given received word W with an estimated parameter P2, some embodiments compute a similarity metric C(P1,P2) in step 245 that captures how closely P0 and P1 match. Different embodiments compute and utilize such a similarity metric C(P1,P2) defined in alternative different ways. In one example, a similarity metric subprocess in step 245 provides the parameters P1 and P2 in binary form ready for comparison. The subprocess compares P1 and P2 to determine a number L of consecutive bits starting from the MSB (most significant bit) that match between P1 and P2. Then a value of similarity metric C is computed in one version as the ratio of the number of consecutive bits divided by the total number of bits N that are used to represent parameter P2 in the satellite navigation message. In corresponding Equation (8):

$$C(P1,P2)=L/N. \tag{8}$$

Other matching Equations based on consecutive or non-consecutive corresponding bits, or based on other Equations can be the basis of electronic operations for specifying and evaluating a similarity metric for use here instead.

The matter of computing the number of bits that match starting from MSB, is focused upon next. Several places in this document refer to the number L (or $L_a$ etc.) of consecutive bits starting from the MSB that match between the extracted received parameter and the predicted parameter. Determining L by counting matching bits from the raw data itself has a problem called a rollover problem herein as illustrated by the following example. Suppose for a particular mth parameter the received parameter has a value of 256 while the predicted parameter has a smaller value of 255. These values are very close to each other but in binary notation there are no matching bits.

(255 in binary notation is: 0 1 1 1 1 1 1 1 1
256 in binary notation is: 1 0 0 0 0 0 0 0 0)

The following process of determining the number L of matching bits takes care of this rollover problem. Let the received binary bits corresponding to a particular parameter r be $[b_{r,1}\ b_{r,2}\ b_{r,3}\ b_{r,4} \ldots b_{r,N}]$. Let the corresponding bits from the estimated prediction be $[b_{e,1}\ b_{e,2}\ b_{e,3}\ b_{e,4} \ldots b_{e,N}]$. By definition of binary notation itself, the value Pr corresponding to the received parameter can be computed as:

$$P_r = \sum_{k=0}^{N-1} 2^k b_{r,1} \tag{9.1}$$

Similarly the value corresponding to the predicted parameter is computed as $$P_e = \sum_{k=0}^{N-1} 2^k b_{e,k} \tag{9.2}$$

L is then computed according to Equation (10), where N is number of bits per word e.g. 16 bits, as follows:

$$L=N-[\log_2(|P_r-P_e|)+1]. \tag{10}$$

Any suitable implementation of an electronic computation for Equation (10) is satisfactory for this procedure, such as by a procedure that takes or includes taking the absolute value of the difference and counting the number L of leading zeroes in that absolute value of the difference per Equation (11).

$$L=\text{ZEROCOUNTmsb}(|P_r-P_e|) \tag{11}$$

So when the description involves finding the number of consecutive bits starting from the MSB that match between two values, the above procedure is used, or any suitable alternative is used that handles rollover.

Alternative similar useful processes can include monotonically decreasing or increasing transformations of Equation (10), and MAX or MIN is used in Equation (5) depending on which of them selects the most nearly-similar parameter. Equations (10.1) and (10.2) represent a couple of examples out of many that could be given.

$$L=-\log_2(|P_r-P_e|). \tag{10.1}$$

$$L=N-[\log_2(|P_r|)-\log_2(|P_e|)] \tag{10.2}$$

Compare FIG. 4 with FIG. 3C. Not only can the FIG. 4 process with its steps 245 and 255 locate the TLM and HOW words 1 and 2 in each subframe by its similarity metric process, but also the particular additional subframe words marked W among word columns 3-10 in FIG. 3C. The description here next describes what an embodiment does in taking a fix, depending on which word $W_X$ is currently or soonest available for analysis.

Suppose TLM word 1 is just received at time of fix. Then the embodiment locates the TLM word by detecting its preamble as described hereinabove.

Suppose instead that HOW word 2 is just received at time of fix. The embodiment independently identifies and locates the HOW word 2 whether or not the preamble of TLM word is available or detected ahead of HOW. The embodiment uses and operates based on the approximate satellite time maintained in receiver 100. The HOW word has a 17 bit counter used to transmit satellite time. This number denotes the number of six (6) second epochs that have passed since the last Sunday (the counter resets every Saturday Midnight). So if the receiver 100 maintains time to within an accuracy of, say, 12 seconds, then the higher 15 bits (MSB) of this counter are used as the parameter $P_m$. Using these higher 15 bits for parameter $P_m$, receiver 100 applies the similarity metric in FIG. 4 to identify the HOW word 2 in the particular subframe that the just-received HOW word is located.

Suppose instead that an ephemeris word W of FIG. 3C is just received at time of fix. The embodiment independently identifies and locates the particular ephemeris word W according to its subframe 1-5 and its word position 1-10 even though neither the TLM or HOW word U is currently available. The embodiment uses and operates based on the approximate satellite time maintained in receiver 100 together with analysis of extended ephemeris parameters based on the similarity metric process of FIG. 4.

Satellite navigation data transmitted by a GNSS satellite typically has a periodicity to it. In the case of a GPS satellite, most of the data repeats every 30 seconds. So, the received word $W_X$ data comparison with estimated parameters points to word position modulo the frame periodicity, e.g. 30 seconds in GPS. In real life situations the value of time uncertainty $\tau$ is at most a couple of seconds. Since the receiver evaluation of the satellite time $(+/-\tau)$ has ambiguity $2\tau$ of less than 30 seconds ($\tau<15$ seconds), the receiver 100 successfully maps the transmission of a particular satellite-originated parameter to a unique satellite time according to embodiments herein. This conclusion is supported by recognizing that index k will be less than 25 (in words) and the range of Pest indexing less than (n−25 to n+25) so the set $S_P$ of estimated parameters therefore not wrap the set $S_P$ around the frame periodicity and therefore not repeat one or more of the estimated parameters. Some of the embodiments avoid repetition of estimated parameters in set $S_P$. Note in this regard that occasionally the same satellite does send both an ephemeris parameter and the coarse almanac value of that parameter pertaining to that satellite itself in the same frame or in adjacent frames within 30 seconds of each other and possibly within the range of indices of parameters in a practically occurring set $S_P$ of Equation (3). Accordingly, some embodiments suitably specify and arrange the format of each predicted ephemeris value and/or each extraction format of a received word from the GNSS so that comparison of a received coarse almanac value with its EPS-predicted ephemeris parameter produces low similarity C and comparison of a received ephemeris parameter with its EPS-predicted coarse almanac value also produces low similarity C. However, even for the same parameter, the way the almanac bits are packed in a GPS word differs from the way they are packed for the ephemeris. So the bit extraction (from the received word) if the receiver is hypothesizing an ephemeris parameter is not the same as the bit extraction when the receiver is hypothesizing an almanac parameter. Hence, this kind of "repetition" of estimated parameters in the set Sp is not a problem if one parameter is from the ephemeris and other is from the almanac for the same satellite.

Receiver 100 computes the a priori time uncertainty ($\tau$ ms) in the satellite time $t_S$ as described here, for one example. Even when not actively measuring GPS signals, the receiver continues to have a rough estimate of the time $t_R$ at the receiver R since the receiver maintains time using its local clock. Most receivers also maintain or can be modified to maintain a worst case estimate of the inaccuracy of this clock estimate. The accuracy degrades and the inaccuracy estimate of $\tau$ increases with the duration $t_R$ the GPS receiver local clock has been free wheeling without correction. In one process, the receiver 100 locally generates an uncertainty value specifying that its local receiver time estimate is accurate to within $+/-\tau_R$. The receiver 100 computes the a priori uncertainty in the knowledge of satellite time (r) using Equation (9).

$$\tau = \tau_R d_S/c. \qquad (9)$$

In Equation (2), $d_S$ signifies the a priori uncertainty in the distance between satellite s and receiver 100. The letter c represents the speed of light. In the time uncertainty formula $\tau = \tau_R + (d_S/c)$, the symbol $\tau_R$ denotes evaluated uncertainty about current time $t_R$ maintained by the receiver R. If, for example, the receiver 100 maintains its current time to an evaluated accuracy of say 1.2 seconds, then $\tau_R$ is 1.2 sec. and then in equation (9), it remains to consider and/or evaluate the distance uncertainty $d_S$.

Receiver 100 computes an estimate of distance $D_S$ between receiver 100 and a satellite S, and the associated uncertainty $d_S$ as well, according to any suitable process now known or hereafter devised. Any GPS satellite is at a distance $D_S$ of between about 18,000 and about 27,000 kilometers from a given place on the earth when that satellite is visible. So in the absence of other information $d_S=27000-18000=9000$ km, and the value 9000 km is used in the above Equation (9) where $d_S/c=30$ ms in this case. This uncertainty is further reduced with the help of an a priori estimate of satellite coordinates $X_{ij}$ computed from predicted ephemerides and a rough estimate of the receiver position $X_{iR}$. The user position is obtained from a previously computed position fix, or is obtained from Doppler-based positioning referenced below, or from currently-servicing cellular network cell tower position and/or cellular network triangulation, or any other available process or information.

A brief description of some receiver position determination techniques is listed here. The receiver has an a priori rough estimate of its position and the associated uncertainty. This a priori estimate of position is established such as by any one or combination of any of the following:

1. If the receiver has computed a position in the past, one method evaluates an estimate of its current position as the last or most-recently computed position. An extrapolation from that most-recently computed position can also be applied to estimate the current position if a velocity (and/or acceleration) estimate is available. The uncertainty of this estimate grows as the time increases or lengthens since the last computed position.

2. If five (5) or more satellites are available, the receiver generates an initial position estimate using SFT (Solve for Time) as in FIG. 8. This initial position is used as a starting point for applying some embodiments of the present invention to then find accurate satellite time and perform a much more accurate non-SFT fix.

3. By observing the frequency at which each of plural satellite signals are received, the receiver performs Doppler based positioning operations to derive a coarse estimate of its position. The coarse estimate may be accurate to within several hundred meters, and depends on the particular Doppler based positioning operations employed. See, for instance, a Doppler-based positioning approach in Hill, J., "The Principle of a Snapshot Navigation Solution Based on Doppler Shift," ION GPS 2001, 14th International Technical Meeting of the Satellite Division of the Institute of Navigation, Sep. 11-14, 2001. Doppler Positioning with GPS, Master of Science thesis, 2002, by A. Lehtinen, Tampere University of Technology, Finland, is another background reference, see URL: http://math.tut.fi/posgroup/DopplerPositioningwithGPS.pdf Once the receiver has supplied a position estimate using for example one or more of the above processes, the receiver then performs positioning operations as taught herein and computes $D_S$ and $d_S$ updates that feed back into subsequent positioning operations as the last or most-recently computed distance to each satellite and uncertainty therein.

In FIG. 4, a flow as follows derives Satellite Time from the word position once the word position has been ascertained. Steps 4 and 5 below implement one flow version for step 270 of FIG. 4:

Step 1: Preliminary receiver operations.
Step 2: The receiver has a priori knowledge of the following:
 a. The current time at the receiver is $T_R$ and is known within an accuracy of $+/-\tau_R$
 b. Distance to satellite from the receiver is $D_S$ and is known within an accuracy of $+/-d_S$
Step 3A (220): Using the above, the receiver calculates its estimate of satellite time $t_S$ as:

$$t_S = t_R - (D_S/c_L)$$

And its estimate of the associated uncertainty $\tau_S$ in the knowledge of satellite time $t_S$ is:

$$\tau_S = \tau_R + (d_S/C_L)$$

(where $c_L$ is speed of light)
Step 3B (225): The receiver then computes an expected grand total word count as $$n = \text{round}(t_S/0.6 \text{ sec}).$$

The receiver also computes the uncertainty k in the word index n as $$k = \text{ceil}(T_S/0.6 \text{ sec})$$

Step 4 (270): Based on similarity metric comparisons with estimated parameters $P^{est}_{n-k}, P^{est}_{n-(k-1)} \ldots P^{est}_n, P^{est}_{n+1}, \ldots P^{est}_{n+k}$, find the index among the set: {n–k, n–(k–) . . . n, n+1, . . . n+k} for the estimated parameter which maximizes the similarity metric C. This index is the true grand total word count and is represented by $n_{true}$ or n+j.

Step 5 (270): The accurate satellite time $T_S$ is then computed as $$T_S = n_{true} * 0.6 \text{ secs}.$$

Figure 5:
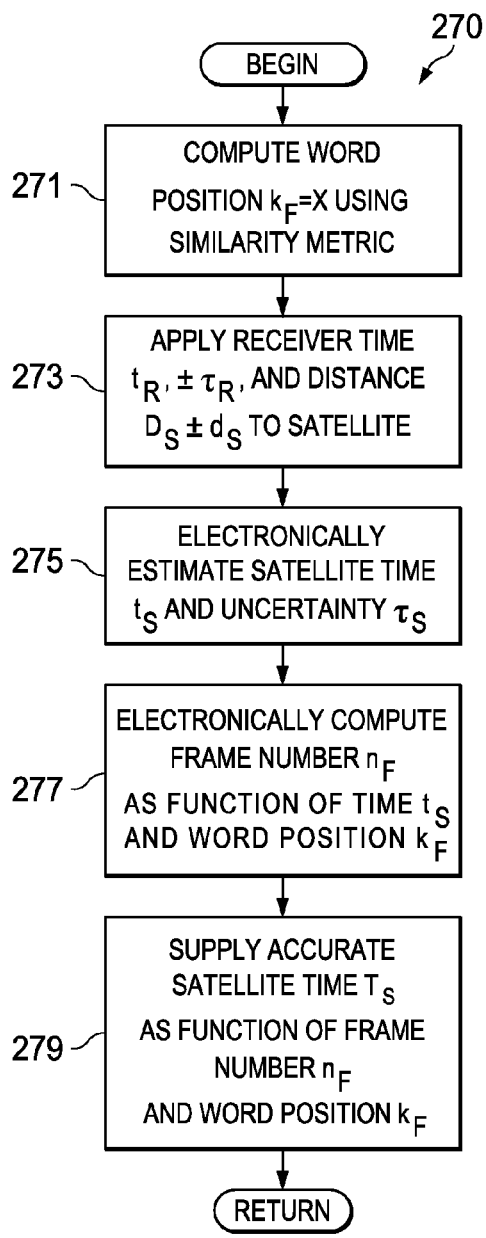
FIG. 5 is a flow diagram of an inventive process of operation detailing a step in FIG. 4 for supplying Satellite Time from a determination of word position and frame number.

FIG. 5 illustrates another embodiment or structure or process therein that derives Satellite Time from the word position once the word position has been ascertained. FIG. 5 is a detail of an alternative flow for step 270 of FIG. 4. As noted, GPS satellites transmit navigation data in 30 second frames, with the frame organized as in FIG. 3C repeating every 30 seconds. The frames are transmitted by each satellite at multiples of 30 seconds with the $n_F$-th frame being transmitted at 30 $n_F$ seconds (i.e. a new frame transmission starts at satellite time: 0, 30, 60, 90 . . . 30 $n_F$ . . . ).

Suppose that a given word of a frame has been received and the process and similarity metric in FIG. 4 have been applied so that the receiver 100 ascertains and generates the exact value of word index $k_F$ in whatever frame $n_F$ it is. Since each word in FIG. 3C is of duration 0.6 seconds in GPS, the $k_F$-th word starts or occurs at a time interval or displacement equal to 0.6 $k_F$ seconds from the time corresponding to the start of the frame or instant when the first bit of the first word in the $n_F$-th frame commences. (Contrast $k_F$ relative to beginning of frame with the earlier-above-used Equation (3) word uncertainty k that provides range-end values n±k relative to word n of expected approximate satellite time $t_S$.)

So the accurate satellite time $T_S$ corresponding to this word $k_F$ is of the form $30n_F + 0.6 k_F$, see Equation (15) hereinbelow. Given that the satellite time uncertainty $\tau_S < 15$ seconds, the frame index value $n_F$ is ambiguous by one frame at most when step 270 is reached because the current word $W_X$ might actually located in a frame adjacent to the frame to which the approximate satellite time $t_S$ points. Frame index value $n_F$ is then determined in step 270 to lead to and identify the exact satellite time $T_S$. This solution is performed by a process as follows, using the receiver local time $t_R$ maintained by receiver 100, and the approximate satellite time $t_S$ is accurate to within $+/-\tau_S$ seconds. Approximate satellite time $t_S$ is lagged behind the receiver local time $t_R$ due to propagation delay based on distance-to-satellite $D_S$:

$$t_S = t_R - (D_S/c_L) \quad (12)$$

Then as long as satellite time uncertainty $\tau_S$ is less than 15 seconds, receiver 100 in FIG. 5 evaluates and supplies the unknown frame index $n_F$ by electronically executing a process represented by Equation (13). Here round(x) is the closest integer to x.

$$n_F = \text{round}((T_S - 0.6 * k_F)/30) \quad (13)$$

In terms of approximate satellite time $t_S$, Equation (13) is expressed by Equation (13A), which includes an approximation to the argument of Equation (13) to deliver the same result $n_F$:

$$n_F = \text{round}((t_S + 0.6j - 0.6 * k_F)/30) \quad (13A)$$

Accordingly, a process embodiment in FIG. 5 has steps 271-279 to ascertain the word position $k_F$ and derive Satellite Time from the Equation (7) or (7.1) word position displacement j, or from word position $k_F$ itself, as follows:

Step 1 (271). Based on the similarity metric process (FIG. 4), receiver 100 deduces, identifies, or computes word position $X = k_F$ the most-nearly similar estimated parameter Pest, signifying that the $k_F$-th word in a frame is ascertained as the currently-received word $W_X$ being transmitted by satellite S.

Step 2 (273). The receiver has or obtains the following values for this process:
 a. The current time maintained at the receiver is $t_R$ with evaluated accuracy of $+/-\tau_R$.
 b. The distance to the satellite from the receiver is $D_S$ such as from Equation (9.1) and has an evaluated accuracy of $+/-d_S$ such as from Equation (9.2) and/or executing step 312 of FIG. 7.

Step 3 (275). Using the above values, receiver 100 electronically estimates an approximate satellite time $t_S$ as embedded in Equation (2.2):

$$t_S = t_R - (D_S/c_L) \quad (12)$$

Receiver 100 electronically estimates the associated uncertainty $\tau_S$ in its knowledge of approximate satellite time $t_S$ as:

$$\tau_S = \tau_R + (d_S/c_L) \quad (14)$$

where $c_L$ is speed of light, and Equation (14) corresponds to Equation (9).

Step 4 (277). Receiver 100 then computes frame number $n_F$ as a function of approximate satellite time $t_S$ and Equation (7) and (7.1) word position displacement j such as by the Equation (13A) function $$n_F=\text{round}((t_S+0.6j-0.6*k_F)/30). \qquad (13A)$$

Here round(x) is the closest integer to x.

In some embodiments, the estimated parameters Pest in Equation (3) are indexed by and associated to values of index j and used for comparison with currently received word $W_X$. When a match is declared in step 255 of FIG. 4, the value of index j is associatively electronically retrieved and applied in Equation (13).

Step 5 (279). Receiver 100 then supplies the accurate (exact time-of-week) satellite time $T_S$ corresponding to the start of the $k_F$-th word of the $n_F$-th frame by electronically evaluating Equation (15). In words, accurate satellite time $T_S$ here is the interval of time that has elapsed since the beginning time-of-week instant $T_S=0$ of the first bit of the first word of the first frame. The accurate satellite time $T_S$ is a function of frame number $n_F$ and word position $k_F$. The time of that beginning instant is also suitably added to the interval $T_S$ if desired to express time other than time-of-week.

$$T_S=30n_F+0.6k_F \text{ secs.} \qquad (15)$$

Note step 4 presumes that the time uncertainty $\tau_S$ (as computed in step 3 from Equation (14)) is less than the half the repetition rate for the parameter. Most parameters in GPS repeat once every 30 seconds (i.e., once every frame). So time uncertainty $\tau_S$ is suitably made or arranged to be less than 15 seconds. A few parameters (almanac parameters) repeat less frequently (once about every 13 minutes). For these, the time uncertainty $\tau_S$ is made or arranged to be less than 6.5 (or 13/2) minutes. Both of these restrictions or conditions on $\tau_S$ are not a problem in real GPS receivers because the a priori knowledge of time uncertainty $\tau_S$ within the receiver 100 will in most cases satisfy these conditions.

The implementer double-checks, and if necessary corrects, the Equations depending on the GNSS indexing of frames and words, such as whether the first frame of the week is called frame zero (0) or frame one (1) and whether the first word of each frame is called word (0) or word one (1). For purposes of Equation (15) as written, the first frame and first word are either assigned zero or converted to zero (by subtracting one (1)) so that Equation (15) returns $T_S=0$ for the beginning of the week and returns correct time of week for subsequent frames and words. Accordingly, various forms of rounding-to-integer operations such as round, round up and round down, etc. are used as appropriate. Note also, that if round up or round down are used instead of round to determine grand total word count n in Equation (2.2), then the similarity matching operations produce a respective different value of j for Equation (7.1) that makes the sum n+j the same for a same received word.

Regarding step 4 (277), some embodiments have the estimated parameters indexed by word position $k_F$ from their software and herein obtain the word position $k_F$ directly from the similarity process 235-255 and derive and compute the frame number $n_F$ directly from the word position $k_F$. An example procedure for doing this is described next.

Word position $k_F$ in the frame is given by Equation (13.1).

$$k_F=[\text{round}((t_S+0.6j)/0.6)]_{mod\ 50} \qquad (13.1)$$

An indirect method to obtain $n_F$ in terms of position $k_F$ is as follows. First, electronically compute an expected frame number $n'_F$ for frame of currently-received word $W_X$, based on approximate receiver time $t_S$. Expected frame $n'_F$ may be one frame away from the actual frame number $n_F$ of the frame in which currently-received word $W_X$ is actually situated.

$$n'_F=\text{ceil}(t_S/30)-1 \qquad (13.2A)$$

Expected word position $k_F^{EXP}$ in the frame is a special case of Equation (13.1).

$$k_F^{EXP}=[\text{round}(t_S/0.6)]_{mod\ 50} \qquad (13.2B)$$

Next, electronically compute word positions modulo relative to beginning of frame for the range-end index positions n+/-k of estimated parameter set $S_P$ of Equation (3).

$$k_F^{HI}=[\text{round}((t_S+0.6k)/0.6)]_{mod\ 50} \qquad (13.3)$$

$$k_F^{LO}=[\text{round}((t_S-0.6k)/0.6)]_{mod\ 50} \qquad (13.4)$$

Notice that due to the modulo operation, sometimes the low range-end n−k position may produce a higher word position value $k_F^{LO}$ in the frame than the word position value $k_F^{HI}$.

The following pseudocode (13.5) represents electronic operations for obtaining the actual frame number $n_F$ and completing this alternative process for step 277 of FIG. 5. Basically, the pseudocode recognizes the expected frame position $n'_F$ as correct ($n_F=n'_F$) unless certain inequalities are satisfied whereupon the actual frame position $n_F$ is established by adjusting the expected frame position up or down by unity (1). Various rearrangements of the pseudocode and alternatives thereto can also provide a variety of processes that compute the frame number $n_F$ directly from the word position $k_F$.

```
IF k_F^LO > k_F^HI AND k_F^EXP < 25                           (13.5)
THEN
    IF k_F <= k_F^HI THEN n_F = n'_F ELSE n_F = n'_F -1
ELSE
    IF k_F^LO > k_F^HI AND k_F^EXP >= 25
    THEN
        IF k_F <= k_F^HI THEN n_F = n'_F+1 ELSE n_F = n'_F
    ELSE n_F = n'_F
```

To compute an accurate position estimate, the receiver 100 desirably measures or generates the satellite time $T_S$ to a degree of accuracy on the order of a microsecond or less. So, if the a priori estimate of satellite time is not sufficiently accurate to support an accurate estimation of position, as is often the case, the problem is readily solved herein by embodiments to quickly find or ascertain the satellite time.

Note also that adapting the nomenclature of pseudocode (13.5) is useful for expressing some of the distinct earlier operations of step 230 in FIG. 4, which do not depend on the outcome of operations subsequent to step 230. Almanac parameters change frame by frame. To include in set $S_P$ of Equation (3) the correct estimated at almanac parameter(s) Pest transmitted by one satellite but that pertain to another satellite, operations such as the following can be included in that step 230. These operations at Equation (3.1) determine the satellite $S_A$ to which the estimated almanac parameter(s) are to apply. Then operations in step 230 access an existing table of almanac parameters for the various satellites and read/write only the estimated almanac parameter(s) for the actually-applicable satellite $S_A$ from the existing table into the electronically-prepared set of values or pointers thereto that are signified by set $S_P$ of Equation (3). That existing table of almanac parameters is suitably output from or derived from the Ephemeris Prediction software, and/or supplied by almanac information earlier received from satellite signals.

Let the particular number of existing satellites in the GNSS be designated $N_S$ for which the almanac data are sent in respective frames, and the particular expected satellite $S'_A$ for which almanac is sent in a given expected frame number $n'_F$ is $$S'_A=(n'_F)_{mod\, Ns} \tag{3.1}$$

Then, the nomenclature of pseudocode (13.5) is adapted here to provide step 230 pseudocode (3.2), (3.3) that instead speculatively loops on each almanac word position $k_F$ corresponding to any index i value in the time uncertainty range of the receiver, and discussed further hereinbelow.

```
IF k_F^LO > k_F^HI AND k_F^EXP < 25                              (3.2)
THEN
    IF k_F <= k_F^HI THEN S_A = S'_A ELSE S_A = (n'_F - 1)_mod Ns
ELSE
    IF k_F^LO > k_F^HI AND k_F^EXP >= 25
    THEN
        IF k_F <= k_F^HI THEN S_A = (n'_F+1)_mod Ns ELSE S_A = S'_A
    ELSE S_A = S'_A
```

Let an existing table of estimated almanac parameters be organized as a function F accessible by the word position $k_F$ in the frame and by the satellite number $S_A$. Then that table F is accessed for each almanac parameter Pest(n+i) in the range [n−k, n−(k−1), . . . n+i, . . . n+k−1, n+k] by pseudocode (3.3) and completes a lookup procedure for almanac parameter(s). It is emphasized that this pseudocode (3.2) for almanac in FIG. 4 step 230 does not depend on subsequent results of similarity matching or any of the later operations in step 270, but is described at this point in this disclosure to facilitate a concise and conceptually orderly exposition. The value of $k_F$ for an almanac parameter position applied in $S_A$ pseudocode (3.2) is related to loop index or variable i as indicated in (3.3).

```
FOR i = −k to +k DO                                              (3.3)
    IF 45 <= k_F =[round((t_S+.6i)/.6)]_mod 50 <= 49   // Almanac
    Param 45-49 FIG. 3C
    THEN Pest(n+i) = F(S_A, k_F)
```

The above discussion describes one example of a process embodiment (3.3), (3.1), (3.2) for obtaining correctly-applicable almanac parameters to include in set $S_P$ in step 230 of FIG. 4.

Turning to still another process embodiment to support step 230, such other process alternatively helps the electronic circuit to select for an estimated parameter set a correctly-applicable estimated almanac parameter predictive of an almanac parameter transmitted by one satellite but that can pertain to another satellite. The table of almanac parameters is related to word positions in a frame, with some of the almanac parameters pertaining to one satellite and other almanac parameters pertaining to another satellite. In the alternative process, low and high range-end word positions are established based on the approximate time and time uncertainty to specify a range of the estimated parameter set. Then a loop is executed for each word position $k_F$ of an almanac parameter in the range. In this alternative process, the loop 1) determines a frame number $n_F$ for almanac purposes by electronically adjusting the estimated time from that word position $k_F$ to beginning of frame and rounding-to-integer a ratio of that adjusted time divided by a frame duration, i.e.

$$n_F=\text{round}((t_S-0.6k_F)/30). \tag{3.4}$$

As compared with Equations (13) and (13A), this Equation (3.4) has an argument that is also lagged back by subtracting 0.6 $k_F$ toward beginning of pertinent frame numbered $n_F$ but perhaps the argument in (3.4) less-closely approximates frame number $n_F$. However, because of the time uncertainty τ being less than +/−15 seconds in the receiver's approximate satellite time $t_S$, that argument in Equation (3.4) remarkably does still get rounded to the right frame number $n_F$. Also, word position $k_F$ for (3.4) in step 230 is generated by the loop rather than derived from the similarity matching subsequent to step 230 in FIG. 4.

2) This alternative loop then computes, as a function of the frame number $n_F$, a satellite number of the particular actual satellite $S_A$ to which that almanac word position pertains, such as by Equation (3.5) and free of pseudocode (3.2) adjustments.

$$S_A=(n_F)_{mod\, Ns} \tag{3.5}$$

3) This alternative loop then accesses the table of almanac parameters and writes from the table the estimated almanac parameter, having that word position in the almanac table for the satellite $S_A$, as a correctly-applicable estimated almanac parameter into the estimated parameter set.

In FIG. 6, a process for use as step 215 of FIG. 4 is depicted for finding and determining word alignment based on two or more visible satellites s and t. The GPS navigation data is sent as a stream of bits each 20 ms long. 30 such consecutive bits are grouped into a word. The 30 bits in a word consist of 24 data bits and 6 parity bits. The 30 bits of every word along with the 2 last bits of the previous word satisfy a set of equations called the parity check equations (defined in GPS ICD).

In FIG. 6, a step by step flow performs word alignment across multiple visible satellites to improve probability of correct word alignment for all of them. FIG. 6 shows an example flow chart for word alignment assuming two visible satellites, and the probability of correct alignment automatically improves as more satellites are used.

Finding the Word Alignment involves a process that tries all possible alignments and chooses the one which passes parity. With six parity bits, the probability P of a wrong alignment passing parity by random chance is $$P(\text{wrong alignment passing parity})=(1/2)^6=1/64. \tag{16}$$

In the worst case, 29 alignment possibilities (see next paragraph) will be tried out before reaching the correct alignment. The probability P of any of the 29 wrong alignments passing parity is:

$$P(\text{Any of the 29 wrong alignments passing parity})= 29/64. \tag{17}$$

The reason for 29 wrong alignment possibilities is discussed here. Given a stream of bits b1,b2, . . . , the receiver is operated to find where the 30 bit words start and end. There are 30 such possibilities for the alignment:
Possibility 1: The first word starts at b1, the next word starts at b31 . . .
Possibility 2: The first word starts at b2, the next word starts at b32 . . . and so on . . .
Possibility 29: The first word starts at b29, the next word starts at b59 . . .
Possibility 30: The first word starts at b30, the next word starts at b60 . . .
So, 30 possibilities for word alignment exist. Out of these 30 possibilities, only one of them is correct while the other 29 are wrong. Thus, 29 wrong bit alignment possibilities exist.

If there are two high power SVs visible, six more parity bits for the second satellite are independently involved as well as the six parity bits for the first satellite. The parity bits for the different GPS satellites are independent of one another for at least the reason that they send different ephemeris data that plays into parity and the GPS parity procedure builds on itself word after word so that checking parity in all the words is independent as between satellites. (A possible lack of independence may exist in the almanac subframes 4 and 5, and these subframes are suitably handled as discussed later hereinbelow by a Method 3 subprocess embodiment.) With parity independence, the chances of any particular wrong alignment passing parity are $(1/2)^6 * (1/2)^6$. So, the probability P of any of the 29 wrong alignments passing parity is:

$$P(\text{Any of the 29 wrong alignments passing parity}) = 29/(64*64) = 0.7\%. \quad (18)$$

With three SVs high power SVs visible the probability P of any of the 29 wrong alignments passing parity is:

$$P(\text{Any of the 29 wrong alignments passing parity}) = 29/64^3 = 0.01\%. \quad (19)$$

Accordingly, word alignment can be achieved as soon as one full word (600 ms) is received, and indeed with very low probability of error when multiple SVs are visible.

In FIG. 6, a word alignment process embodiment 215 monitors the incoming bit stream and identifies the word boundary. Once GPS receiver 100 acquires and tracks a satellite signal (say s), receiver demodulates the satellite s signal at a step 310 and sends a demodulated bit stream $b_{S,1}$, $b_{S,2}$, $b_{S,3}$ ... to the word alignment process. As soon as the first 32 demodulated bits ($b_{S,1}$ to $b_{S,32}$) have been received, a step 315 of the process hypothesizes that a word begins at $b_{S,3}$. (The first two bits previous to that hypothesized beginning word are assumed to belong to the previous word for parity equation purposes.) Hypothesizing means here that the circuitry electronically generates or issues at least one value (e.g., latest beginning bit index n in FIG. 6) for a subprocess and the results of the subprocess are compared with predetermined criteria to determine whether the results are electronically accepted. If not, new parameter values are generated, etc.

In a step 320, parity check equations are then computed for the 30 bits corresponding to this hypothesized word (bs,3 to bs,32) along with the last 2 bits of the previous word (bs,1 and bs,2). In general, and for bits relative to the beginning bit index n, the process of FIG. 6 applies, passes through, or subjects to the parity check verification procedure the following 32 bits for each respective satellite s, t, etc. that are expressed by the bit set: $\{b_{t,n-2}, b_{t,n-1}, b_{t,n}, b_{t,n+1}, \ldots b_{t,n+29}\}$. The beginning bit index n is an index defined locally to the context of FIG. 6 and is not to be confused with any other index n elsewhere herein. If the results of applying the parity check equations pass (are accepted by) a parity check decision step 325 for all or most of the satellites, the hypothesized word alignment is probably correct and is output at a step 335. If the results do not pass at step 325, the process branches to a loop repeat step 330 that increments loop index n to n+1.

In the GPS Parity Check procedure, each word is made up of 30 bits. The first 24 bits are the data bits and the remaining 6 bits are parity bits. Parity is suitably computed by the parity procedure for the GNSS standard procedure, one example of which is described in the GPS Interface Document. (See for example, FIG. 20-5 and pages 135-137 of the following reference: http://www.navcen.uscg.gov/pubs/gps/icd200/icd200cw1234.pdf, which describes a parity check process).

$$D_1 = d_1 \oplus D_{30}^*$$

$$D_2 = d_2 \oplus D_{30}^*$$

$$D_3 = d_3 \oplus D_{30}^*$$

...

...

...

...

$$D_{24} = d_{24} \oplus D_{30}^*$$

$$D_{25} = D_{29}^* \oplus d_1 \oplus d_2 \oplus d_3 \oplus d_5 \oplus d_6 \oplus$$
$$d_{10} \oplus d_{11} \oplus d_{12} \oplus d_{13} \oplus d_{14} \oplus d_{17} \oplus d_{18} \oplus d_{20} \oplus d_{23}$$

$$D_{26} = D_{30}^* \oplus d_2 \oplus d_3 \oplus d_4 \oplus d_6 \oplus d_7 \oplus d_{11} \oplus d_{12} \oplus$$
$$d_{13} \oplus d_{14} \oplus d_{15} \oplus d_{18} \oplus d_{19} \oplus d_{21} \oplus d_{24}$$

$$D_{27} = D_{29}^* \oplus d_1 \oplus d_3 \oplus d_4 \oplus d_5 \oplus d_7 \oplus d_8 \oplus d_{12} \oplus$$
$$d_{13} \oplus d_{14} \oplus d_{15} \oplus d_{16} \oplus d_{19} \oplus d_{20} \oplus d_{22}$$

$$D_{28} = D_{30}^* \oplus d_2 \oplus d_4 \oplus d_5 \oplus d_6 \oplus d_8 \oplus d_9 \oplus d_{13} \oplus$$
$$d_{14} \oplus D_{15} \oplus d_{16} \oplus d_{17} \oplus d_{20} \oplus d_{21} \oplus d_{23}$$

$$D_{29} = D_{30}^* \oplus d_1 \oplus d_3 \oplus d_5 \oplus d_6 \oplus d_7 \oplus d_9 \oplus d_{10} \oplus$$
$$d_{14} \oplus d_{15} \oplus d_{16} \oplus d_{17} \oplus d_{18} \oplus d_{21} \oplus d_{22} \oplus d_{24}$$

$$D_{30} = D_{29}^* \oplus d_3 \oplus d_5 \oplus d_6 \oplus d_8 \oplus d_9 \oplus d_{10} \oplus$$
$$d_{11} \oplus d_{13} \oplus d_{15} \oplus d_{19} \oplus d_{22} \oplus d_{23} \oplus d_{24}$$

where: $d_1, d_2, \ldots d_{24}$ are the source data bits the symbol (*) is used to identify the last 2 bits of the previous word of the subframe, $D_{25}, \ldots D_{30}$ are the computed parity bits $D_1, D_2, D_3, \ldots, D_{29}, D_{30}$ are the bits transmitted by the satellite, and $\oplus$ is the "Modulo-2" or "Exclusive-Or" operation.

Operations loop back from step 330 to hypothesizing step 315, and the loop proceeds to verify the next possible hypothesis: i.e., that a word begins at bs,4. This process continues every 20 ms when each new demodulated bit arrives until a hypothesized word is found that satisfies the parity check equations at step 325. When such word is found, operations proceed to an output step 335, and this alignment is taken or recognized as the true word alignment. Output step 335 suitably provides the output in any appropriate manner such as by entering the correctly aligned word in a register. In another version, the bits are held in a bit FIFO and output step 335 enters the value of beginning bit index n, for which the alignment passes the parity check, into a pointer register for the FIFO.

Since each word has 6 parity bits, there is a $1/2^6 = 1/64$ probability that the parity check equations pass when checking a hypothesis that does not correspond to the true word boundary. This can result in the process outputting an erroneous word alignment. Two ways, methods, or processes are used either alternatively or together to reduce this probability of false alignment to acceptable levels.

The reason why the probability P=1/64 of a wrong word alignment passing the parity check is discussed further here. Given any set of 30 consecutive bits there is a probability of 1/64 that this particular set of 30 bits pass the parity check process referenced above. This is because there are 6 parity bits that are binary bits (2 alternative equally probable values in a bit) and 2^6=64. This is true even if the 30 consecutive bits do not belong to one single word (i.e straddle two words). So if the 30 consecutive bits belong to a single word then the parity check process will pass with a probability of 1 or close to one (1). However, even if the 30 consecutive bits do not belong to a single word, there is a small probability (=1/64) that the parity check process passes.

Method 1: Suppose the hypothesis that a word begins at $b_{s,n}$ has been found to satisfy the parity check equations. If this hypothesis were correct, the next word is expected to begin at $b_{s,n+30}$. This hypothesis is electronically checked or verified using the parity check equations. If this verification passes step 325, the confidence in the correctness of the detected word alignment is increased. (Consequently the probability of this being a false alignment now reduces to $1/64*1/64 \sim 2 \times 10^{-4}$). Depending on the integrity needs of the application, this probability is in some embodiments or cases is further reduced, and confidence is increased, by checking the parity equations at subsequent word boundaries (i.e., words that are a multiple of 30 bits away from $b_{s,n}$).

Method 2: Note in Method 1 that, once a word alignment boundary has been found, further confirmation involves waiting for subsequent words to be demodulated at the receiver. A GNSS receiver desirably performs word alignment as soon as possible. If the receiver 100 is tracking multiple satellites at sufficiently high signal powers, then the word alignment hypothesis that has been found to satisfy parity for the bit stream from one specific satellite s can be verified against the corresponding demodulated bit stream from another satellite t. In FIG. 6 step 310, as an example, let bits $b_{t,1}$, $b_{t,2}$ . . . designate the bits in the bit stream from another satellite t that correspond to the bits. Ascertaining the actual bits that do correctly correspond to each other from the different satellites is performed by the process of FIG. 7 discussed later hereinbelow. Then, continuing the flow in FIG. 6, if the hypothesis of a word alignment at $b_{s,n}$ passes the parity check equations at steps 320, 325, this hypothesis is suitably verified by checking the parity check equations for the corresponding bits for satellite t ($b_{t,n}$). In general the more satellites that are visible over which the hypothesis can be confirmed, the less the probability of erroneously declaring or outputting a false alignment at steps 325 and 335.

In some versions of Method 2 herein, step 325 checks whether parity is satisfied for all satellites at an hypothesized word alignment, and if not satisfied for all, then operations proceed to the next beginning bit hypothesis. In some other versions of Method 2, step 325 instead checks whether parity is satisfied for more than half the satellites (e.g., 2 of 3, 3 of 4, 3 of 5, 4 of 6, etc.). If parity is satisfied for such absolute majority, then the hypothesis is adopted as the true word alignment for output at step 335, and the words from the satellites that satisfy parity are used for similarity comparison in FIG. 4 or 9. If parity is not satisfied for such absolute majority, then operations proceed to the next beginning bit hypothesis. The majority-type embodiment recognizes probabilities of both false-positive satisfaction of parity (discussed at length above) and false-negative failure to pass parity (which might occur if bit 29 or 30 of the previous word were corrupted). Depending on the magnitudes of the false-positive and false-negative probabilities, the amount of majority, super majority and/or unanimity is determined and applied in the embodiment.

In general, depending on the number of visible satellites and the integrity needs of the application, receiver 100 in some embodiments confirms word alignment using a combination of both Method 1 and Method 2.

Finding word alignment in sub-frames 4 and 5 involves the further consideration that sub-frames 4 and 5 have identical data across all satellites including parity. Therefore, the word alignment procedure described in Method 2 is suitably enhanced or augmented for these sub-frames 4 and 5. Regarding the independence assumption, bits 29 and 30 ripple through the words as the parity process builds on itself differently in different satellites because of their different ephemeris data. But this rippling is reset, interrupted or broken once every sub-frame (in the TLM word) by each satellite setting bit 29 and bit 30 to 0. Therefore, it appears that sub-frames 4 and 5 carry identical data across all satellites. See Global Positioning System Standard Positioning Service Signal Specification, 2$^{nd}$ ed., Navcen, Jun. 2, 1995. http://www.navcen.uscg.gov/pubs/gps/sigspec/gpssps1.pdf. There, the last row of FIG. 2-9 of Section 2.4.2.2 apparently shows the data bits 29 and 30 of the TLM word being set to 0.

The word alignment process herein addresses this possible lack of independence between satellites in subframes 4 and 5, which can affect the error rate. Method 1 can be or could be applied in combination. Once the process finds a possible candidate for word alignment in the form of a candidate output word that passes parity or its value of beginning bit index n, the process with Method 1 waits an additional 0.6 seconds to reconfirm the word alignment (with a false alarm rate about $p=2 \times 10^{-4}$).

An alternative to Method 1 desirably provides a subprocess for Method 2 called process Method 3 that overcomes the Method 1 overhead of 0.6 seconds with a possible but acceptably-modest increase in false alarm rate as follows. As soon as the word alignment process finds a possible candidate for word alignment, the process speculatively proceeds as usual to perform the similarity metric procedure of FIG. 4 or 9 as if (assuming) this is the right word alignment. If this method fails (i.e. a strong similarity match is not returned at step 255 (555)), the process of confirming word alignment in FIG. 6 continues (step 330) for each subsequent beginning bit and the similarity metric procedure is re-executed for the next-found parity-passing word alignment, if any. Method 3 can be conditioned on whether parameter set $S_P$ of Equation (3) includes any estimated almanac parameter and if so then Method 3 is executed. Or Method 3 can be executed regardless to check on word alignment. If and when the similarity metric process using this method passes step 255 (555), the word alignment used at such point is regarded as valid.

Regarding when the process of confirming word alignment continues, the next bit arrives in 20 ms. This means that little time is lost because a confirmed word alignment may likely soon be obtained on some soon-occurring next or subsequent bit even if a strong similarity match is not returned based on an hypothesized word alignment involving the current bit. Furthermore, pipelining or otherwise hiding some operations behind other operations in the process may be possible in some architectures to conserve the time needed to obtain a confirmed word alignment.

This Method 3 speculative procedure banks on the similarity metric procedure (FIG. 4 or 9) not returning a strong match (i.e. the thresh_1 or thresh_2 test will fail) when the word alignment is incorrect. To verify if this is true involves computing Prob(passing similarity check with wrong word alignment). This probability can be computed empirically across a large data set and pre-stored in the receiver during manufacture. Depending on the needs of the receiver as reflected in an error probability threshold, the process decides whether to proceed with Method 3 and speculatively perform similarity matching or to wait for word alignment reconfirmation according to Method 1.

Alternatively, the receiver computes the Prob(passing similarity check with wrong word alignment) in real time. Using the predicted ephemeris software, the receiver constructs its estimate of the almanac words (can be along with parity bits etc. too). The receiver uses this estimate to compute the Prob(passing similarity check with wrong word alignment). Since this probability is computed using the estimates of the currently valid almanac, this probability estimate is more realistic than a static pre-stored value. The probability of a wrong word alignment closely matching any specific word appears empirically to be about 1/1000. So, if the uncertainty in the word index is k, then the Prob(passing similarity check with wrong word alignment) is (2k+1)/1000 since the similarity metric process searches 2k+1 hypotheses: $P^{est}_{n-k}$, $P^{est}_{n-(k-1)} \ldots P^{est}_{n}$, $P^{est}_{n+1}$, $P^{est}_{n+k}$.

Figure 6A:
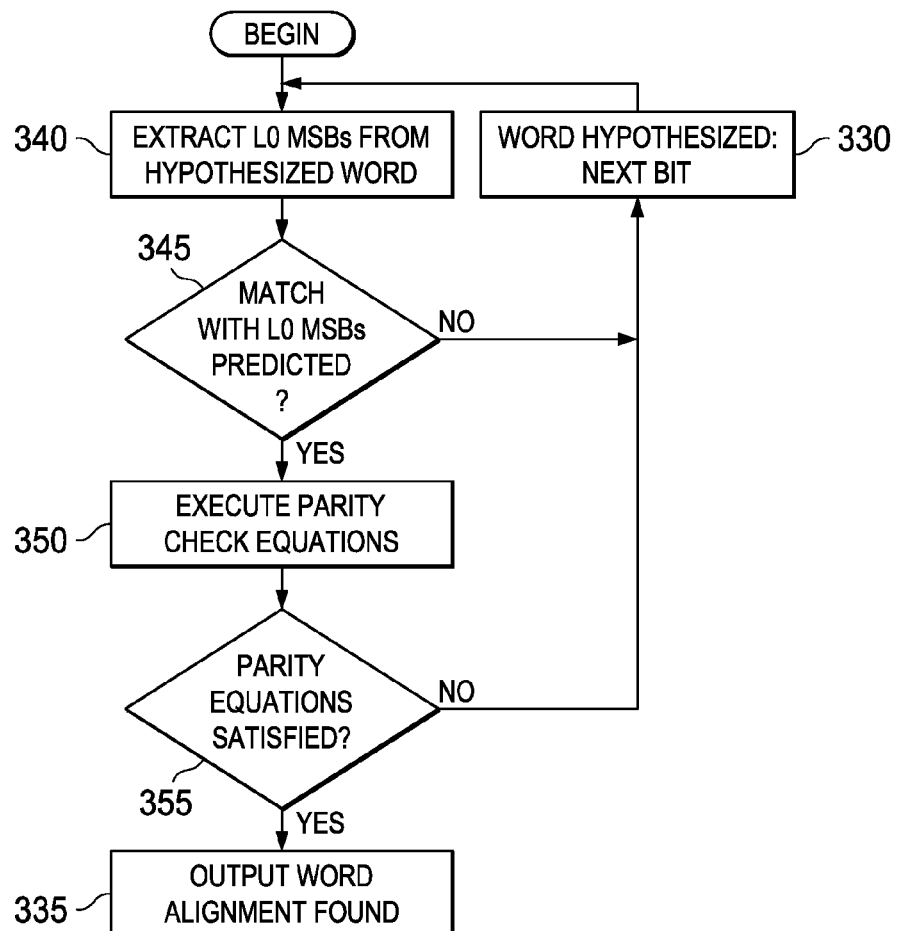
FIG. 6A is a flow diagram of another inventive word alignment process of operation.
Figure 11:
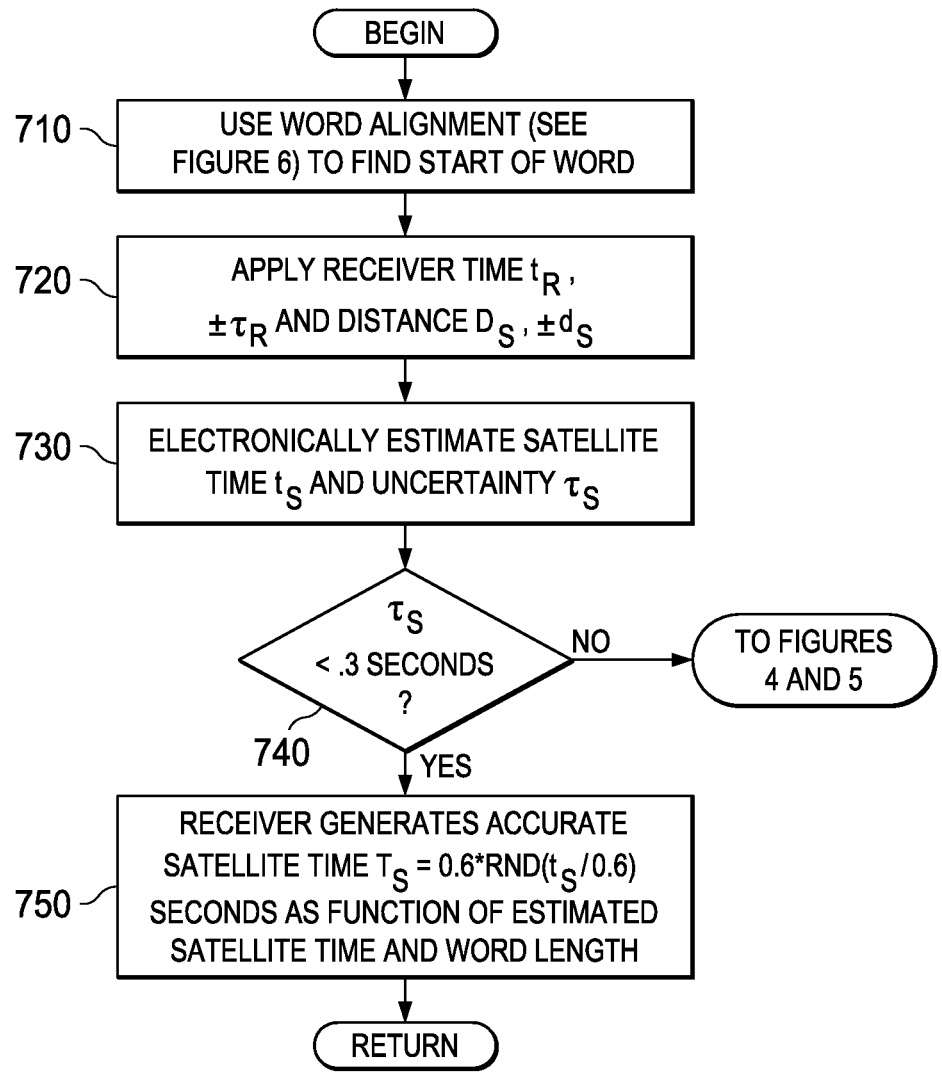
FIG. 11 is a flow diagram of an inventive process of operation for Satellite Time determination in a special case when time uncertainty is less than, e.g., 0.3 seconds and combinable with the process of FIG. 4.
Figure 11A:
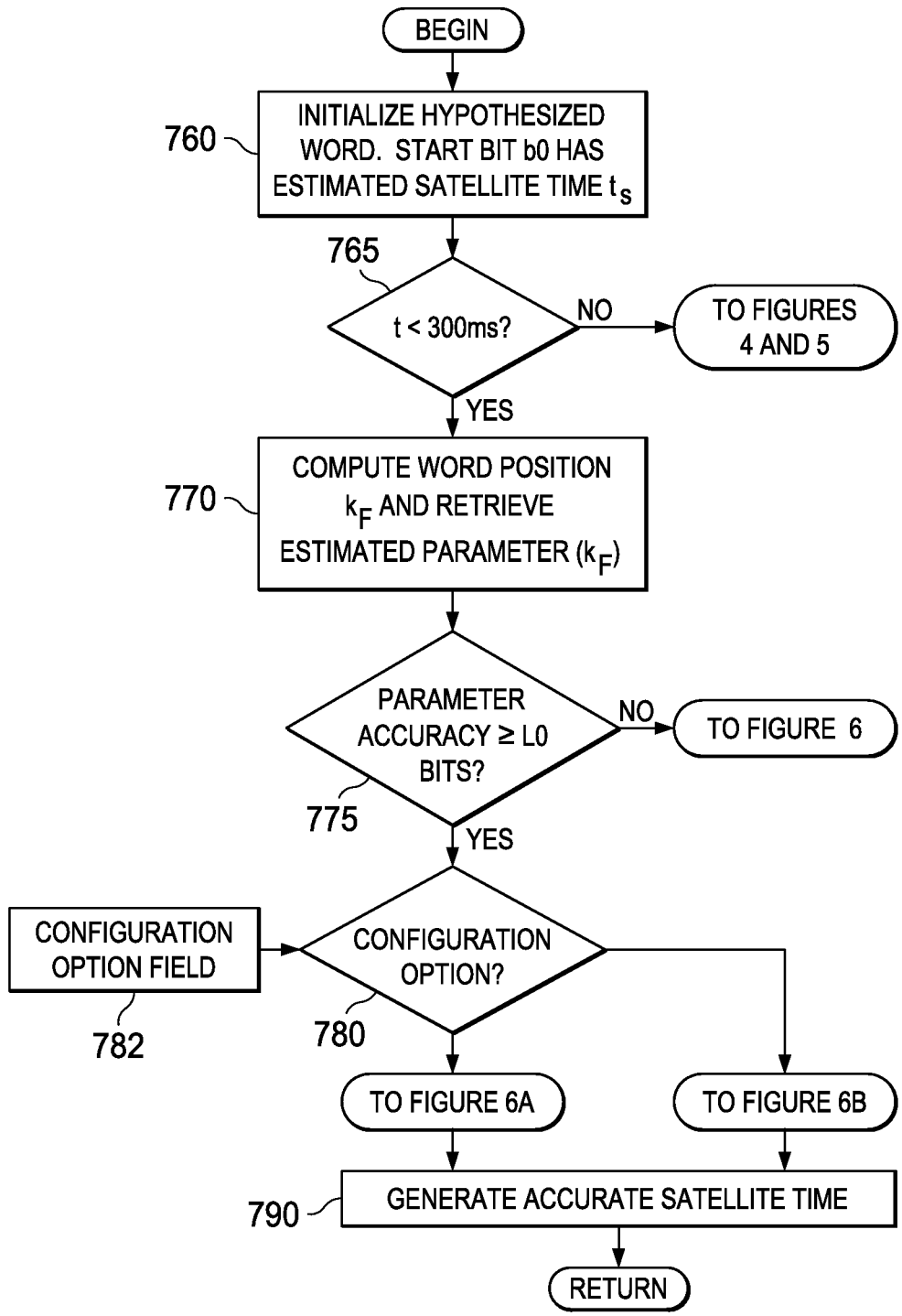
FIG. 11A is a flow diagram of an inventive process of operation for Satellite Time determination in a special case when time uncertainty is less than, e.g., 0.3 seconds and uses the word alignment process of FIG. 6A or FIG. 6B.

FIGS. 6A and 11A depict a further Method 4. As described for FIG. 6 Method 2, fast, reliable word alignment is derived from signals from multiple visible high powered satellites. When only one satellite is visible, Method 4 is detailed stepwise as follows. Method 4 is a special case of Method 3 for one satellite and time uncertainty τ<300 ms, so Method 4 is illustrated using FIG. 11A (7xx) regarding the time uncertainty τ<300 ms and using FIG. 6A regarding the word alignment Step 3.

Method 4:

Step 1 (760): Hypothesize that the word starts at bit b0. The start of bit b0 corresponds to and is used to identify the instant for which receiver enters estimated satellite time $t_S$ of that instant based on the receiver local timebase. As discussed elsewhere herein, the receiver evaluates and maintains a record of the value of time uncertainty τ associated with estimated satellite time $t_S$ so that time $t_S$ is known within time uncertainty τ.

Step 2 (765): If τ<300 ms, the parameter transmitted in the currently hypothesized word should be, and is computed as, the parameter corresponding to $k_F$=[round($t_S$/0.6)]$_{mod50}$. If τ is not <300 ms, then go to processes of FIGS. 4 and 5.

Step 3: If the parameter corresponding to $k_F$ is predicted by EPT to a predetermined accuracy of at least L0 bits (corresponding to a pre-specified low false error probability), the receiver then executes steps 3A and 3B. (If the accuracy is not met, go to Method 1.)

3A. Receiver step 340 in FIG. 6A extracts the L0 bits (MSBs) from the currently hypothesized word. The attributed word position $k_F$ from step 770 is used at step 340 for extracting the L0 MSBs of parameter value from the received bits of the currently hypothesized word. A step 345 checks whether the extracted L0 MSBs exactly match the L0 MSBs of the predicted parameter corresponding to word position $k_F$. The predicted parameter retrieved by step 770 has its L0 MSBs used at matching step 345 for comparison with the parameter value thus extracted.

3B. If Yes at step 345, Receiver step 350 executes the parity check equations and step 355 checks whether the parity check equations are satisfied for the currently hypothesized word. If both substeps 3A and 3B pass, then word alignment is declared at step 335, else operations of step 330 go back to Step 1 and hypothesize that the word starts at the next bit.

For a single word alignment hypothesis using a single satellite signal, the false alarm probability is reduced to $1/2^{(L0+6)}$ from $1/2^6$ based on using parity checking alone. This is because the probability $1/2^{L0}$ that the L0 extracted bits match the predicted parameter merely by chance is independent of and therefore multiplied by the probability $1/2^6$ that the received six bits regarded as parity bits in the hypothesized word alignment satisfy the parity equations merely by chance. For example, if L0=8, that false alarm probability is $1/2^{(8+6)}$=0.006%. A maximum of 29 false hypotheses are tried, so the maximum false alarm probability is $29/2^{(8+6)}$=0.18%. When multiple high powered satellites are visible, this false alarm rate probability is reduced even further if desired by using Method 2, see FIG. 6.

Method 5: The process embodiments hereinabove for word alignment either assume no bit errors during signal reception, or that bit errors simply delay the identification of the right word alignment. This works well for fairly high powered satellites (i.e. satellites with signal strengths stronger than perhaps −144 dBm). As an illustration, signal strengths from −130 dBm to up to −140 dBm are likely to provide virtually error-free word reception. At −143 dBm the probability of an error free word reception is estimated 99.4%, while at −144 dBm it is an estimated 98%. Thereafter the probability of a single error in word reception increases quite fast. For example at −146 dBm, the probability of error free word reception is only an estimated 82%. Along with a 16% probability of receiving a word with one error at −146 dBm, the remaining 3% accounts for words with 2 or more errors. So in general, a process embodiment which allows for identification of word alignment with at most one error in the received word is useful and confers a further improvement in reception of at least a couple of dBm. Word alignment and parameter matching when taken together as taught herein can do this with a level of false alarm rate that can be acceptable. Basically, for every word alignment hypothesis under consideration, Method 5 toggles one bit at a time and checks if the hypothesis with the single bit toggled passes the checks 3A and 3B in Method 4 above. In Method 5, step 3 of Method 4 is replaced by Step 3 with its special substeps of Method 5.

Figure 6B:
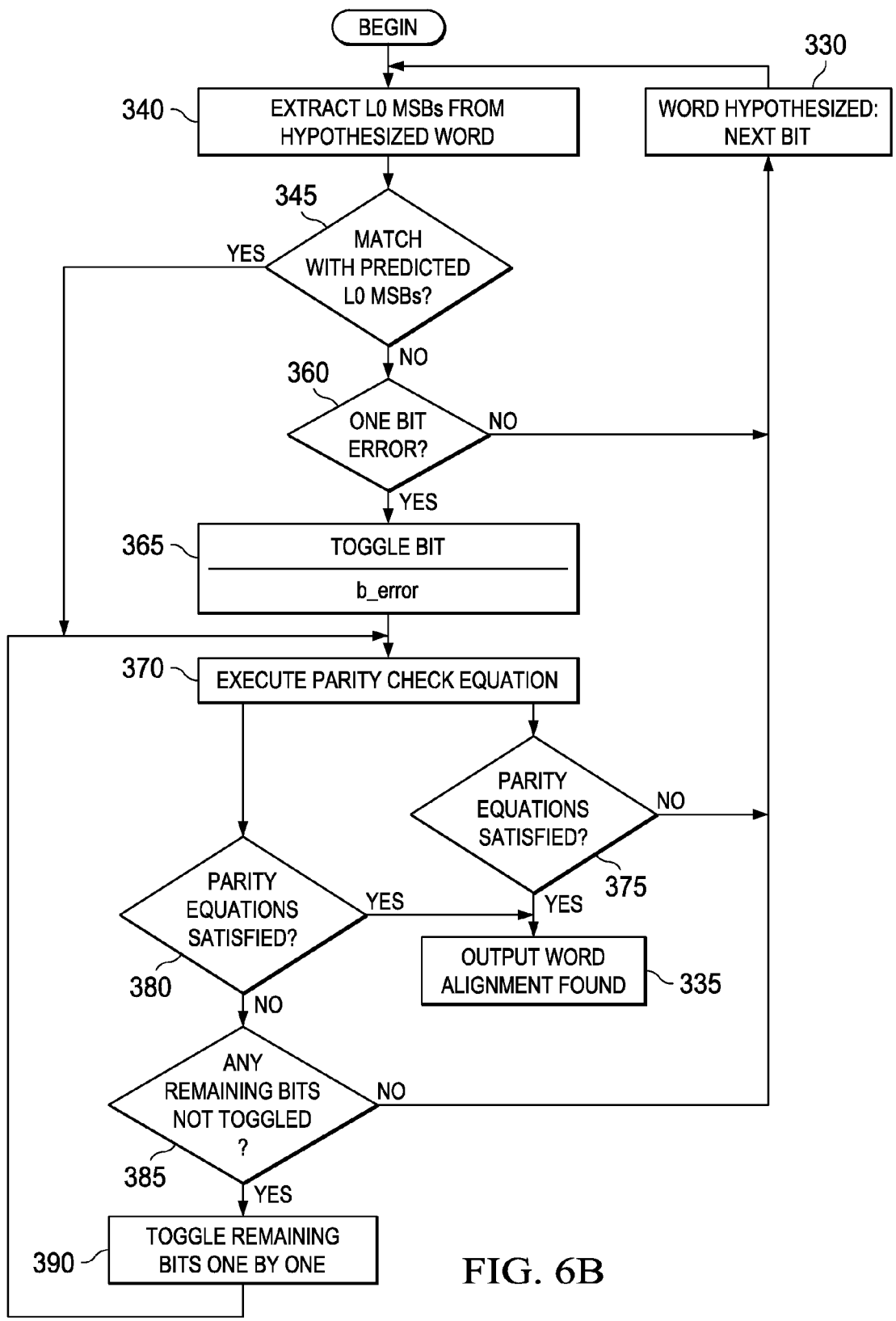
FIG. 6B is a flow diagram of another inventive word alignment process of operation.

FIGS. 6B and 11A depict Method 5, which is detailed stepwise as follows. Method 5 is a different special case of Method 3 for one satellite and time uncertainty τ<300 ms, so Method 5 is illustrated using FIG. 11A (7xx) regarding the time uncertainty τ<300 ms and using FIG. 6B regarding the Method 5 word alignment Step 3 and its substeps. Some other embodiments generalize Method 5 for other time uncertainties.

Method 5:

Step 1 (760): Hypothesize that the word starts at bit b0. The start of bit b0 corresponds to and is used to identify the instant for which receiver enters estimated satellite time $t_S$ of that instant based on the receiver local timebase. As discussed elsewhere herein, the receiver evaluates and maintains a record of the value of time uncertainty τ associated with estimated satellite time $t_S$ so that time $t_S$ is known within time uncertainty τ.

Step 2 (765): If τ<300 ms, the parameter transmitted in the currently hypothesized word should be, and is computed as, the parameter corresponding to $k_F$=[round($t_S$/0.6)]$_{mod50}$. If τ is not <300 ms, then go to processes of FIGS. 4 and 5.

Step 3: If the parameter corresponding to $k_F$ is predicted by EPT to a predetermined accuracy of at least L0 bits (corresponding to a pre-specified low false error probability), the receiver then executes steps 3A and 3B. (If the accuracy is not met, go to FIG. 6 or to Method 1.)

3A: Receiver extracts the L0 bits from the currently hypothesized word and compares them with the predicted parameter corresponding to word position $k_F$ from step 770 of FIG. 11A. Receiver step 340 in FIG. 6A extracts the L0 bits (MSBs) from the currently hypothesized word. The attributed word position $k_F$ from step 770 is used at step 340 for extracting the L0 MSBs of parameter value from the received bits of the currently hypothesized word. A step 345 checks whether the extracted L0 MSBs exactly match the L0 MSBs of the predicted parameter corresponding to word position $k_F$. The predicted parameter retrieved by step 770 has its L0 MSBs used at matching step 345 for comparison with the parameter value thus extracted. The comparison checks if these L0 bits match all the L0 MSBs of the predicted parameter exactly (Yes at step 345), and if not, apply a decision step 360 to determine if the L0 bits exactly match the L0 MSBs with the exception of at most one bit location (designated b_error). If Yes at step 360, operations proceed from step 360 to Step 3B (365), else operations go back via step 330 to Step 1 and hypothesize that the word starts at the next bit.

3B_1: If step 3A had one error (in location b_error), then operations perform a step 365: Toggle the bit b_error. Then a step 370 computes the parity equations, and a decision step 375 checks whether the word hypothesis passes the parity equations. If so, word alignment is declared at step 335, else operations go from No at step 375 back to Step 1 via step 330 and hypothesize that the word starts at the next bit.

3B_2: If step 3A (345) matches the L0 MSBs with no error (Yes), then step 370 computes the parity equations, and a decision step 380 checks whether the word hypothesis passes the parity equations.check whether the current word hypothesis passes the parity equations. If Yes at step 380, word alignment is declared at step 335. If No at step 380, one of the remaining bits of the word is possibly in error. The number of remaining bits is expressed by the difference 30−L0. Operations branch from No at step 380 to a loop checking step 385 and then to a step 390 to toggle the remaining bits one at a time, each time verifying with steps 370 and 380 if the parity equations pass. If toggling of any single bit results in all the parity equations passing, then step 380 determines Yes, and word alignment is declared at step 335. If No at step 380, loop step 385 determines whether any remaining bits are yet to be toggled. If Yes at step 385, then toggling step 390 is executed and the loop proceeds until success at step 380 or the loop is exhausted. If step 385 determines "No," meaning the loop is exhausted, then operations go back to Step 1 via step 330 and hypothesize that the word starts at the next bit.

For a single word alignment hypothesis, the false alarm probability is $P=30/2^{(L0+6)}$. The multiplication by 30 is used because parity checking and parameter matching are performed with each of the 30 bits in the word toggled one at a time. With L=8, this per-hypothesis false alarm probability is 0.18%. With as many as 29 possible wrong alignments, the false alarm probability can translates to a possibly-undesired 29*P=5.5%. However, even with a single additional satellite visible, the false alarm probability or rate for 29 hypothesized alignments reduces to an acceptable $29*P^2=0.01\%$. Method 5 is then used with signals from multiple satellites to dramatically reduce and contain the false alarm rate.

In a further-improved Method 5A, only some of the bits are selected for a step 385 set of remaining bits for toggling in step 390. In Method 5, every remaining bit is toggled in turn by step 390 for step 380 to check if the parity check equations pass because a single bit error can be located anywhere in the word. By contrast, in Method 5A, fewer than all the bits are identified for a smaller set of selected bits to be toggled by step 390, which reduces the false alarm probability. A quality metric is assigned to each bit, such as by using the instantaneous signal strength (or function thereof) for that respective received bit, or the error signal output from the baseband PLL. Method 5A step 385 identifies bits with quality metric below a certain threshold as most likely to be in error and hypothesizes that the single erroneous received bit is among only the identified received bits with quality metric below the threshold. That way, Method 5A step 390 only toggles the identified received bits with quality metric below the threshold.

Figure 7:
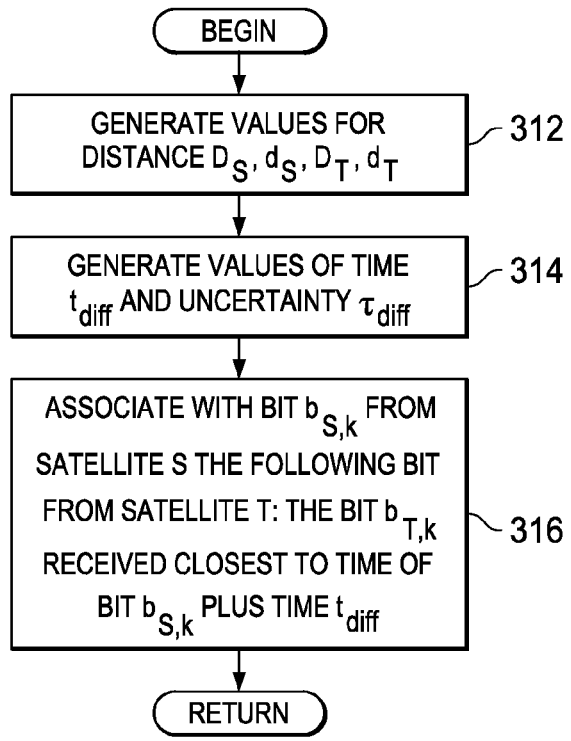
FIG. 7 is a flow diagram of an inventive process of operation detailing some steps left implicit in FIG. 6.

Turning to FIG. 7, and in connection with FIG. 6, an important subtlety recognizes the transmission from all GPS satellites are perfectly synchronized. So a particular bit $b_k$ is transmitted at the same time by all satellites. (This bit index k is defined and understood locally to the context of FIG. 7.) The kth bit as transmitted by one satellite s is designated $b_{s,k}$ and the corresponding bit transmitted by another satellite t is designated $b_{t,k}$. However, because different satellites can be and usually are at different distances from the receiver 100, the bit $b_{s,k}$ from satellite s and the bit $b_{t,k}$ from satellite t reach the receiver at different times. FIG. 6 also involves a process of FIG. 7 having process steps 312, 314, 316 wherein receiver 100 associates bit $b_{s,k}$ from one satellite s with the same or corresponding bit $b_{t,k}$ from another satellite t. This association is derived by a process subpart or embodiment as follows:

Step 1 (312): Using its a priori information, receiver 100 computes or already has the following:

a. The distance $D_S$ to the satellite s from the receiver and the associated accuracy $d_S$;

b. The distance $D_T$ to the satellite t from the receiver and the associated accuracy $d_T$.

Step 2 (314): Receiver 100 then computes an estimate of the difference $t_{diff}$ in time of travel from each of the satellites to the receiver as $$t_{diff}=(D_T-D_S)/c_L \qquad (20)$$

where $c_L$ is the speed of light. The distance difference is expressed in Cartesian coordinates by Equation (20.1) or is otherwise appropriately written when the coordinates are in another type of coordinate system.

$$(D_T - D_S)^2 = \sum_{i=1}^{3} (x_{iT} - x_{iS})^2 \qquad (20.1)$$

The associated uncertainty $\tau_{diff}$ in this estimation is:

$$\tau_{diff}=(d_T+d_S)/c_L. \qquad (21)$$

Step 3 (316): For a given bit $b_{s,k}$ received from satellite s, the receiver 100 operations are arranged to include estimation uncertainty $\tau_{diff}$ since the corresponding bit from satellite t is delayed by the difference in time of travel from each satellite to the receiver, approximated by $t_{diff}$. The bit edge that is received closest to this delayed instant is the bit $b_{t,k}$ that in operation is and should be associated with $b_{s,k}$. Note that this method works well when uncertainty $\tau_{diff}$ is less than 10 ms (half the 20 millisecond duration of a bit). This time uncertainty condition ($\tau_{diff}$<10 ms) translates to a distance uncertainty condition expressed by $(d_T+d_S)$<3000 km, using Equation (21) $\tau_{diff}=(d_T+d_S)/c$ and $c=3\times10^5$ km/s. The distance uncertainty condition $(d_T+d_S)$<3000 km is unproblematic in most use cases. The receiver provides significantly more accuracy than that because its prior operations using its albeit-approximate time base and ephemeris-based computations deliver the satellites' position coordinates $x_{iT}$ and $x_{iS}$ with fully-adequate accuracy for the purposes of Equation (20.1) or its equivalent. The foregoing sentence refers to prior operations that compute the position of a satellite from its orbit parameters such as ephemeris at or substantially at approximate time $t_S$, based on the orbit physics and as known to the art and unnecessary to tediously detail in this concise description. Satellite position is computed beforehand for each given satellite T and S for Equation (20.1).

Once the association between the bit streams from different satellites is established using the above process of FIG. 7, the process flow of FIG. 6 then proceeds to do word alignment across multiple satellites.

Figure 8:
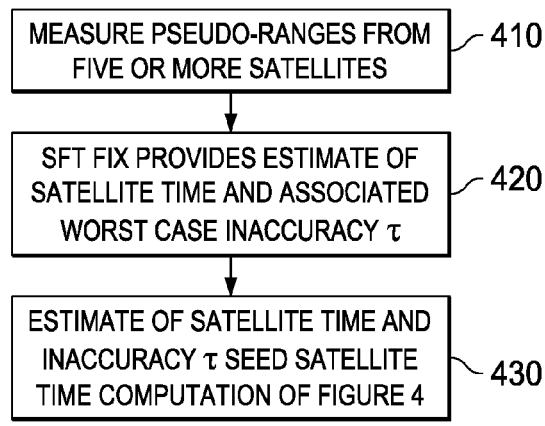
FIG. 8 is a flow diagram of an inventive process of operation for supporting the process of FIG. 4 using a Solve For Time (SFT) method.

In FIG. 8, a process embodiment seeds the FIG. 4 operations using an SFT coarse time estimate for approximate satellite time $t_S$. Without SFT, a GPS receiver takes measurements from at least four (4) satellites in FIG. 1 in order to compute an independent position solution. Four (4) satellites are involved because the GPS receiver solves its navigation equations (1) for four unknowns: the receiver coordinates $X_{iR}$ in the three (3) dimensions of the user position and the unknown clock bias e in the receiver clock relative to GPS atomic time. (The clock bias e is solved for before giving a position solution, because an unknown clock bias results in erroneous measurement in the time of travel between the satellite and user). In addition, the receiver 100 is arranged and improved with operations that rapidly obtain accurate satellite time $T_S$ and leverage access to predicted ephemeris data, and use SFT to seed its operations.

In FIG. 8, Solve For Time (SFT) allows the GPS receiver to give a position solution and approximate satellite time $t_S$ solution without prior exact knowledge of satellite time $T_S$. SFT uses signals from five (5) or more satellites (instead of 4) in FIG. 8 step 410 to measure pseudoranges (rho) defined as $\rho_S = c_L (t_{RS} - t_S)$ from each. SFT is executed in a step 420 to solve for the additional variable of satellite time $t_S$. The five solved-for SFT unknowns and the output of the SFT process include an estimate of the receiver position, estimate of the receiver clock bias e and an estimate of satellite time $t_S$. In general, the quality or accuracy of the position solution with SFT is less than a solution that is based on or uses a demodulated satellite-transmitted value of satellite time $T_S$. If the receiver 100 is using EPT, also called Extended Ephemeris (EE) herein, the accuracy of the estimated ephemeris declines with time, leading to declining accuracy of the position solution too.

In FIG. 8, SFT is nevertheless desirably leveraged and utilized herein to get or derive a coarse estimate of satellite time, expressed as a pair of values of time $t_S$ and time uncertainty r in step 420 and used as discussed in FIG. 4. In most cases, this coarse estimate $t_S$ of the satellite time has an accuracy or uncertainty τ of the order of several hundreds (100's) of milliseconds (ms). This uncertainty τ is or can be significantly smaller than the receiver a priori estimate of uncertainty τ, wherein the a priori uncertainty estimate could be several seconds.

Accordingly, some embodiments leverage, employ and use SFT to get a better (smaller or reduced) estimate of time uncertainty τ. Such embodiments use this time estimate to narrow the probability of false outputs. In FIG. 4, a smaller value for τ results in a smaller value for word uncertainty number k for step 225, where k=ceil(τ/600). This smaller value for τ directly reduces the number of word hypotheses to be searched for (Wn−k, Wn−(k−1) ... Wn, Wn+1, Wn+k), which confers a lower probability of false matches.

In FIG. 8, SFT is employed in receiver 100 to find a better initial estimate $t_S$ of satellite time. In a step 410, the receiver 100 measures pseudoranges from five (5) or more satellites. Then in step 420, the receiver performs an SFT fix that provides an estimate of the satellite time. The SFT also provides an associated worst case inaccuracy value, i.e., a value of the time uncertainty τ in step 420. The value for τ is converted to a value for word uncertainty number k in step 225, where k=ceil(τ/600). As noted, this value for k establishes and reduces the number of word hypotheses to be searched in FIG. 4 steps 235-250 for (Wn−k, Wn−(k−1) ... Wn, Wn+1, Wn+k). In other words, using SFT to reduce this time uncertainty of ±τ ms corresponds to reducing the numerical uncertainty value of ±k words (where k=τ/600) in the word position of the current word being transmitted in the predetermined word sequence. The estimate of satellite time $t_S$ and the word uncertainty number k are used to complete the accurate satellite time $T_S$ computation described in connection with FIG. 4. In this way, the estimate of satellite time $t_S$ and the inaccuracy value τ are used by FIG. 8 step 430 to seed the satellite time computation of FIG. 4.

Using SFT, an example of computing maximum satellite vehicle SV time uncertainty τ is as described as follows. First, a way in which an SFT fix is computed is described in connection with Equations (1), (22), (22.1) and (22.2). Equation (1) is rearranged to be in quadratic equation form (1A) in terms of pseudorange $\rho_S$, where $\rho_S = c_L (t_{RS} - t_S)$ by definition.

$$\rho_S^2 + (2c_L e)\rho_S + [(c_L e)^2 - D_S^2] = 0 \qquad (1A)$$

Then Equation (1A) is solved for pseudorange $\rho_S$ to deliver the form (1B).

$$\rho_S = -c_L e + \sqrt{D_S^2} = -c_L e + \sqrt{\sum_{i=1}^{3}(x_{i_S} - x_{i_R})^2} \qquad (1B)$$

For the N satellites S that are visible to the receiver, the receiver computes an N×5 augmented direction cosine matrix $H_{sft}$. Put another way, matrix $H_{sft}$ is an evaluated set of partial derivatives of pseudorange for each of N satellites with respect to the five SFT variables, as shown in Equations (22) and (22A) and ultimately derived from N instances of Equation (1B) for the N satellites. The first four (4) elements in each row of $H_{sft}$ correspond to the three (3) dimensions of the receiver position (x,y,z or $X_{1R}, X_{2R}, X_{3R}$,) and receiver clock bias e. For SFT, a fifth column of values is included in the matrix $H_{sft}$ and that fifth column contains values called range rates for the satellites respectively.

In the matrix $H_{sft}$, the rows are indexed on visible satellites S, and in general a row in $H_{sft}$ for a given satellite S is expressed by Equation (22) using Equation (1B) in terms of variables x, y, z, e, and $t_S$. Note that the receiver R position coordinates are x, y, z and the satellite S position coordinates are $x_S, y_S, z_S$.

$$H_{sft} = [-(x_S-x)/D_S, -(y_S-y)/D_S, -(z_S-z)/D_S, -c_L, \text{RangeRateSatS}] \qquad (22)$$

The range rate for satellite S is entered as the fifth entry designated RangeRateSatS and is the chain-rule partial derivative of Equation (1B) recognizing that the receiver coordinates x, y, z and satellite coordinates $x_S, y_S, z_S$ are all functions of satellite time. Note also that those six coordinates are relative to a Cartesian reference frame that remains fixed while the earth rotates and the satellites revolve in their orbits. The range rate is given by Equation (22A). If the bias error has a known or presumed trend over time, the term $-c_L \, \partial e/\partial t_S$ may be included, and otherwise the bias error is ignored and is either assumed relatively constant and/or its trend insignificant for range rate purposes:

$$RangeRateSatS = -c_L \frac{\partial e}{\partial t_S} + \sum_{i=1}^{3}\left( [(x_{i_S} - x_{i_R})/D_S] * \frac{\partial(x_{i_S} - x_{i_R})}{\partial t_S} \right) \qquad (22A)$$

Next, Equation (22.1) relates change of pseudorange fully in terms of matrix $H_{sft}$ and the changes of its variables in the manner of a total differential:

$$r = H_{sft} \delta \qquad (22.1)$$

The symbols for Equations (22.1 and 22.2) are listed next.

$r_1, r_2 \ldots r_S, r_N$ are the vector $r = \partial \rho_S$ of pseudorange residuals for the N visible satellites, the residuals being computed with respect to some a priori estimated values of the receiver R position $X_R=(x,y,z)$, receiver R clock bias e, and satellite time $t_S$.

pinv($H_{sft}$) is the 5×N pseudo-inverse of $H_{sft}$. Since $H_{sft}$ is not a square matrix, this inverse is called a pseudo-inverse or left-inverse because multiplying pinv($H_{sft}$)*$H_{sft}$ yields a 5×5 identity matrix.

δx, δy, δz, δe, $δt_S$ are the vector δ of changes or differences for updates to the a priori estimates of the SFT variables which are the three coordinates of the receiver position, receiver clock bias e and satellite time $t_S$.

The receiver 100 computes the SFT fix by Equation (22.2).

$$δ=\text{pinv}(H_{sft})*r \qquad (22.2)$$

Each pseudorange residual $r_S$ in vector r is established for use in Equation (22.2) by evaluating the actual value of departure from zero, call it $q_S$, of the left-side of Equation (1A) when substituting a starting value of pseudorange for that satellite S according to $ρ_S=c_L(t_{RS}-t_S)$. Equation (1A) is then solved with the right side equal to $-q_S$ to see what actual change in $ρ_S$ (i.e., the desired residual $r_S$) should be used to cancel out the departure from zero in Equation (1A). The result for constituting vector r to use in Equation (22.2) is given by Equation (22.3). The meters units are: $r_S$ (m.), $q_S$ (m²), $D_S$ (m.).

$$r_S=-q_S(2D_S) \qquad (22.3)$$

If the a priori estimate is very coarse, an iterative process is suitably implemented to recompute the entries for matrix $H_{sft}$ and residuals r after each iteration using current values of the five SFT variables adding the initial estimated value of each variable to the running total of changes δ found in each iteration for such variable by Equation (22.2) so far. The SFT output form of $H_{sft}$ suitably is the direction cosine matrix of the last iteration prior to convergence for Equation (22.2) being declared. The final values of the five SFT variables are established by adding the initial value of each variable to the changes δ found in each iteration by Equation (22.2). Convergence for Equation (22.2) is declared, for example, when the total non-zero value $$\sum_{S=1}^{N} \text{abs}(q_S)$$

of Equation (1A) at that iteration, or alternatively the total of percentage difference magnitudes between the right sides and left sides of a form of Equation (1), evaluated for all N visible satellites S is less than a predetermined small value.

Various forms of SFT software can be prepared or obtained and combined into embodiments herein, and the above SFT description is provided by way of example and not of limitation.

Upon completion of the Equation (22.2) iterations, a pseudorange accuracy vector ϵ (epsilon) of satellite-specific estimates of pseudorange accuracy (uncertainty) is used in Equation (23) to estimate an error vector E that expresses the error or uncertainty in the respective solution values for the SFT variables of receiver position $X_R=(x,y,z)$, receiver R clock bias e, and satellite time $t_S$. These errors in SFT variables constitute error vector E here and its respective entries are denoted by $x_{error}$, $y_{error}$, $z_{error}$, $e_{error}$ and $τ_{error}$. Satellite-specific values $ϵ_S$ for pseudorange accuracy in vector ϵ are entered as the respective maximum error for the measured pseudorange of each visible satellite S=1, 2, ... N). Then the maximum estimation error values of vector E are electronically computed using operations represented by Equation (23) as follows:

$$E=\text{abs}[\text{pinv}(H_{sft})]*ϵ \qquad (23)$$

Function abs individually takes the absolute value of all the elements of the matrix pinv($H_{sft}$). The various satellite-specific pseudo-range errors in vector ϵ combine through a matrix multiplication. The use of function abs recognizes that this combining is linear-additive regardless of minus signs in the matrix (compare Equations (20) and (21) for an analogy). Unknown delays in the ionosphere, troposphere, receiver tracking errors and multipath contribute to the magnitudes of the individual vector values $ϵ_S$ of the errors in pseudoranges. The major component of this pseudorange error is believed to be the multipath (in deep urban areas), which can be up to the order of a few hundred (100's) meters. The remaining sources of pseudorange error are believed to typically contribute a few tens (10's) of meters when taken together. Empirically, a value of 500 meters for each pseudorange error value $ϵ_S$ appears to provide a very safe upper limit even in deep urban areas. So choosing $ϵ_1, ϵ_2 \ldots ϵ_N$=500 m a priori and then computing $τ_{error}$ using Equation (23) when executing the SFT provide a satisfactory upper bound on satellite time uncertainty τ.

The value of error $τ_{error}$ from SFT error vector E is provided as a seed value of time uncertainty $τ_S$ elsewhere herein. The values of coordinate errors $x_{error}$, $y_{error}$, $z_{error}$ from SFT error vector E are combined and provided as a seed value of distance uncertainty $d_S$ elsewhere herein, and distance uncertainty $d_S$ based on the coordinate errors in error vector E as well as the iterated SFT coordinate estimates x, y, z is the weighted sum of the coordinate errors weighted by the direction cosines:

$$d_S=x_{error}*(x_S-x)/D_S+y_{error}*(y_S-y)/D_S+z_{error}*(z_S-z)/D_S \qquad (23.1)$$

In SAGPS, each predicted ephemeris also has less than perfect accuracy. Predicted ephemeris values and current time can be used to derive satellite coordinates $X_{iS}$ in Equation (1) and can affect the solution of the SFT equations. So giving an SFT fix by itself, based on the less-than-fully-accurate predicted ephemeris, without more, can result in some degradation of accuracy of the SFT fix when SFT is used alone. A non-SFT fix using decoded Satellite Time can be undesirably slow because it has to wait up to six seconds for the HOW word. A non-SFT fix using the teachings herein (e.g., FIGS. 4-9) provides a fast non-SFT fix and works even better when seeded, such as by an SFT fix. Finding satellite time quickly is thus very useful in this context. As taught herein, various embodiments enable a receiver with SAGPS to find satellite time significantly faster than by conventional methods, by extracting the ephemeris parameters from data broadcast from satellite(s) and comparing to known estimated parameters Pest from predicted ephemeris. Moreover, some of the embodiments herein are additionally assisted by SFT itself to reduce the time uncertainty and narrow down the Parameter Matching process for even better, faster and more accurate fixes.

Figure 9:
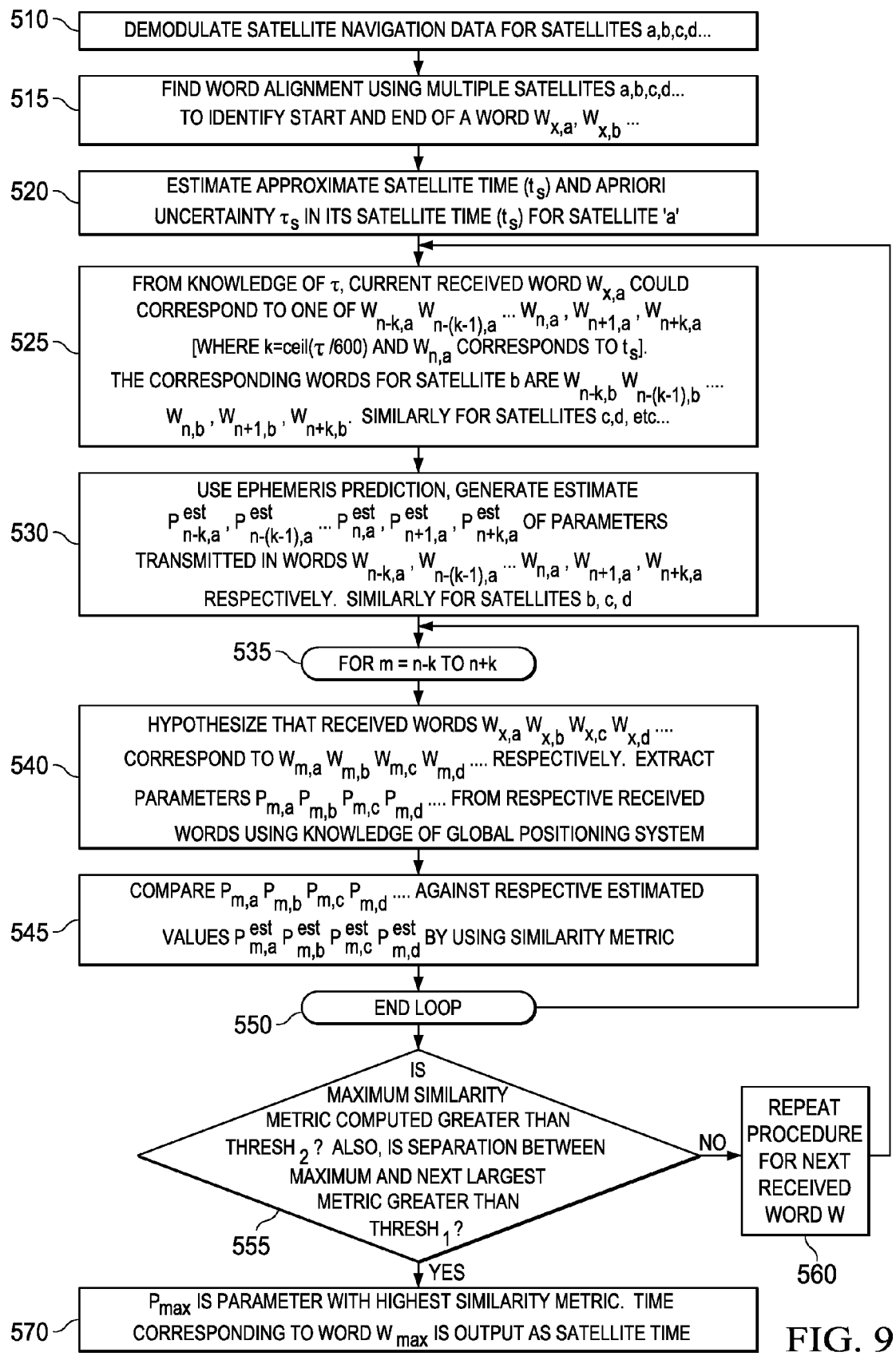
FIG. 9 is a flow diagram of an inventive process of operation for using multiple satellite signals and the parameters P of FIG. 3D to determine Satellite Time.

When the accurate satellite time $T_S$ is established using FIG. 4 or FIG. 9, then the pseudoranges are known constants, and the navigation Equations (1) are more accurately solved for the remaining four variables, consisting of receiver position coordinates x, y, z and the bias error e, by any suitable method by starting from a priori estimates of them. One such method is described by comparison with SFT but simpler.

Write as Equation (1C) the difference or residual $r_S$ between the right and left sides of Equation (1B) that is to be driven to zero.

$$r_S = -c_L e + \sqrt{\sum_{i=1}^{3}(x_{i_S} - x_{i_R})^2} - \rho_S \quad (1C)$$

Generate an N×4 matrix H by differentiating the right side of Equation (1C). The matrix H has its row for each satellite S given by:

$$H=[-(x_S-x)/D_S, -(y_S-y)/D_S, -(z_S-z)/D_S, -c_L] \quad (22.6)$$

Perform an iterative process wherein the receiver 100 computes the non-SFT fix by Equation (22.7) until the residuals become sufficiently small.

$$\delta = \text{pinv}(H)*r \quad (22.7)$$

The iterative process recomputes the entries for matrix H and residuals r after each iteration using current values of the five SFT variables adding the initial value of each variable to the running total of changes δ found in each iteration for such variable with Equation (22.7) so far. The final values of the four non-SFT variables are established by adding the initial value of each variable to the changes δ found in each iteration with Equation (22.7). Convergence for Equation (22.7) is declared, for example, when the total non-zero value $$\sum_{S=1}^{N} \text{abs}(r_S)$$

of Equation (1C) at that iteration, or alternatively the total of percentage difference magnitudes between the right sides and left sides of Equation (1B), evaluated for all N visible satellites S is less than a predetermined small value.

Various forms of non-SFT software module can be prepared or obtained. Such module is suitably combined into embodiments herein with or without seeding by SFT, and the above description of Equation (22.7) is provided by way of example and not of limitation.

The remarkable structure and process embodiments disclosed herein work faster and better when at least a few of the satellites have strong signals (e.g., above 144 dBm) because they are acquired faster. Using such processes also confers significantly lower power consumption in single fix sessions while not compromising on quality of fix. In one example, using an embodiment delivers energy savings of 55% less Energy per Fix. The mean TTFT (time to find Satellite Time) can be approximately 1.5 seconds in some embodiments compared to a fix that might otherwise take about 3.3 seconds on average.

Various embodiments are useful in difficult environments with intermittent visibility such as urban canyons and indoors. For another example, with 2 seconds of clear satellite visibility, an embodiment may yield a non-SFT fix 90% of the time, compared to a fix rate that might be only 50% and would translate to significant increase in TTFF in difficult environments otherwise. Put another way, an embodiment can confer a reduction in TTFF while not compromising on quality of fix as expressed by Circular Error Probability CEP. See TABLE 2.

TABLE 2

| Comparing SFT alone vs non-SFT | | | | | |
|---|---|---|---|---|---|
| | CEP 50 | CEP 66 | CEP 75 | CEP 90 | CEP 96 |
| SFT fix | 33 m | 48 m | 52 m | 209 m | 278 m |
| Non-SFT fix | 33 m | 39 m | 44 m | 58 m | 72 m |

CEP50 of 33 meters means that statistically 50% of all positions reported by the receiver will be within 33 meters of the true position. CEP90 of 209 meters means that statistically 90% of all positions reported by the receiver will be within 209 meters of the true position. Note the substantially larger errors of SFT alone relative to non-SFT in both of the CEP 90 and CEP 96 columns of TABLE 2. This TABLE 2 information suggests that positioning will more often be more accurate in meters according to the CEP metric if very accurate satellite time $T_S$ is obtained and used.

A non-SFT fix is a fix given with exact knowledge of Satellite time, and TABLE 2 underscores the advantages of doing a non-SFT fix. Embodiments herein find accurate satellite time $T_S$ even faster. These embodiments translate to more opportunities and situations in which it is desirable for the receiver to do a non-SFT fix or SFT-seeded fix as opposed to an SFT fix alone. An SFT-seeded fix is used as a starting point for the operations of some of the embodiments to more swiftly produce fixes with accuracies that are comparable to a non-SFT fix that waits for decoding the satellite time in the HOW word of FIG. 3C.

Some embodiments execute SFT and seed the FIG. 4 determination of Satellite Time $T_S$ when five (5) or more satellites are visible and DOP (Dilution of Precision) is sufficiently favorable according to a DOP threshold comparison or other decision criterion. Otherwise (with fewer than five visible satellites or insufficient DOP), such embodiments operate selectively to activate a non-SFT mode as in FIGS. 4-9 that decodes or deduces Satellite Time without SFT.

FIG. 9 shows an embodiment that operates to compute the similarity metric across satellites so that it generates the similarity using all simultaneously visible satellites. The confidence level of the match is further increased. The probability of a false alarm is further reduced.

In FIG. 9, the embodiment of FIG. 4 is augmented and generalized to include multiple adjacent word hypotheses and multiple estimations and determinations across satellites SVs, and across time. 5xx numbering in FIG. 9 parallels the 2xx numbering in FIG. 4 to facilitate comparison. For conciseness, parts of the description here tell how the FIG. 9 inference process differs from that of FIG. 4. In FIG. 4, the received word is compared against its various estimates (using estimated parameters generated from the ephemeris prediction software). A match is detected whenever the similarity metric exceed a threshold thresh2.

The system context for FIG. 9 is a satellite receiver as in FIGS. 2, 14 and 15 that has a front end to receive and convert plural received satellite signals. A correlator section supplies plural data signals from plural received satellite signals and the ephemeris data include a current ephemeris datum from each received satellite signal. A circuit, such as a memory or other store is accessed to provide electronic representations of predicted ephemeris parameters that approximate the ephemeris data in the data signal. The data processor MPU/SW of FIG. 2 uses the predicted ephemeris parameters to infer satellite time from time-corresponding ephemeris data from the satellite signals prior to the satellite time datum. The data processor performs a matching process as discussed for FIG. 9 comparing each such current ephemeris datum with a set of predicted ephemeris parameters pertaining to ephemeris for the corresponding received satellite signal. The accurate satellite time is identified as that satellite time common to a most-nearly-matching group of predicted ephemeris parameters pertaining to the same satellite time, one such predicted parameter from each set. This way the data processor infers satellite time from ephemeris data prior to the satellite time datum.

An embodiment in FIG. 9 demodulates satellite navigation data for plural satellites (e.g., a, b, c, d, . . . ) in a step 510. Step 515 uses the process of FIG. 6 to establish word alignment to identify the start of each word. If there are two high power SVs visible, the probability P(Any of the 29 wrong alignments passing parity)=29/(64*64)=0.7%. With three SVs high power SVs visible P(Any of the 29 wrong alignments passing parity)=29/(64*64*64)=0.01%. So word alignment can be achieved as soon as one full word (600 ms) is received (whenever there are multiple SVs visible). Step 520 is similar to step 220 and a priori computes or accesses the approximate satellite time $t_S$ and the a priori uncertainty (τ ms) therein.

Let $W_{X,a}$ $W_{X,b}$ $W_{X,c}$ $W_{X,d}$ . . . designate the received words that correspond to each other from satellites a, b, c, d etc. In steps 525 and 540, when using multiple satellites S=a, b, c, d, . . . to compute the similarity metric, the corresponding words from all these satellites are identified in step 525 and used in the steps 525-555. Even though the word transmissions from all GPS satellites are perfectly synchronized, these words may not arrive at the receiver at the same time. However, given the distance from the satellites to the earth and the length of each word, the corresponding words $W_{X,a}$ $W_{X,b}$ $W_{X,c}$ $W_{X,d}$ . . . from all satellites do arrive at the receiver about 30 ms within each other, which is much less than the length of the word 600 ms. Accordingly, to associate the corresponding word across satellites, and given a particular word $W_{X,a}$ received from a satellite at local time $t_R$, the set having that word from each of the other visible satellites that has a time of arrival closest to $t_R$ forms the set of corresponding words $\{W_{X,a}\ W_{X,b}\ W_{X,c}\ W_{X,d} \ldots\}$ from the satellites. Corresponding words from multiple satellites carry similar or same information. For example in the case of ephemeris data words, the corresponding word from all the satellites will carry the same ephemeris parameter but with a respective value specific to and for each satellite. In the case of almanac data, the corresponding word for all satellites carries exactly the same information (since almanac transmission is the same across all satellites).

In step 530, sets $S_{Pa}$, $S_{Pb}$, $S_{Pc}$, $S_{Pd}$ of the estimated parameters Pest for the word positions in the range n−k to n+k are accessed or generated by the receiver for each satellite signal. Analogous to steps 240 and 245 in the flow diagram for the single satellite case of FIG. 4, receiver 100 in step 540 of FIG. 9 hypothesizes that the received words $W_{X,a}$ $W_{X,b}$ $W_{X,c}$ $W_{X,d}$ . . . correspond to $W_{m,a}$ $W_{m,b}$ $W_{m,c}$ $W_{m,d}$ . . . respectively. The receiver then extracts the parameters $P_{m,a}$ $P_{m,b}$ $P_{m,c}$ $P_{m,d}$ from the respective received words using knowledge of the GPS ICD. In step 545, receiver 100 then compares extracted parameters expressed by $P_{m,a}$ $P_{m,b}$ $P_{m,c}$ $P_{m,d}$ . . . against respective estimated values $P^{est}_{m,a}$, $P^{est}_{m,b}$, $P^{est}_{m,c}$, $P^{est}_{m,d}$.

The respective estimated values $P^{est}_{m,a}$, $P^{est}_{m,b}$, $P^{est}_{m,c}$, $P^{est}_{m,d}$ for any particular value of index m are called a group herein. Each group of predicted ephemeris parameters pertains to a respective satellite time that is an instant in common to all the predicted parameters in the group, one such predicted parameter from each set $S_{Pa}$, $S_{Pb}$, $S_{Pc}$, $S_{Pd}$:

$$S_{Pa}=\{P^{est}_{n-k,a}, \ldots P^{est}_{m,a}, P^{est}_{n+k,a}\} \tag{3a}$$

$$S_{Pb}=\{P^{est}_{n-k,b}, \ldots P^{est}_{m,b}, P^{est}_{n+k,b}\} \tag{3b}$$

$$S_{Pc}=\{P^{est}_{n-k,c}, \ldots P^{est}_{m,c}, P^{est}_{n+k,c}\} \tag{3c}$$

$$S_{Pd}=\{P^{est}_{n-k,d}, \ldots P^{est}_{m,d}, P^{est}_{n+k,d}\} \tag{3d}$$

A most-nearly-matching group of predicted ephemeris parameters pertaining to the same satellite time is found by using the similarity metric procedure herein. (Pertaining to the same satellite time means, for instance, that the same satellite time in step 270 (570) would be derived from the index value for any one of the predicted parameters in a group if that group were determined to be the most-nearly-matching group, since the index value is the same for each Pest in the group.) A value of the similarity metric is computed from this comparison as elaborated below. In the hypothesis loop 530-550, the index m takes on each value in the range n−k to n+k.

As described earlier hereinabove in FIG. 4 for the single satellite case (e.g., S=a here), the similarity metric C for one satellite is defined for one example as: $C(P_{m,a}, P^{est}_{m,a})=L_a/N_a$, were $L_a$ is the number of consecutive bits starting from the MSB that match between $P_{m,a}$ and $P^{est}_{m,a}$ and $N_a$ is the total number of bits that is used to represent the parameter. Without limitation, an example of a corresponding metric for the multiple satellite case is defined as a similarity metric, i.e. a combined similarity metric, as follows:

$$C=(L_a+L_b+L_c+L_d)/(N_a+N_b+N_c+N_d). \tag{24.1}$$

Another version of this embodiment instead computes the similarity metric as:

$$C=L_a/N_a+L_b/N_b+L_c/N_c+L_d/N_d. \tag{24.2}$$

Still other versions of similarity metric are disclosed elsewhere herein. Similarity is declared at step 555 whenever the similarity C exceeds thresh2, and the ratio of the largest similarity value to the next largest similarity value exceeds thresh1. If the test of step 555 fails to pass, then operations loop back through loop step 560 to step 525 to process the next set of corresponding received words $W_{X+1,a}$ $W_{X+1,b}$, $W_{X+1,c}$ $W_{X+1,d}$ . . . . If step 555 fails, Method 3 for FIG. 6 is used in some embodiments so that the similarity metric process instead first goes to another parity-passing word alignment if any exists for the current words $W_{X,a}$ $W_{X,b}$ $W_{X,c}$ $W_{X,d}$ etc, passes through loop step 560 sooner to repeat the similarity metric procedure of FIG. 9, and determines whether any such word alignment for the current words can pass step 555.

Some ephemeris prediction software can, for most parameters, match about twelve (12) MSB's (most significant bits) of a 32 bit parameter. So thresh2 is expected to be about 12/32=0.375. A value of 0.3 appears to be suitable for thresh1 (i.e second largest metric is less than ⅓ the first largest metric). After step 555, a step 570 in FIG. 9 computes the accurate satellite time $T_S$ in a manner analogous to step 270 of FIG. 4.

Notice that threshold Thresh2 is compared with the closeness or similarity C value. That C value involves a ratio that has the total number of bits being compared in the denominator. So both the ratio for closeness C and the threshold Thresh2 are defined so that they are scaled or normalized with respect to the number of bits. Similarly, separation SEP threshold Thresh1 has this scaling built into it too. However, a smaller number of bits being compared means less confidence in the matching. Confidence is captured or comprehended in the computation of probability of false alarm described next.

Before declaring a similarity match, some embodiments include a test at step 255 (555) that computes a probability of false alarm. A match is declared at step 255 (555) if this probability is less than some predetermined threshold value thresh3 representing a sufficiently-low probability of false alarm desired for a given device or application, provided that any other test included in step 255 (555) is also passed. For example, a composite test can include C>Thresh2 & SEP>Thresh1 & Prob_false_alarm<Thresh3.

The probability of false alarm is calculated, e.g., for one satellite by Equation (25):

$$\text{Prob\_false\_alarm}=1/2^{La} \quad (25)$$

For multiple visible satellites probability of false alarm is computed by Equation (26):

$$\text{Prob\_false\_alarm}=1/2^{(La+Lb+Lc\ldots)} \quad (26)$$

Note that since the exponent La+Lb+Lc in Equation (26) is larger than in Equation (25), then the probability of false alarm is reduced, indeed exponentially reduced. Some embodiments that include this probability test express it in the monotonically related form La+Lb+Lc . . . >Thresh4 instead of Prob_false_alarm<Thresh 3.

In step 255 of FIG. 4 and step 555 of FIG. 9, the floor value for similarity is represented by threshold (thresh2) and used to establish a match between the predicted and transmitted ephemeris parameters. However, the Extended Ephemeris prediction software or other parameter prediction software may predict different parameters with different accuracies. Hence it is advantageous, while establishing matching, to provide an embodiment that uses different thresholds for different parameters because the accuracy of the prediction can depend on the parameter being predicted (as determined empirically). The thresholds can potentially also depend on the age of the ephemeris. So, for example, the software would be expected to predict better if it performs the prediction using ephemeris that is two days old versus using ephemeris that is four days old. The word coming in from the satellite(s) might be any of several different parameters for which Pest(n−k) . . . Pest(n+k) have different accuracies for which different thresholds could be established. So if the bit accuracy is different for different parameters, that fact can be reflected in the value statically or dynamically established for thresh2.

Figure 9A:
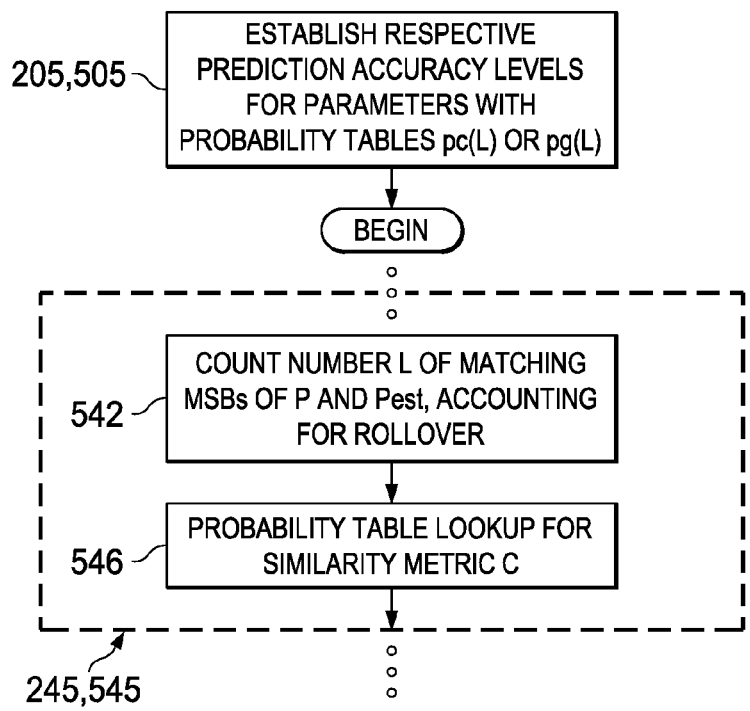
FIG. 9A is a flow diagram of an inventive process of operation for effectively establishing multiple thresholds for a similarity metric by introducing probability tables or functions into FIGS. 4 and/or 9.
Figure 12:
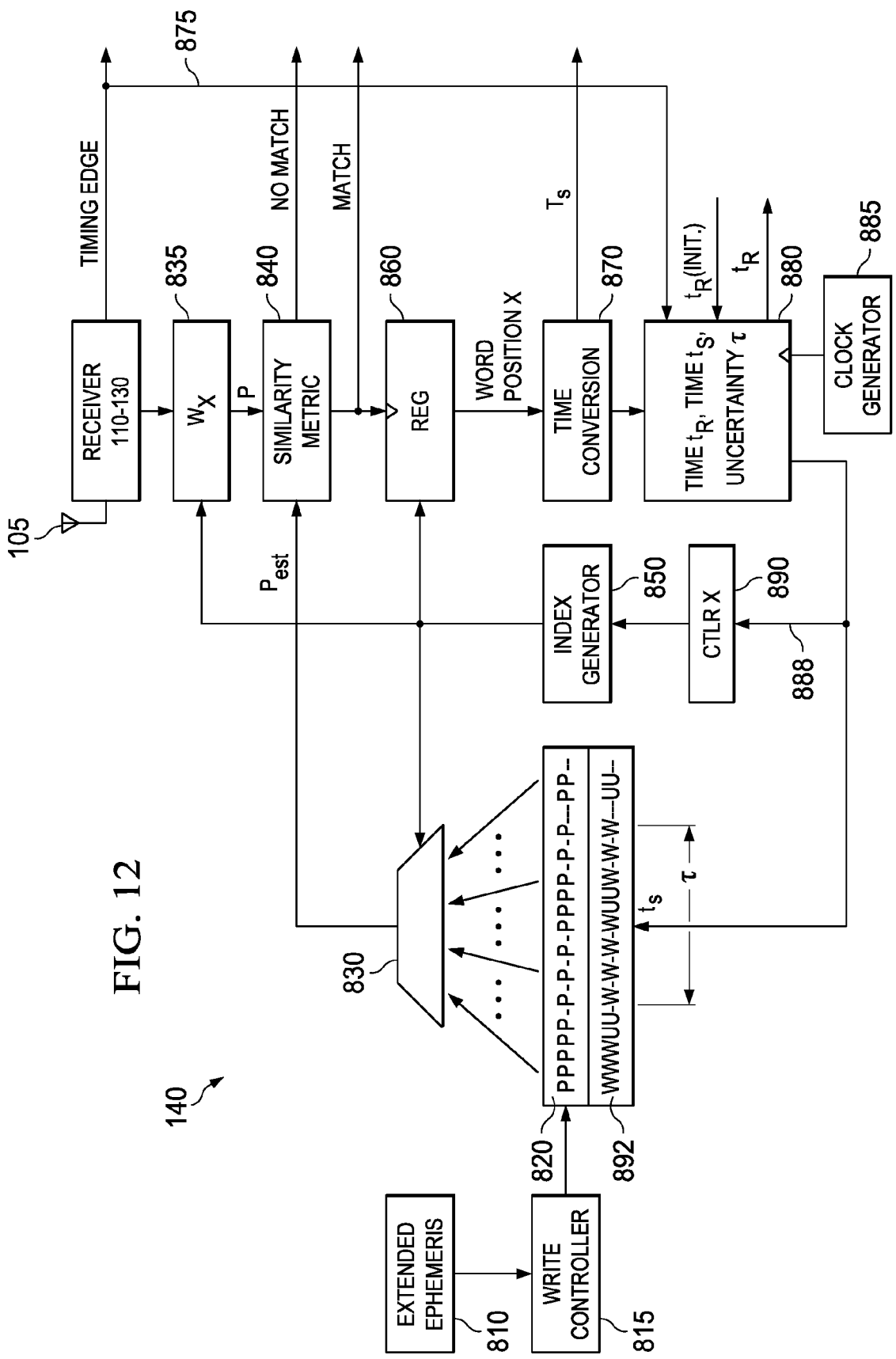
FIG. 12 is a block diagram of an inventive structure and process for Satellite Time determination.

In FIG. 9A, structure and process embodiments effectively have multiple thresholds for the matching MSB counts L for multiple parameters, as applied in or to any of the structures and processes of FIGS. 4, 9 and 12, for example. In FIG. 9A, a step 205 or 505 establishes the prediction accuracy levels for each predicted parameter formulated as one or more probability tables or functions. In the absence of information about the specific prediction algorithms used in the Ephemeris Prediction Software, obtaining values for such table(s) is done empirically. By performing several comparisons between the predicted and satellite-transmitted values of a particular parameter, cumulative probabilities of a match are established for various levels L or count values L of matching MSBs.

For instance, the predicted and transmitted values of a particular parameter can pertain to different times in a day or in different days. In this way, a sample comprised of numerous pairs (predicted value, transmitted value) for a given mth parameter is built up off-line. Notice that the transmitted value is known to be a value of that mth parameter by continuing to off-line monitor values over a frame or more, or at least into the next subframe, so that the word position is independently verified. This off-line process usefully also picks up words having other parameters at other word positions so as to build up a data set for many different parameters corresponding to rows of TABLE 1 concurrently. The cumulative probability estimate as a function of L for such a sample is suitably calculated off-line as a ratio of number of these pairs of values having matches at a number L-or-fewer of consecutively matching MSB positions divided by the number of pairs in the sample. In this accuracy or probability embodiment, Tables like TABLE 3 for all estimated parameters (and estimation ages if desired) are provided from these a priori estimations of probability.

In FIG. 9A, for each value of L, step 205 or 505 establishes the probability that fewer than or as many as L consecutive bits (starting from MSB) match between the predicted and true ephemeris for that specific parameter. For example, for a particular parameter, step 205 or 505 might establish that 11 or fewer consecutive MSB bits match 90% of the time as tabulated in row 11 of TABLE 3. For each mth parameter $P_m$ a table of its accuracy level is established such as by tabulating cumulative probability $p_{c,m}$ that L MSB's or fewer than L match. For example, for a parameter $P_m$ represented by 16 bits, the table of probabilities $p_c$ might appear as in TABLE 3.

TABLE 3

PREDICTION ACCURACY LEVEL AS CUMULATIVE PROBABILITY OF UP-TO-L OF MATCHING MSBs

| L | Cumulative probability ($p_c$) that L or fewer than L bits match |
|---|---|
| 1 | 0.001 |
| 2 | 0.002 |
| 3 | 0.004 |
| 4 | 0.005 |
| 5 | 0.008 |
| 6 | 0.009 |
| 7 | 0.01 |
| 8 | 0.15 |
| 9 | 0.2 |
| 10 | 0.85 |
| 11 | 0.90 |
| 12 | 0.95 |
| 13 | 0.991 |
| 14 | 0.992 |
| 15 | 0.993 |
| 16 | 1.0 |

Similar tables analogous to TABLE 3 are generated for each different parameter $P_m$. Heuristically speaking, TABLE 3 makes sense as to the probability values rising with L, because the probability is small of only one or no MSB of an Extended Ephemeris estimate of a parameter matching its parameter as transmitted from the satellite, and the probability rises with L until the chance of 16 or fewer MSBs matching is 100% or 1.0. In other words, the probability that no-more-than-L MSB's match rises with L and is a cumulative probability corresponding to a cumulation-over-L of the probabilities that exactly L MSB's match as between an estimated parameter and the actual satellite-transmitted parameter. The similarity metric $C(P_m, P^{est}_m)$ for a parameter $P_m$ represented by a currently received word $W_X$ is then identified with the TABLE 3 probability tabulation (e.g., cumulative probability). TABLE 3 also is useful because the values rise with L for use in a maximum MAX determination over similarity values in step 255 of FIG. 4 or step 555 of FIG. 9.

Using CDF also makes sense in light of the following further example. Suppose the unknown word $W_X$ matches 8 MSBs of a first estimated parameter $P^{est}_1$ and 10 MSBs of a second estimated parameter $P^{est}_2$. Suppose further that the probability density distribution (differenced first CDF) for the first $P^{est}_1$ peaks at L=8 MSBs and differenced second CDF for the second $P^{est}_2$ peaks at L=11 MSBs. Then CDF(10) for second $P^{est}_2$ is less than for the CDF(8) value for the first $P^{est}_1$. One concludes that the first $P^{est}_1$ is probably the better prediction of the unknown word $W_X$ and is the better match because if the second $P^{est}_2$ were predicting just as well it should have matched even more bits than the 10 MSBs it did match. That recognition heuristically justifies the CDF-based concept taught herein. So the process picks the first $P^{est}_1$ because its CDF is greater (MAX) and then delivers the word position in the frame corresponding to the position of the first $P^{est}_1$ therein. Since the cumulative probability CDF by definition is accumulated over the probability density distribution from 0 to L, TABLE 3 appropriately tabulates the similarity metric C as the CDF probability $p_{c,m}$ for each $P^{est}_m$.

Another variant can tabulate any monotonically increasing function of CDF instead of CDF and use that as a similarity metric for steps 245 (545) and MAX step 255 (555). Yet other variants reverse the order of entries or replace the entries with their complement (1-entry), or use any monotonically decreasing function of CDF in which cases a MIN determination is used instead in step 255 of FIG. 4 or step 555 of FIG. 9.

In FIG. 9A, a step 542 is embedded in the hypothesis search 235-250 of FIG. 4 or 535-550 of FIG. 9. Step 542 in the mth turn of the loop accesses and uses the mth hypothesized parameter estimate $P^{est}_m$, from among the estimated parameters obtained by the Extended Ephemeris. Step 542 then executes a bit-by-bit comparison process that counts the number L of consecutive matching MSBs (with rollover accounted for) as between the extracted bits of currently-received word $W_X$ and the bits of that parameter estimate $P^{est}_m$. A further step 546 finds the tabulated cumulative probability $p_c(L)$. To do this, step 546 electronically performs a table lookup in an mth table like TABLE 3 or electronically executes a function or procedure to find the applicable value of $p_c(L)$. Each mth table or function has been generated ahead of time or off-line as already described. As a whole, the process of steps 542 and 546 in a first variant is represented by Equation (27):

$$C(P_m, P^{est}_m) = p_{c,m}(L) \quad (27)$$

In Equation (27) the symbols are as follows:

$P_m$ is the mth received parameter extracted from word $W_X$, and $P^{est}_m$ and is the corresponding predicted value for mth specific hypothesized parameter $P_m$ L is the number of consecutive bits that match between $P_m$ and $P^{est}_m$, starting from the MSB (with rollover accounted for)

$p_{c,m}$ is the cumulative probability taken from the mth table corresponding to the parameter $P_m$ being hypothesized.

The process embodiments in FIG. 4 and FIG. 9 save a set of values including each value of $C(P_m, P^{est}_m)$ produced by passes through the loop 235-250 (535-550 for multiple satellites). This set of values is then processed to find the highest value of the similarity metric C produced by the loop and the particular estimated parameter $P^{est}_m$ the match for which produced that highest value. The particular index value m of that particular estimated parameter $P^{est}_m$ that produced that highest similarity value is determined. The GPS word position established in FIG. 3C for that particular index value m is regarded as the best word position estimate for position X of current received word because that GPS word position has the highest probability value using FIG. 9A.

Note that accuracy can also vary with age of the prediction. So there can be multiple such sets of tables depending on the age. Based on the age of the ephemeris the appropriate, applicable, corresponding table is used.

A second variant of this embodiment instead recognizes that another way of thinking of accuracy of prediction is that at least L, i.e. L or more, of the MSB's should match, and the higher the value or level of L then the higher the accuracy of prediction. Heuristically, if all 16 MSB's match a received word, then the probability of this happening is remarkably small. TABLE 4 tabulates these probabilities and is related to TABLE 3 by complementing the probabilities in TABLE 3 and entering the results downward one row so that each entry p (no more than L) in Table 3 corresponds to the entry 1−p (at least L+1) in TABLE 4. (The complementing for TABLE 4 is left unsimplified to show the relationship to TABLE 3.) Finding the highest accuracy level is desirable in the sense of finding the estimated parameter that produced a match that was the most unlikely in probability terms but did happen. So, this process variant is also arranged with a determination of the minimum MIN at step 255 or 555.

TABLE 4

PREDICTION ACCURACY LEVEL VERSUS NUMBER AT-LEAST-L OF MATCHING MSBs

| L | Probability ($p_c$) that L or more than L bits match |
|---|---|
| 1 | ~1 |
| 2 | 1-0.001 |
| 3 | 1-0.002 |
| 4 | 1-0.004 |
| 5 | 1-0.005 |
| 6 | 1-0.008 |
| 7 | 1-0.009 |
| 8 | 1-0.01 |
| 9 | 1-0.15 |
| 10 | 1-0.2 |
| 11 | 1-0.85 |
| 12 | 1-0.90 |
| 13 | 1-0.95 |
| 14 | 1-0.991 |
| 15 | 1-0.992 |
| 16 | 1-0.993 |

Description turns here to a version of the CDF embodiment that empirically establishes levels ThrM for each of the 15 different ephemeris parameters. These levels correspond to the L-value positions of the above-mentioned peaks in the differenced cumulative probability CDF. These levels ThrM can also be estimated off-line as an average, median or modal number of MSB bits that the estimated ephemeris generally predicts correctly for the mth parameter. Such number can be empirically determined and/or may be determinable from parameter-specific percentage accuracy information supplied with the extended ephemeris software, e.g., related to $\log_2$(% accuracy). Then the embodiment finds the number $L_m$ of matching bits as between a currently extracted received word in the estimated value of the mth parameter and computes the difference ($L_m$−ThM) so that the Loop 235-255 forms a set of similarity metric values given by Equation (28), determines the maximum MAX value and which parameter delivered that maximum value in the set and further the word position X to which that parameter corresponds in the GNSS (e.g., GPS) word.

$$S_L = \{(L_1 - Th1), (L_m - ThM), \ldots (L_{15} - Th15)\} \quad (28)$$

Computing the difference as just described hereinabove is an example of electronically computing a function and is an example of an alternative to using a lookup table like TABLE 3. Although the electronic procedure for Equation (29) is procedurally quite different from a table lookup or computation of the CDF itself, it is conceptually equivalent. The CDF at the peak is about 0.50 and is transformed by the monotonically increasing function to form the difference function that has its difference at the peak being zero.

Some other embodiments implement functions or computation procedures for generating probabilities as a function of L (and Age) as an equivalent or optimized way of obtaining the information represented by the hereinabove-mentioned tables. Some additional embodiments use additional statistical information such as standard deviation of the sample mean, probability of the number L of MSB matches happening by random chance, and/or use an additional statistical technique such as a Bayesian statistics approach to update the functions, procedures, or tables for conditional probabilities based on additional information received or measurements taken.

TABLE 5 in a further conditional probability-based form of the embodiment represents the conditional probability that the similarity matching algorithm produces the correct word position determination given that estimated parameter $P^{est}_m$ for word position m matches a currently-received word $W_X$ of unknown position X at L MSBs., i.e.:

$$p_g(\text{Position } X=m \text{ is correct} | L \text{ MSBs of Pest}(m) \text{ match extracted currently-received word } W_X) \quad (29)$$

TABLE 5

PREDICTION ACCURACY LEVEL AS CONDITIONAL PROBABILITY OF CORRECT POSITION X AS FUNCTION OF L MATCHING MSBs

| L | Conditional Probability $p_g(L)$ |
|---|---|
| 1 | 0.001 |
| 2 | 0.002 |
| ... | INCREASING |
| 16 | 1.0 |

In TABLE 5 as in TABLE 3, the accuracy level based on the conditional probability $p_g$ starts quite low at L=1 and increases with increasing L to 1.00.

The cumulative probability $p_{c,m}(L)$ is believed to approximate the conditional probability $p_{g,m}(L)$ within a monotonically increasing function and so these forms of the embodiments are likely related.

In this conditional probability version of the embodiment, Tables like TABLE 5 for all estimated parameters (and ages if desired) are provided from a priori estimations of conditional probability $p_g$ as a ratio of number correct divided by the number of observations in a pertinent sample. Notice in this conditional probability version that the off-line comparisons are between a given estimated parameter $P^{est}_m$ and the extracted currently-received word regardless of whether that word holds the parameter that $P^{est}_m$ is supposed to be predicting. At run-time, the hypothesis loop accesses the respective mth table for each estimated parameter $P_{est}(m)$ one-by-one and more specifically looks up the row for MSB bit-match count value L counted on-the-fly for estimated parameter $P_{est}(m)$ by bit-match comparison with the currently received word $W_X$.

$$C(W_X, P^{est}_m) = p_g(L) \quad (30)$$

The tabulated prediction accuracy level represented by observed conditional probability value $P_{g,m}$ at row L of TABLE 5 is used as a similarity metric value C(m) in a set of values of C that the hypothesis loop 235-250 (535-550) produces. The process concludes that the word position X for the received word $W_X$ is most likely the position value m for the estimated parameter $P_{est}(m)$ with the highest (MAX at step 255 or 555) tabulated probability P of being correct.

Another embodiment uses Bayesian estimation. Let the received word $W_X$ be compared against the currently-applicable M possible parameters: $p_1, p_2, \ldots p_m$ where M is based on the receiver-maintained time $t_S$ and time uncertainty $\tau_S$ as taught elsewhere herein. This embodiment selects the most likely parameter in the context of Bayesian estimation by executing a form of loop 235-255 (535-555) that hypothesizes values of index m one-by-one in turn supposing that each parameter (say $p_i$) is the right one, per step 240 (540). The process finds the number of consecutive matching bits starting from MSB (say $L_i$) using the rollover-handling method described earlier hereinabove.

To generate the similarity metric, electronic operations in a form of step 245 (545) proceed further for each hypothesized index i, so this embodiment computes the conditional probability $p_{g,i}$:

$$p_{g,i}(p_i \text{ is the right parameter} | L_i \text{ bits match}) \quad (31)$$

Right parameter or "$p_i$ is right par." means that a particular estimated parameter $P^{est}$ indeed pertains as its estimate to the parameter carried by word $W_X$. The phrase "$L_i$ bits match" means that the hypothesized estimated parameter $P^{est}_i$ is compared with word $W_X$ and the rollover-based method determines that the number of bits that match is $L_i$.

Each conditional probability delivered by the loop is saved to form a set $S_g$:

$$S_g = \{p_{g,1}, p_{g,2}, \ldots, p_{g,K}, \ldots p_{g,i} \ldots p_{g,M}\} \quad (32)$$

The index (say index K) of the most likely parameter in set $S_g$ is the one for which the above probability is maximized MAX in a step 255 (555) as expressed by Equation (33):

$$K = \text{MAX}_{\{i=1,2\ldots M\}}[p_{g,i}(p_i \text{ is right par.} | L_i \text{ bits match})] \quad (33)$$

Now set up a Bayesian formula (34), where symbols P( ) means "probability of," and symbol A means ($p_i$ is right parameter), and symbol B means ($L_i$ bits match).

$$P(A|B) = P(B|A) \times P(A)/P(B) \quad (34)$$

Next, substitute the Bayesian formula (34) with thus-interpreted symbols A and B into maximum similarity metric Equation (33) to obtain Equation (36).

$$K = i \text{ index of that } p_{g,i} \text{ that is maximum as expressed by Equation (36).} \quad (35)$$

$$\text{MAX}_{\{i=1,2\ldots M\}}[p_{g,i}(p_i \text{ is right par.} | L_i \text{ bits match})] = \text{MAX}_{\{i=1,2\ldots M\}}[P(L_i \text{ bits match} | p_i \text{ is right par.}) \times P(p_i \text{ is right par.})/P(L_i \text{ bits match})] \quad (36)$$

For some versions of this Bayesian embodiment, and for example in the equations that follow, it is assumed that each of the parameters is equally likely (p=1/M) to be received as any other one of the parameters, and hence the factor P($p_i$ is the right parameter) in the numerator of Equation (36) is ignored in the maximization process. Some other versions instead have each of the parameters in the time uncertainty range be equally likely (P=1/(2k+1)) to be the right parameter. There, all the estimated parameters outside the time uncertainty range are omitted from the Max determination (i=N−k, N−k−1, ... N, ... N+k−1, N+k). Even so, the factor P($p_i$ is the right parameter) in the numerator of Equation (36) is ignored in the MAX function. For still other versions, estimated parameters inside the time uncertainty range are assumed to follow an empirical distribution established from reception experience and then the probability is represented and updated in an additional lookup table. In executing the similarity metric process, a look-up to that additional table obtains the probability P($p_i$ is the right parameter) for use in Equation (36).

The probability P($L_i$ bits match|$p_i$ is the right parameter) is estimated by computing a ratio from data empirically. Note that the cumulative probability in ith TABLE 3 for P$^{est}_i$ can be derived by integrating (accumulating) over index i this conditional probability P($L_i$ bits match|$p_i$ is the right parameter). Conversely, this conditional probability P($L_i$ bits match|$p_i$ is the right parameter) can be derived by differencing between adjacent rows in that ith TABLE 3. The conditional probability P($L_i$ bits match|$p_i$ is the right parameter) may have a sawtooth-shaped histogram as a function of number L and skewed toward higher values of L. Dividing the values in that histogram by P($L_i$ bits match) in the Bayesian embodiment yields a monotonically increasing function of L that makes a satisfactory similarity metric even if somewhat different from the CDF of TABLE 3.

The divisor probability in Equation (36) signified by P($L_i$ bits match) is derived by establishing a conditional probability based summation in Equation (37).

$$(L_i \text{ bits match}) = \sum_{k=1}^{M} P(L_i \text{ bits match} | p_k \text{ is right par.}) \times P(p_k \text{ is right par.}) \quad (37)$$

If all the parameters are assumed equally likely, Equation (37) simplifies to:

$$P(L_i \text{ bits match}) = 1/M \sum_{k=1}^{MJ} P(L_i \text{ bits match} | p_k \text{ is right par.}) \quad (38)$$

One way to compute P($L_i$ bits match) is to empirically populate a three-dimensional (3D) array a priori, i.e., off-line or otherwise previous to the similarity metric process to arrive at each of the values of a P($L_i$ bits match/$p_k$ is the right parameter) for k=1, 2, . . . M. The process then proceeds to electronically compute the summation by substituting the populated values into Equation (38). Note that the 3D table represents a function of 16 values of number L, M values of index i, and M values of index k. The a priori operations load or update the resulting values representing P($L_i$ bits match) as a two-dimensional (2D) lookup table with probability values indexed by values of L and i and electronically accessible for use in the similarity metric process at run time.

In the conditional probability P($L_i$ bits match|$p_k$ is the right parameter), note that the subscript on L is i while the subscript on p is signified by independent index letter k. This means the following. The received word actually contains parameter $P_k$. The prediction P$^{est}_i$ obtained for parameter $P_i$ is compared with the received word $W_X$ using the rollover-based method. Suppose the first $L_i$ bits match and the $(L_i+1)^{th}$ bit does not. Then P($L_i$ bits match|$p_k$ is the right parameter) refers to the probability of exactly this occurrence.

The a priori 3D operations described hereinabove are obviated in a simplified version of the Bayesian embodiment by an approximation to P($L_i$ bits match) and monotonic transformation of the similarity metric as described next. First, an abbreviated notation P(L, i, k) is applied in Equation (38A) to represent the summed probability as a function of the 3D variables L, i, k:

$$P(L_i \text{ bits match}) = \quad (38A)$$

$$1/M \sum_{k=1}^{M} [P(L, i, k) = P(L_i \text{ bits match} | p_k \text{ is right par.})]$$

Except in the case of P(L, i, i), the a priori bit-matching probability P(L, i, k) in Equation (38A) can be approximated by randomness according to Equation (39):

$$P(L,i,k) = P(L_i \text{ bits match} | p_k \text{ is right par.}) = 1/2^{(Li+1)} (k \neq i) \quad (39)$$

Note that '$L_i$ bits matching' actually means $L_i$ consecutive MSB bits exactly matching and the $L_i+1$ bit not matching. Hence, the quantity $1/2^{(Li+1)}$ is used in Equation (39). Substituting randomness Equation (39) for all the summands in Equation (38A) except summand P(L, i, i) yields Equation (40):

$$P(L_i \text{ bits match}) = 1/M [P(L,i,i) + (M-1)(1/2^{L+1})] \quad (40)$$

Equation (40) assumes that all the parameters are statistically independent of each other, which is a good practical approximation and one at can be replaced by a statistically more sophisticated equation accounting for statistical dependence, if any and if desired.

The maximization equation (36) is accordingly rewritten as Equation (41) by applying the P(L, i, i) notation in the numerator, substituting Equation (40) in the denominator, and ignoring assumed constants P($p_i$ is right par.) and 1/M:

$$\text{MAX}_{\{i=1,2...M\}}[P(L_i \text{ bits match}|p_i \text{ is right par.}) \times P(p_i \text{ is right par.})/P(L_i \text{ bits match})] = $$
$$\text{MAX}_{\{i=1,2...M\}}[P(L,i,i)/[P(L,i,i) + (M-1)(1/2^{L+1})]] \quad (41)$$

Simplifying Equation (41) produces Equation (41A):

$$\text{MAX}_{\{i=1,2...M\}}[P(L,i,i)/[P(L,i,i)+(M-1)(1/2^{L+1})]] = $$
$$\text{MAX}_{\{i=1,2...M\}}[1/(1+(M-1)(1/[2^{L+1}P(L,i,i)]))] \quad (41A)$$

Recall from elsewhere hereinabove that applying a monotonically increasing function of the argument of a MAX function returns the same MAX value. As a result, the similarity metric is then written as in Equation (42), and $2^L$ may be also used therein if one wishes:

$$C = 2^{L+1} P(L,i,i) \quad (42)$$

Next, find K which signifies the index i value of that particular P$^{est}_i$ for which Similarity metric C is maximum as expressed by Equation (43).

$$K = i \text{ index of that } P^{est}_i \text{ for which MAX}_{\{i=1,2...M\}}$$
$$[2^{L+1} P(L_i \text{ bits match}|p_i \text{ is right par.})] \quad (43)$$

This latter form of the Bayesian embodiment computes a similarity metric instantiated as $2^{(Li+1)}$P($L_i$ bits match|$p_i$ is the right parameter) for FIG. 4 step 245 (or FIG. 9 step 545) under every hypothesized index i, and outputs the index K of the maximum probability value in the set. This is the index K for which the metric is maximum, i.e. that maximizes the value of the product argument in Equation (43). Note that the Bayesian estimate, in addition to the conditional probability P($L_i$ bits match|$p_i$ is the right parameter) term, also has an additional $2^{(Li+1)}$ multiplicative term that favors higher number of bits matching. This formulation signifies that the word-position determination process weights the conditional probability in favor of higher numbers of matching bits. Continue with steps 250-270 (550-570). Using value K in the process, access and look up in FIG. 3C and/or TABLE 1 to thereby determine word position X of the currently-received word $W_X$.

In summary, at least some of the Bayesian based embodiments electronically perform a similarity metric computation that involves the following steps:
1. For each parameter empirically derive $P(L_i$ bits match$|p_i$ is the right parameter) for some or all possible values of $L_i$ and store as a table. The tables can be populated off-line by the manufacturer of the Extended Ephemeris software, or by the receiver manufacturer and then used as-is in the receiver 100. Also, the receiver itself in some embodiments occasionally and dynamically updates these tables as it gathers more data while in use.
2. Empirically derive $P(L_i$ bits match) based on Equation (38) and store as a table also. In a "$2^{L+1}$" version, this step (2) is omitted.
3. The similarity metric C or an increasing monotonic transformation thereof is electronically computed at run-time for each value of index i as the ratio in Equation (39):

$$C(W_X, P^{est}_i) = P(L_i \text{ bits match}|p_i \text{ is the right parameter})/P(L_i \text{ bits match}) \quad (44)$$

If the maximum value of the metric C is above a certain threshold thresh2 and the difference between the maximum and next-smaller value of the metric is above a certain other threshold Thresh1, then a match is declared per step 255 of FIG. 4 (step 555 of FIG. 9).

Heuristically speaking, the various Bayesian-based embodiments using Equation (44) and its variations are credible and useful for the following reasons. Inspection of Equation (44) and a little reflection show that if many bits match so that the number of matching bits $L_i$ is larger, the numerator in equation (44) is large if $p_i$ is the right parameter. Correspondingly when many bits match, the denominator is small because it is not so likely on average that many bits would match by just picking any parameter at random. The similarity metric is accordingly larger because it is the ratio of the numerator and denominator. By contrast, if only a few bits match so that the number of matching bits $L_i$ is smaller, then the numerator probability of this happening is small, given that $p_i$ is the right parameter. Moreover, the denominator is larger because it is more likely that fewer bits would match when just picking any parameter at random. For both these letter reasons, the similarity metric is then smaller. As a whole, this type of embodiment acts as a filter to improve a ratio of identifiable information to a mere jumble of randomness. This filter action is slightly analogous to a narrowband frequency filter that improves the signal-to-noise ratio for signals in its passband.

The similarity metric-based method in any of the embodiments for determining the unknown position of a currently-received word $W_X$ has a small error probability of predicting the wrong word position X. This is because, by random chance, the estimate $P^{est}_n$ for another nth parameter might match the currently-received word better (according to the similarity metric) than the estimate $P^{est}_m$ for the correct mth parameter if the latter $P^{est}_m$ happens by random chance to be a relatively poor estimate. It should be understood, however, that the nature and format of the data for ephemerides as specified by the GNSS in particular word positions makes some $P^{est}$ values less likely to be confused with others. Variation of ephemeris values over extended periods of time can also vary the chances of a prediction error. The amount of prediction error of the embodiments is believed to be generally small enough and the separation between the parameters sufficiently large enough for desirable hot-fix performance and practical use. Nevertheless, estimating the error probability from a statistical model or empirically testing an embodiment to determine the error probability is useful to demonstrate that a particular embodiment has a level of hot-fix performance that accommodates the type of application at which it is aimed.

Also, the embodiments suitably are provided with process steps to handle errors and recover from errors. For example, step 255 (555) handles potential errors in a first way by providing the second threshold Thresh2 so that when two estimated parameters lead to two corresponding similarity metric values that are close enough to one another to have a non-insignificant error probability, then a No branch goes back through step 260 (560) to repeat the procedure for a next parity-passing word alignment or for a next received word.

Figure 9C:
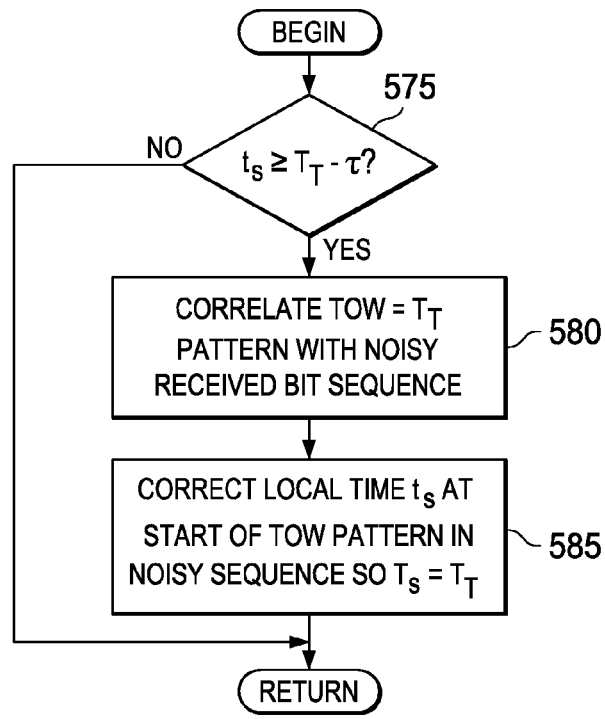
FIG. 9C is a flow diagram of an inventive process of operation to re-establish accurate satellite time for a fix at specified intervals.
Figure 9B:
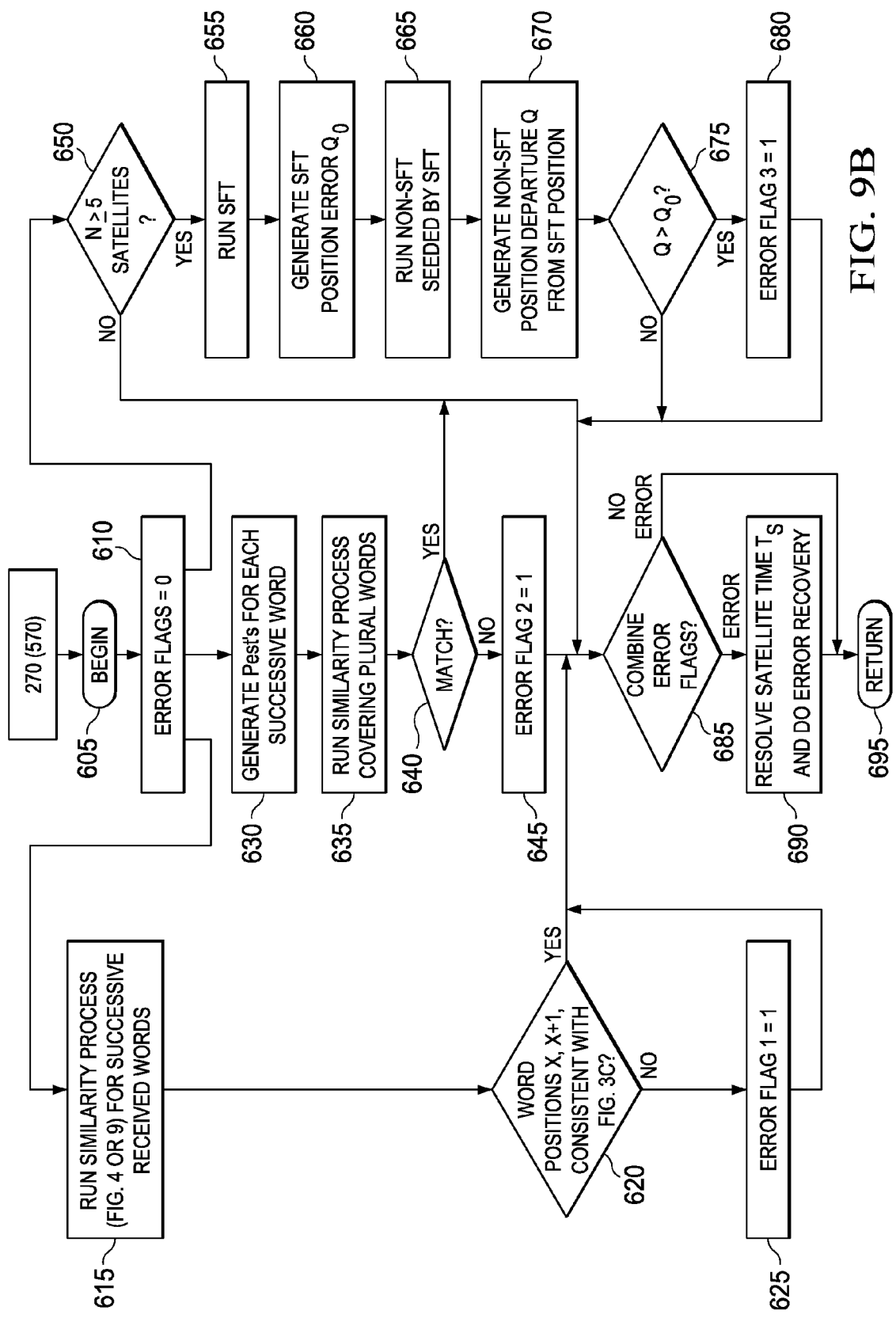
FIG. 9B is a composite flow diagram of different inventive processes of operation for error detection and recovery.

In FIG. 9B, some embodiments have another provision to recover from infrequent errors in the word position X determination at step 270(570) of FIG. 4 or 9. The recovery process commences at BEGIN 605 and resets one or more error flags Error_flag 1, 2, 3 at a step 610. The loop of FIG. 4 or 9 is executed at a step 615 for each received word, word-by-word (or otherwise consistent with the word position determination process and power management process used in the receiver embodiment) to determine the successive received word positions. Then a step 620 checks for consistency with FIG. 3C. For example, if the successive received GPS word positions thus determined 0.6 seconds apart are found to be 8, 9 in subframe 1 or determined 1.2 seconds apart are found to be like 4, 6 in subframe 2 or are otherwise consistent with FIG. 3C, then they are consistent. But if they are determined 0.6 seconds apart and like 8,8 or 8, 10 in subframe 1 or like 4, 6 in subframe 2 or are otherwise inconsistent with FIG. 3C, then they are inconsistent. A consistency test suitably checks whether the difference in successive word position determination is multiplied by 0.6 seconds is substantially equal to the elapsed receiver time between the determinations. An alternative or additional form of consistency test uses the information in FIG. 3C and TABLE 1 so that if a word position determination X is made based on a match with an estimated parameter Pest at any given instant, then the word position is determined after an elapsed receiver time consistent with the next predictable word position, say X+2 in the TABLE 1. If a match is made with the estimated parameter Pest associated with X+2, the times are consistent. But if no match is made because step 255 (555) fails or because a match is successfully made with an estimated parameter Pest associated with some other word position besides X+2, then the times are inconsistent. If the times are inconsistent, Error_Flag 1 is set to one. Then the predicted time used is based on the more-probable match. Another satellite can be acquired or other recovery steps are executed if possible as well. See step 690.

Evaluating consistency of times from different word position determinations in some embodiments involves separately determining the word position and consequent Satellite Time from each word position determination on different received words. An earlier word position determination has its respective proposed Satellite Time that is separately incremented 0.6 seconds with each successive received word subsequent to that word on which the earlier word position determination was made. Then that proposed Satellite Time is compared with the word position and consequent Satellite Time determined by executing the process of FIG. 4 (or 9) for a later-received word. If the proposed Satellite Times match within small error bounds, then they are consistent.

While establishing similarity with the next received word W, some embodiments combine information in another way as in steps 630-645 to also take into account the information derived from at least one, some or all previous failed attempts to establish a satisfactory determination of the unknown word position X. So on the second pass through the loop for the next received word, the receiver process now hypothesizes in step 240 that the current and previous received word corresponds to $W_m$ and $W_{m-1}$, for all possible values of m between n−k+1 and n+k. Correspondingly the metric comparison at step 630 and step 635 compares the received $P_m$ and $P_{m-1}$ with $P^{est}_m$ and $P^{est}_{m-1}$ respectively. The similarity computation of step 635 then is given by Equation (45), for instance. If match check like step 255 (555) fails, then Error_Flag2 is set to one (1) and this process step 635 is similarly extended for multiple passes by step 690 until similarity is strongly established. When established, TABLE 1 or operations as otherwise discussed for step 270(570) earlier hereinabove are used to translate the best-parameter index m back to a solution value for the word position X.

$$C(P_m, P^{est}_m, P_{m-1}, P^{est}_{m-1}) = (L_m + L_{m-1})/(N_m + N_{m-1}) \qquad (45)$$

In FIG. 9B, if more than 4 satellites are visible at a step 650, a further error detection and recovery process 655-680 in some embodiments is associated with the satellite time determination of FIG. 4 or 9. A step 655 runs Solve For Time SFT described elsewhere herein and an SFT position error $Q_0$ is generated at a step 660. This process runs a non-SFT-process at step 665 seeded by the SFT of step 655. A step 670 computes a metric of departure Q of the non-SFT position solution from Equation (46). Based on the satellite measurements, there is a certain expectation on the range of values of the position solution. For example, if SFT seeds a non-SFT, the sum-of-squares of the departure of the non-SFT position solution from the SFT position solution should be within some range proportional or related to the sum-of-squares of the position coordinate errors expected for the SFT. Accordingly, step 675 compares the metric of departure Q with a threshold $Q_0$. A constant of proportionality $c_0$ on the order of unity (1.0) is empirically utilized. If the value of Q is greater than expected based on threshold $Q_0$, then Error_Flag3 is set to one (1) representing uncertainty or error.

$$Q == \sum_{i=1}^{3} (x_{i_{R,non-SFT}} - x_{i_{R,SFT}})^2 > c_0 (x^2_{error} + y^2_{error} + z^2_{error}) == Q_0 \qquad (46)$$

Some embodiments re-initiate the loop of FIG. 4 or 9 for a subsequent word depending on departure of the metric from its expected range. Some other embodiments instead run the loop of FIG. 4 or 9 on every received word and apply the metric of quality to tie-break between inconsistent measurements when at least five (5) satellites are visible.

In FIG. 9B, a step 685 combines Error_Flag1, Error_Flag2 and Error_Flag3 such as by OR logic or AND-OR logic or other selective logic. In case of error signified by at least one error flag, operations proceed to a step 690 to resolve the Satellite Time $T_S$ and do error recovery as described. For instance, the receiver 100 can loop back to execute the process of FIG. 4 or 9 to determine the word position of the next word and to verify the satellite time value $T_S$, or correct the time value $T_S$ if an error has been made. The satellite time value $T_S$ is suitably based on a match or more/most-probable match or a tie-break determination. Another satellite can be acquired or other recovery steps are executed if possible as well.

Any of these variants of the similarity metric process are suitably used to enhance the consistency, or resolve inconsistency, of word position determination across words and are supplemented by the metric of uncertainty $Q > Q_0$ or used alone if the latter is unavailable. Then the Satellite Time $T_S$ associated with that more/most-probable word position is applied or substituted and used in the position fix procedure to do error recovery. Eventually, every six (6) seconds or subsequent to receiver wakeup, the GNSS word with the Satellite Time is received and used to update the Satellite Time. If a sleep/wake power management is in effect, then the next time the receiver wakes up the similarity matching of FIG. 4 or 9 is executed again to maintain and verify or correct the time.

Turning to FIG. 9C, hot fix operations can be broadly classified into two categories:
(1) Category One: User indicates whenever a fix is desired (e.g. by press of a button). The receiver is then expected to give a fix as fast as possible, with as little power expended as possible. GPS receivers in mobile phones would fall under this category. In such use-cases, the receiver has no control over when the receiver should be switched on and hence the parameter matching techniques discussed herein are useful, see FIGS. 4 and 9 for instance.
(2) Category Two: Receiver is programmed to give a fix at specified intervals, e.g. once every 30 minutes, such as in an asset-tracking kind of application such as tracking vehicles in a fleet. In such use cases there is scope for the receiver to determine the exact ON time to its advantage. For example, the receiver can make sure that the periodic turn-ON is roughly aligned to the start of the HOW word (which includes the TOW). A process embodiment of FIG. 9C is adapted for use in Category Two. In general, the probability of finding satellite time very soon is thereby increased, which translates to a faster fix that in turn translates to less power consumption. The benefits of this approach are as follows:
 a. Assuming the receiver has a fairly good estimate of time, it means that the receiver has perfect knowledge of at least 16 bits (out of 17 bits) of the TOW. So it can derive accurate satellite time by merely searching for these 16 bits in the small window corresponding to its time uncertainty. Some embodiments can even bypass or omit finding word alignment in connection with this search. With knowledge of 16 bits, and a time uncertainty τ that translates to k bits, the probability of false alarm is k/(2^16), which is likely to be small if k is reasonably small. Note that this low error probability applies even without performing word alignment.
 b. In cases such as in (a), where word alignment is not employed, the problem of finding time reduces to finding time through pattern matching that finds a known pattern embedded in a sequence of noisy bits. This problem is solved by correlating the known pattern with the received noisy sequence. Some embodiments determine the received satellite signal exceeds a predetermined bit error rate (BER) or a predetermined signal-to-noise ratio (SNR) before initiating the correlation. Where BER is a function of received signal power, then the determination is suitably whether the received satellite signal exceeds a predetermined signal power level (e.g., about −155 dBm) before initiating the correlation.
 c. Identifying the TOW bits is used in some embodiments for acquiring and tracking the received satellite signals. Knowledge of which bits are the TOW bits allows the coherent integration time during acquisition/tracking to be extended beyond the bit period of 20 ms. This can help provide better estimates of the pseudorange especially at low signal strengths.

In FIG. 9C, an embodiment for TOW pattern matching commences with a BEGIN and has process steps as follows.
1) Based on its internal (local) time $t_S$ and approximate receiver position $X_{iR}$, the receiver 100 estimates the start time here-designated $T_T$ for reception of TOW. Because of the associated time uncertainty τ, the receiver executes a decision step 575 that checks local time and starts reception at a local time $t_S=T_T-\tau$ in order to guarantee that the matching process does not miss the TOW. Since the TOW for different satellites is received at different times, the receiver initiates reception at the earliest occurring $T_T-\tau$. Until that time, operations go to a RETURN if step 575 is encountered. 2) Then a pattern matching step 580 correlates the known TOW pattern with the received noisy bit sequence and thereby finds the position of the TOW pattern in that sequence. 3) The local time $t_S$ is then corrected by a step 585 so that local time $t_S=T_T$ precisely corresponds to the start of the TOW pattern in that sequence as determined by the correlation, whence a RETURN is reached.

In FIG. 9C, a processor establishes an earlier fix during an ON period and then turns off as a power management measure. Power management schedules an update to the fix at a subsequent time, e.g. 30 minutes later. Parameter matching software is accessible by said processor around that subsequent time generates a satellite time bit-pattern representing that subsequent time and bit-wise correlates that satellite time bit-pattern with a received noisy bit sequence somewhere including that satellite time bit-pattern. The bit-wise correlation thereby finds the position of the bit-pattern in that bit sequence. The processor maintains and correct a local satellite time $t_S$ to more accurately correspond to the thus-found position $T_S$ of the bit pattern in that bit sequence. Notice the bit-wise correlation is advanced to commence sooner (e.g., sooner by time uncertainty τ or by some advancement related to τ) than the subsequent time represented by the satellite time bit-pattern. In this way, the operations are more likely to find the satellite time bit-pattern in the received noisy bit sequence.

In summary, in cases where the exact ON times and ON periods are within the control of the receiver, the receiver operates to decide or establish these exact ON times and ON periods so that the receiver switches ON at time $T_T-\tau$ just before the start of the TOW reception and switches OFF after all the bits (or a sufficient number of bits to pattern match with confidence) of the TOW are received. TOW is discussed by way of illustration and not of limitation, and the process of FIG. 9C is applicable with any predicted parameter in FIG. 3C such as TOW or predicted ephemeris, etc. and adjusts for word position of the predicted parameter.

Turning to the subject of comparative advantages and benefits, various embodiments can give faster and more accurate fixes in Hot Fix/Warm Start scenarios. In TABLE 6, the first row pertains to an embodiment with desirably reduced time to fix, and the second row pertains to time to fix for a conventional approach waiting over random time intervals until satellite time can be obtained from the HOW word. The columns T# represent the number of seconds (number of words times 0.6 second) until fix, for a given percentage of fixes. So T50 signifies that 50% of fixes are within a tabulated number of seconds, etc.

TABLE 6

TIME-TO-FIX COMPARISON

| | T50 (sec) | T66 (sec) | T75 (sec) | T90 (sec) | T96 (sec) |
|---|---|---|---|---|---|
| Embodiment | 1.2 | 1.8 | 1.8 | 3 | 4.2 |
| Conventional | 2.4 | 3.6 | 4.2 | 4.8 | 5.4 |

Figure 10A:
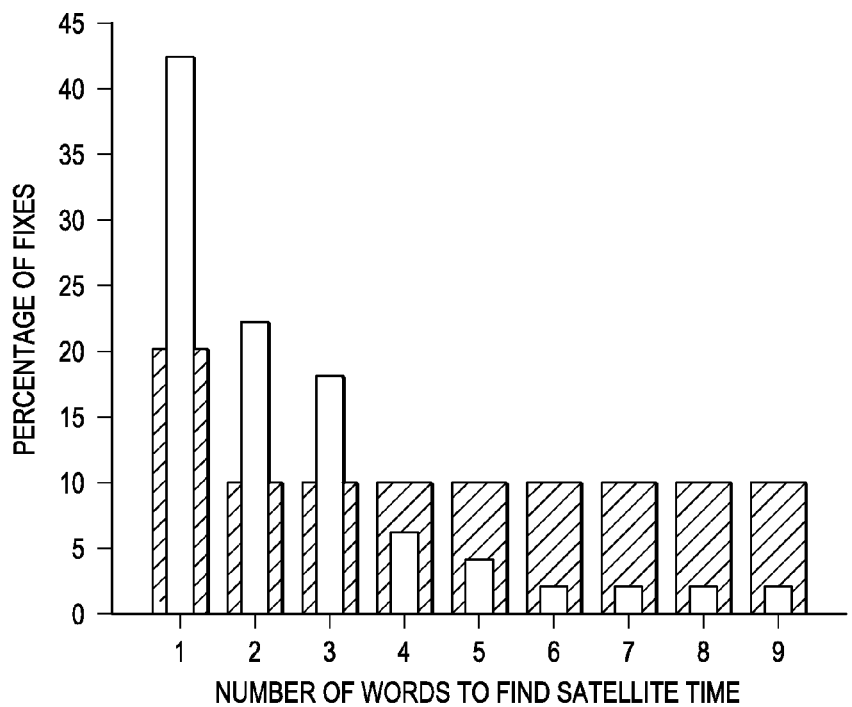
FIG. 10A comparatively shows a histogram of percentage of fixes versus number of words consumed to find Satellite Time.

Further, FIG. 10A comparatively shows a histogram of percentage of fixes corresponding to number of words consumed to find Satellite Time for one set of data. FIG. 10A amounts to an estimated probability density distribution over the number of words consumed to find Satellite Time. Notice that the percentage of fixes that consume a low number (e.g., one to three) of words for an embodiment is advantageously higher than for a conventional method and the percentage of fixes that consume a higher number (e.g., four to nine words) for an embodiment is advantageously lower than for the conventional method.

In FIG. 10A, the conventional method has a 20% chance of TLM or HOW being the current word. The current word has equal 10% chances of being one of the other eight words in the subframe so that the wait time would be two to nine words in duration on the horizontal axis in FIG. 10A. See shaded bars. By contrast, an embodiment (clear bars) responds to any of 15 W-labeled words out of 50 words per frame (FIG. 3C) and increases the chance of a one-word fix by up to a 30% increase in FIG. 10A (15/50=30%). In FIG. 3C, eight words out of the 50 words per frame are located just one word ahead of some W-labeled word. If any of these eight words are the first-received word, an embodiment responds to the next (second) word by parameter-matching because that second word is W-labeled in FIG. 3C. Such matching operation increases the chance of a two-word time-to-fix by up to a 16% increase (8/50=16%) in FIG. 10A.

Figure 10B:
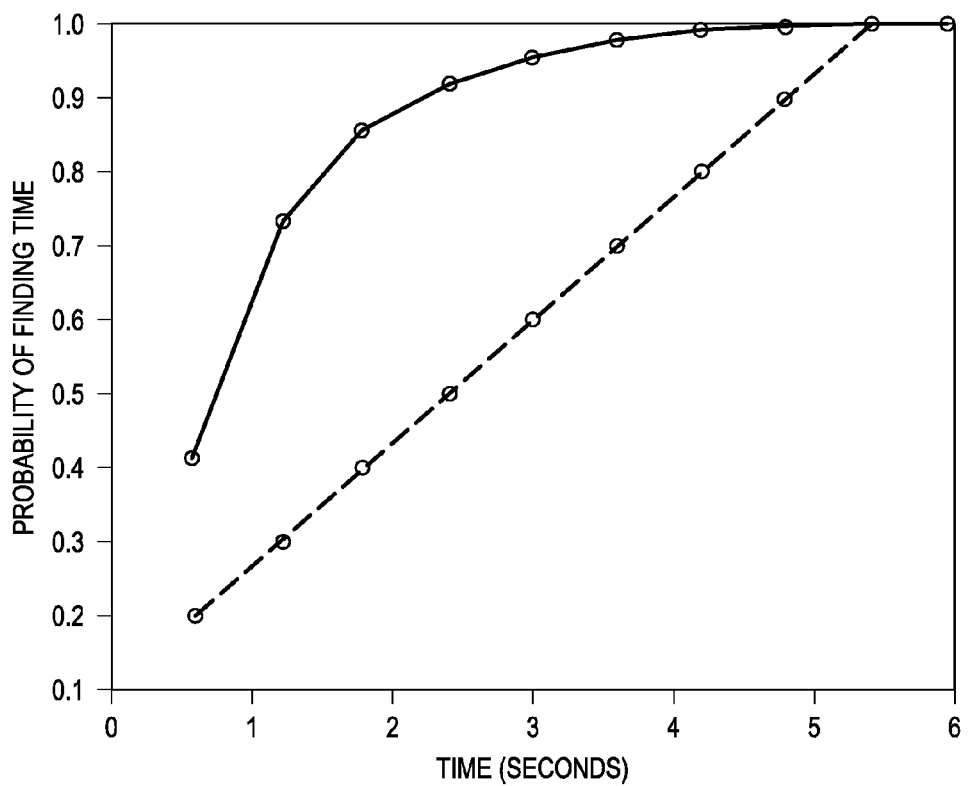
FIG. 10B comparatively shows an estimated CDF (cumulative probability distribution) of probability of finding Satellite Time (cumulated percentage of fixes) versus Time in seconds consumed to find Satellite Time.

FIG. 10B comparatively shows an estimated CDF (cumulative probability distribution) of probability of finding Satellite Time (cumulated percentage of fixes) versus time in seconds and wherein a word is 0.6 seconds in duration. FIG. 10B amounts to a cumulation of a set of probability density data of FIG. 10A that become the line diagram of cumulated data in FIG. 10B. The CDF values for an embodiment (solid line) are advantageously higher than for a conventional method (dotted line) and indeed much higher at low numbers of words (e.g. one to two words) where the high percentage of fixes is desirably concentrated. These CDF values represent an enhanced probability of obtaining a non-SFT fix in difficult or challenging satellite reception environments.

In FIG. 11, a process embodiment for word alignment and position determination is used to find or revise an estimate of the satellite time $t_S$ to deliver exact satellite time $T_S$ when the time uncertainty $\tau_S$ is less than, e.g., 0.3 seconds. Even a receiver with coarse time injection is likely to be able to deliver better than 300 ms accuracy when time injection is coming from FM or from other sources providing coarse local time $t_R$. Some embodiments combine the process embodiment of FIG. 11 to handle the case of $\tau_S$<0.3 seconds together with the process embodiment of FIG. 4 to handle the case of $\tau_S$<15 seconds. In FIG. 4, word alignment step 215 (using one or multiple satellites) is preliminary to extracting one or more parameters P and then performing a similarity matching with the a priori values $P_{est}$ of those parameters. In FIG. 11, however, if the receiver's estimated satellite time is sufficiently accurate (e.g., if $\tau_S$<0.3 seconds), the embodiment remarkably proceeds after word alignment to electronically derive the exact satellite time $T_S$ and bypass or omit the process of FIG. 4.

In GPS, a word is transmitted every 0.6 seconds. So the satellite times corresponding to word transmissions are 0, 0.6, 1.2 s, 1.8 s, . . . . In general, a word is transmitted at intervals of 0.6*k seconds, k=1, 2, . . . . Suppose the receiver estimates approximate satellite time $t_S$ to within an accuracy of better than +/−0.3 s, i.e $\tau_S$<0.3 sec. Further suppose receiver 100 uses word alignment of FIG. 6 and has determined that a given word begins at a certain bit b. Then the accurate satellite time $T_S$ corresponding to the transmission of bit b is computed as 0.6*k, where k=round($t_S$/0.6).

In FIG. 11, an embodiment and process flow has steps 710-750 for finding satellite time using word alignment as follows:

Step 1 (710). Using word alignment procedure of FIG. 6 finds the bit b corresponding to the start of a currently-received word.

Step 2 (720). The receiver obtains or already has:
a. The current time $t_R$ at the receiver with evaluated accuracy of $+/-\tau_R$.
b. The distance to the satellite from the receiver is $D_S$ with evaluated accuracy of $+/-d_S$.

Step 3 (730). Using the above the receiver calculates its estimate of satellite time as:

$$t_S = t_R - (D_S/c_L) \quad (12)$$

And its estimate of the associated uncertainty in the knowledge of satellite time as:

$$\tau_S = \tau_R + (d_S/c_L) \quad (14)$$

(where $c_L$ is speed of light).

Step 4 (740). If $\tau_S$ as computed above is less than 0.3 seconds, then receiver 100 goes to a step 5 (750). If $\tau_S$ is greater than or equal to 0.3 seconds, then using word alignment by itself is bypassed, and a full parameter matching using similarity technique of FIGS. 4 and 5 is performed to find accurate satellite time instead.

Step 5 (750). Receiver 100 computes the revised or exact satellite time $T_S$ corresponding to the transmission of bit b as: 0.6*k, where k=round($t_S$/0.6) according to Equation (47):

$$T_S = 0.6 * \text{round}(t_S/0.6) \quad (47)$$

Word alignment by itself is the basis of the computation of exact satellite time to revise it as a function of the estimated satellite time and the time interval defining the word length (e.g., 0.6 sec in GPS).

In FIG. 11A, processes of FIG. 11 are adapted for use with Methods 4 and 5 discussed in connection with FIG. 6A. In FIG. 11, where the receiver knows time to within less than 300 ms, finding word alignment at step 710 directly leads to computation of accurate satellite time in step 750. So, it is desired to obtain a reliable word alignment as fast as possible, as discussed in connection with FIG. 6.

After a BEGIN, a step 760) hypothesizes that the word starts at bit b0. The start of bit b0 corresponds to and is used to identify the instant for which receiver enters estimated satellite time $t_S$ of that instant based on the receiver local timebase. As discussed elsewhere herein, the receiver evaluates and maintains a record of the value of time uncertainty $\tau$ associated with estimated satellite time $t_S$ so that time $t_S$ is known within time uncertainty $\tau$. Then a step 765 determines whether $\tau$<300 ms. If $\tau$ is not <300 ms, then go to processes of FIGS. 4 and 5.

Further in FIG. 11A, if $\tau$<300 ms, then a step 770 computes the word position $k_F$=[round($t_S$/0.6)]$_{mod50}$ attributed to the currently hypothesized word. Step 770 further computes or retrieves an EPS estimated parameter for that word position. A checking step 775 confirms whether the EPS parameter accuracy and number of bits is at least as much as a pre-specified threshold number L0. If not, operations use Word alignment of FIG. 6. If the accuracy is sufficient (>=L0), then the operations go to a selection step 780 based on a configured word alignment option in an option register field 782.

Operations of FIG. 11A then go according to selection step 780 to either the word alignment Method 4 of FIG. 6A or to word alignment Method 5 of FIG. 6B. The attributed word position $k_F$ from step 770 is used at step 340 in both FIGS. 6A and 6B for extracting a parameter value from the received bits of the currently hypothesized word, the extraction based on the attributed word position $k_F$. The estimated parameter value retrieved by step 770 is used at matching step 345 in both FIGS. 6A and 6B as the predicted parameter there for comparison with the parameter value thus extracted. Upon completion of word alignment under the selected option, operations proceed in a step 790 of FIG. 11A to generate accurate satellite time as a function of estimated satellite time and word length such as used in step 750 of FIG. 11, whence a RETURN is reached.

In FIG. 12, a structure and process for Satellite Time determination are situated in block 140 of FIG. 2. This structure is suitably provided on a small amount of integrated circuit real estate as a hardware submodule in a block 2380 coupled along with a clock block 2375 to a system bus 2360 and accessible by a microprocessor 2370 of FIG. 15, or is implemented in firmware or software instead for execution by such microprocessor. In FIG. 12, satellite signals from antenna 105 are received by receiver blocks 110-130 and supply successive timing edges of bits as well as recovering a current word $W_X$ having unknown position X. Extended Ephemeris operations as described elsewhere herein are performed by a block 810 and supply estimated parameters Pest to a parameter store 820. (Pest is abbreviated "P" in FIG. 12 there.) Parameter store 820 is suitably any one or more of a FIFO (first-in-first-out), a circular buffer, a register file, SRAM memory, or other suitable store. Suitable entries are written, supplied or defaulted for non-predicted word positions so as to enter a zero or some other symbol ("–") or value representing that the word position has no estimated parameter Pest.

Parameter writes to parameter store 820 are executed by a write controller circuit 815 responsive to output from Extended Ephemeris block 810 to apply a pointer position in parameter store 820 corresponding the word position of the applicable estimated parameter in a GPS frame. Each stored estimated parameter Pest in parameter store 820 is made thereby readable by a read circuit such as selector circuit 830 according to its word position (1 to 50) in a GPS frame as shown in FIG. 3C and described in detail at word-level elsewhere herein in connection with FIG. 3C. Estimated parameters Pest in the range of time uncertainty $\tau$ around the current receiver time are delivered via selector circuit 830 to a comparison circuit 840. An extraction circuit 835 successively extracts from a currently-received word $W_X$ according to a respective format as if word $W_X$ carried the parameter P at a word position in FIG. 3C that matches the word position for which a given successive Pest from selector circuit 830 is the corresponding estimated parameter. Comparison circuit 840 applies a similarity metric C(P, Pest) to compare each such extracted parameter P from word $W_X$ with its corresponding Pest from selector circuit 830. If the similarity process finds a match, a MATCH output goes active; otherwise, a NO MATCH reporting output goes active such as to go to a next word alignment or a next word.

An Index generator 850 supplies selection controls, representing the word position in the appropriate subset of the word range 1 to 50, to the selector circuit 830 and extraction circuit 835. If and when a match output from comparison block 840 goes active at a register 860, the current word position index from Index generator 850 is latched into the register 860. At this point, register 860 holds a value that represents and establishes the thereby-determined word position X of the current word $W_X$. Word position X is coupled from register 860 to a Time Conversion block 870. Time Conversion block 870 effectuates the operations depicted in step 270 of FIG. 4 and/or in FIG. 5 and registers accurate Satellite Time $T_S$ corresponding to the current timing edge.

Control for selector circuit 830 begins with Timer circuit 880, which maintains an approximate receiver local $t_R$ and approximate satellite time $t_S$ by counting in response to a local clock generator 885 starting from a value $t_{R\,a}$ (init.) initially supplied to it or updated occasionally by accurate satellite time $T_S$ from Time Conversion block 870. Local clock generator 885 is a high frequency clock, e.g. about 10 MHz or more, for high-resolution timekeeping of the approximate times $t_R$ and $t_S$, see also clock 3762 of FIG. 16.

Timer circuit 880 has a time counter. The timing edge in FIG. 12 latches into an output register the particular counter value at the instant of the timing edge representing each approximate time $t_R$ and $t_S$. Also, as a consequence, the operations of the blocks in FIG. 12 derive and deliver from block 870 a value of accurate satellite time $T_S$ that is keyed to the timing edge. The local time $t_R$ and accurate satellite time $T_S$ thus keyed in FIG. 12 are output to, and applied as knowns $t_{RS}$ and $T_S$ in navigation Equations (1) by, a microprocessor such as 2370 of FIG. 15.

Associated with timer circuit 880 is a register, circuit or mechanism to maintain a value of the time uncertainty $\tau$ computed or established as taught herein. Approximate satellite time $t_S$ and time uncertainty $\tau$ are input to a controller 890 and used to update pointers or other controls for the parameter store 820 and Index generator 850. The operations of controller 890 are represented by a conceptual word position template 892 in FIG. 12 and pointers at either end of a range of indices bounded by time uncertainty $\tau$ and having average index corresponding to approximate time $t_S$. Index generator 850 is responsive to controller 890 to operate the selector 830 to deliver a set of the estimated parameters Pest for comparison with current word $W_X$ by block 840.

Figure 12A:
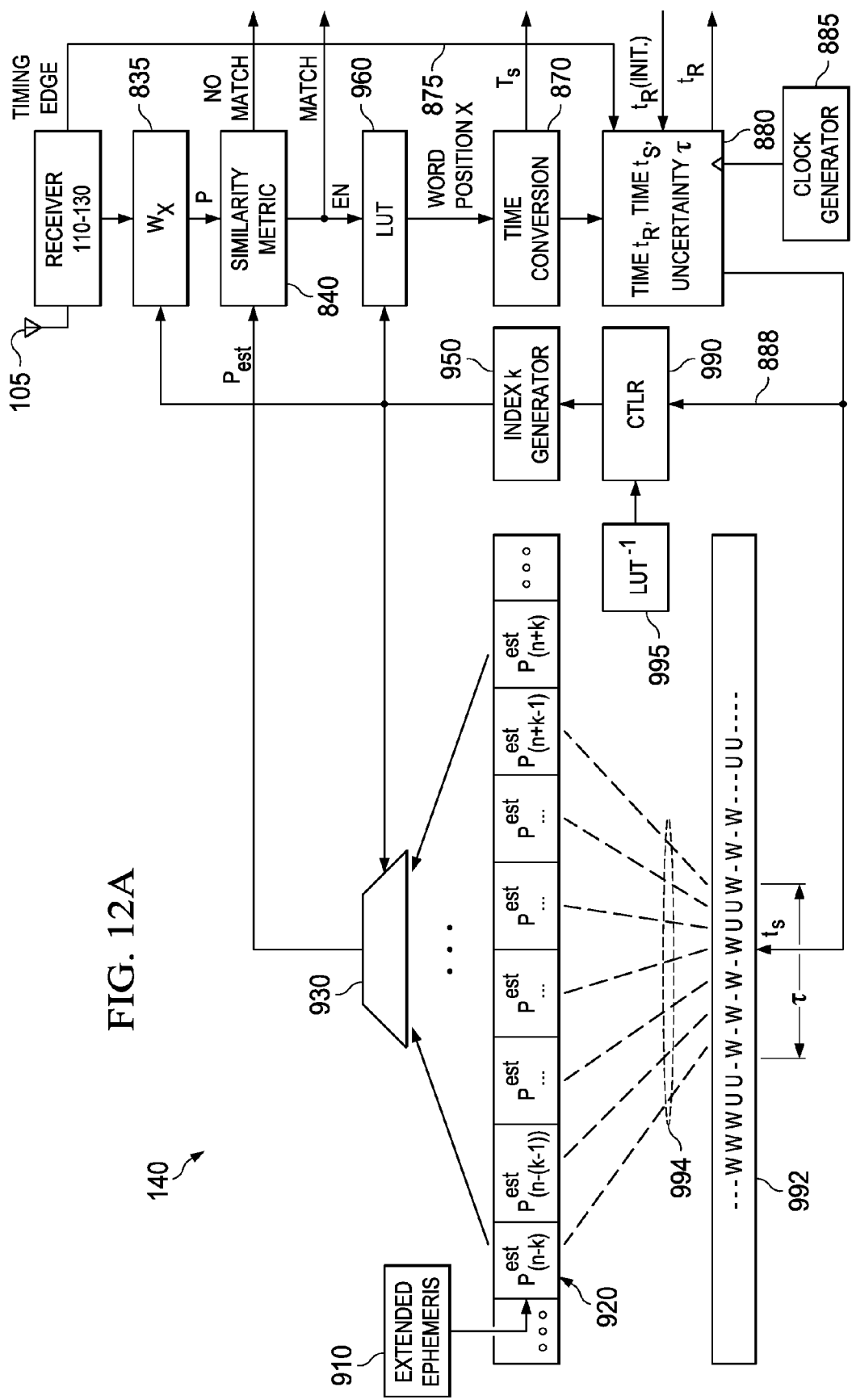
FIG. 12A is a block diagram of another inventive structure and process for Satellite Time determination.

In FIG. 12A, another structure and process for Satellite Time determination has blocks with some numerals same as in FIG. 12. The block descriptions are the same for those correspondingly numbered blocks and need not be repeated. Extended ephemeris block 910 outputs parameters $P_{est}(n-k)$, $P_{est}(n-(k-1))\ldots P_{est}(n), P_{est}(n+1), P_{est}(n+k)$. The parameters (e.g., 25 of them) are organized in a parameter store 920 in parameter order of TABLE 1 (column 1) and without the zeros or unused positions (--) in FIG. 12 parameter store 820. An Index generator 950 operates a selector circuit 930 that delivers each estimated parameter Pest to comparison block 840 from the appropriate particular set of parameters in parameter store 920. Index generator 950 also accesses a lookup table LUT 960. LUT 960 is constructed to represent the TABLE 1 mapping of parameter index values to word position values in a GPS frame of FIG. 3C. When a match is signaled by comparison block 840 the output of lookup table LUT 960 is registered and determines the value of word position X. That value for X is supplied to Time conversion 870 which delivers accurate Satellite Time $T_S$.

Control for selector circuit 930 begins with Timer 880 that supplies approximate satellite time $t_S$ and time uncertainty $\tau$ on lines 888 as input to a control circuit 990. Control circuit 990 has an associated lookup table $LUT^{-1}$ 995 constructed to represent the reverse of TABLE 1 so as to map word position values (col. 2) in a GPS frame to parameter index values (col. 1 of TABLE 1). The operations of controller 990 are represented by a conceptual word position template 992 in FIG. 12A and pointers at either end of a range of word position indices X bounded by time uncertainty $\tau$ and having average index corresponding to Time T. That range is converted (as conceptually represented by dotted lines 994) by control circuit 990 and lookup table $LUT^{-1}$ 995 into a range of parameter index values. Index generator 950 is responsive to controller 990 to operate the selector 930 to deliver the parameters P in that range of indices for comparison with current word $W_X$ by block 840. In this way, LUT 960 and $LUT^{-1}$ 995 act as an example of associative memory and support an associative process in either one direction of access or the reverse. Some circuits provide one associative structure to perform the operations represented separately by LUT 960 and $LUT^{-1}$ 995. Numerous alternatives and optimizations may be implemented to provide various embodiments of structure and process.

Some other GNSS systems using space satellites for navigation besides GPS are the European Galileo system, the Russian Glonass system, and the projected Chinese Sinow system. Some embodiments are used with systems that include fixed sources of positioning information, such as theodolites. The embodiments already described herein and further embodiments are adapted based on the teachings herein to handle information from these systems and thereby estimate satellite time quickly.

Various embodiments estimate similarity or matching of the parameters from the broadcast ephemeris to the predicted parameters available to the receiver 100. Testing and detection are readily performed by sending the receiver simulated satellite signals from a GPS simulator or other GNSS simulator connected to the receiver, wherein the location or the value of the broadcast ephemeris or other parameters is altered relative to the GNSS standard. Observation of (a) Time to First Fix and (b) the satellite time output with and without the altered signals shows transitions or alterations in the time and position determinations of the receiver which would not otherwise occur if the receiver 100 were not matching the parameters from the simulated or altered parameters to the predicted parameters based on the GNSS standard. Since the receiver does not generate estimated parameters altered in the way used in the simulated satellite signals, the receiver instead responds to those simulated signals by generating altered satellite time and positions that are predictable to the tester.

Embodiments of applications and system blocks disclosed herein are suitably implemented in fixed, portable, mobile, automotive, seaborne, and airborne, communications, control, set top box, television (receiver or two-way TV), and other apparatus. Embodiments associated with a personal computer (PC) are suitably implemented in any form factor such as desktop, laptop, palmtop, organizer, mobile phone handset, PDA personal digital assistant, internet appliance, wearable computer, content player, personal area network, or other type and usable with media such as optical disk, flash drive, and other media.

Reception of software intercommunication and updating of information is provided in some embodiments in originating sources and in the receiver of any of FIGS. 13-16. Such intercommunication and updating also suitably occur via any other processor in a mobile or fixed device with receiver 100 itself such as for GPS positioning, cellular modem, WLAN, Bluetooth, a website, or other circuitry such as for wireless or wireline modem processor, digital television and physical layer (PHY).

Figure 13:
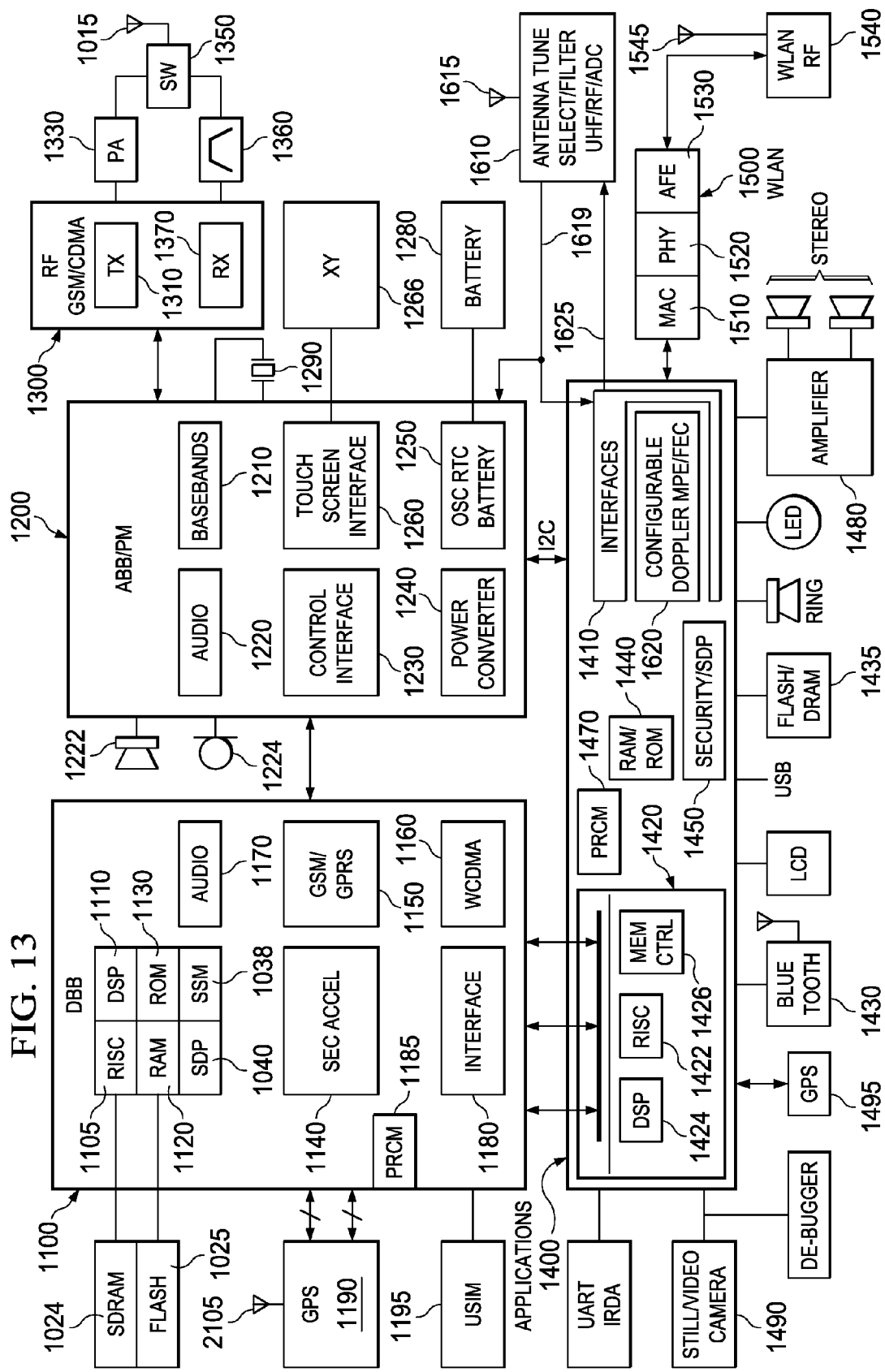
FIG. 13 is a block diagram of circuit blocks of a cellular telephone handset for GPS or assisted GPS for use with the positioning receiver of FIGS. 2, 15, 16 and the other Figures herein.

FIG. 13 illustrates integrated circuit chips including chips 1100, 1200, 1300, 1400, 1500, and GPS 1190 (100, 1495) for use in any one, some or all of the blocks of a communications system. The skilled worker uses and adapts the integrated circuits to the particular parts of the communications system as appropriate to the functions intended. Circuit blocks of FIG. 13 in a cellular telephone handset in the system cooperate, support, or cooperatively utilize GPS or assisted GPS in positioning and location-based applications and are used with or include the positioning receiver 100 of FIGS. 2, 14-16, and the other Figures herein.

The receiver hardware has Scan In and Scan Out paths for serial scan testability and verification with a Debugger of FIG. 13. A scan path is coupled to a JTAG 1149.1 or 1149.7 test access port (TAP) controller circuit or otherwise in the system embodiment that supports such testability, and the TAP controller is coupled to the Debugger at test time. Other scannable blocks in FIG. 2 and FIGS. 12-16 are also included in the scan chain as desired.

In FIGS. 13-16, some embodiments according to the teachings herein are improved over, and combined with, the power-pulsing technology of incorporated US published patent application 20090168843 U.S. Patent Application "Power-Saving Receiver Circuits, Systems and Processes" Ser. No. 12/244,060, filed Oct. 2, 2008; and incorporated US published patent application 20090054075 Feb. 26, 2009, "Satellite (GPS) Assisted Clock Apparatus, Circuits, Systems and Processes for Cellular Terminals on Asynchronous Networks," of Ser. No. 11/844,006, filed Aug. 3, 2007.

The receiver 2200 includes a radio frequency (RF) circuit 2210, an intermediate frequency (IF) circuit 2220, a baseband circuit 2230, and a processing engine 2250. The processing engine 2250 further includes a Measurement Engine 2260, which acquires and tracks the received signals and measures their pseudorange and signal quality metrics and also demodulates and extracts the navigation data such as ephemeris and satellite time in cooperation with a Position Engine 2270. Position Engine 2270 computes the user position and velocity based on inputs from the Measurement Engine 2260 and ephemeris. The receiver 2200 also has an Ephemeris Prediction module 2265 to store obtained predicted ephemerides and/or Ephemeris Prediction software and may locally compute the predicted ephemerides.

The receiver 2200 includes the RF section 2210 that receives signals from multiple satellites $SV1$-$SV_N$ from antenna 2105. The RF circuit 2210 removes unwanted input frequencies from a signal and amplifies the signal using filters and a low noise amplifier LNA respectively. The IF circuit 2220 performs intermediate frequency IF processing to convert the signal to an IF signal. The IF circuit 2220 converts the signal to an IF using a reference frequency VCO÷A, filters unwanted harmonics and amplifies a resulting IF signal. IF circuit 2220 uses a combination of mixers (X), a local oscillator VCO÷A, an IF filter and IF amplifiers IFA-1 and IFA-2. The IF signal is then down converted to a baseband signal in block 2230. The baseband circuit 2230 processes the baseband signal using a combination of components, for example demodulators, a local oscillator, baseband filters and baseband amplifiers. The processing engine 2250 then performs further processes as described elsewhere herein.

In FIG. 14, GNSS antenna 2105 is coupled to a receiver 2200 having an RF section 2210 that feeds an intermediate frequency (IF) section 2220. Analog to Digital conversion ADC/DAC are provided in IF block 2220. Automatic gain control AGC and conversion to baseband are supported by block 2230. A baseband signal processor BSP 2250 has a Measurement Engine 2260 (FIG. 15) followed by a Position Engine 2270 to provide GPS-based time and position output using the teachings pertaining to the other Figures herein. Clock circuitry supports the various blocks 2210, 2220, etc. Power LDOs 2280 are controlled by a Power-Save Controller 2290 that has power save application APP control inputs and power-save acknowledgement and mode signaling 2295. Further background using parallel numeration is provided in said incorporated patent application Ser No. 12/244,060.

FIG. 15 is read together with FIG. 14. Digital front end 2230 in FIG. 14 has a baseband converter 2335 in FIG. 15 that feeds a Measurement Engine 2260. The Measurement Engine has both a firmware and a hardware portion. Some of the embodiments depicted and described suitably are represented and implemented by providing code that suitably is made to reside in the firmware or software portion of the Measurement Engine 2260. FIG. 15 details the Measurement Engine 2260 which includes a Search section for electronically performing extensive correlations and computations to identify a new SV, and a Tracking section for performing more correlations and computations to keep track of one or more already-identified SVs. Cross correlation mitigation hardware can be provided to additionally support both the Search and Tracking functions. Examples of such hardware are described in U.S. Patent Application "Enhanced Cross Correlation Detection or Mitigation Circuits, Processes, Devices, Receivers and Systems" Ser. No. 12/719,965, filed Mar. 9, 2010, incorporated herein by reference in its entirety.

In FIG. 15, converter 2335 feeds tapped delay lines 2305 that go to a fast correlation engine 2310 having a set of parallel correlators (multiply-add channel filters) 2310 that are equal in number, for instance to the number of milliseconds (e.g., 20) in a coherent summation interval.

In FIGS. 2 and 15, the correlators in block 2310 each operate over a 1 ms characteristic PN sequence of a satellite such as SV1 or SV2 and multiply-add by a locally selected and generated PN sequence from the receiver's stored set of satellite-specific mutually-orthogonal PN sequences to despread a spread-spectrum satellite signal. An hypothesis search engine repeatedly issues a different code lag value c and Doppler f to a PN code-issuing block until the generated PN sequence is properly time-shifted by a respective code lag $c_1$ or $c_2$ relative to the receiver time-base to synchronize with and produce a peak with the characteristic PN sequence received from the corresponding satellite SV1 or SV2, etc. Doppler frequency removal or "wipe-off" by a canceling Doppler-frequency exponential $\exp(-j2\pi f)$ for the SV1 to be identified is provided in any appropriate way in FIG. 15 for the hypothesis search as well. In FIG. 15, the Search section repeatedly operates the correlators 2310 and Channel Processors 2320 with parallelism where possible to hypothesis-search for a given satellite such as SV1. A corresponding number of Channel Processors 2320 with memories 2325 are provided to process the output of the correlators 2310, and identify a peak for a given satellite when a locally generated PN sequence is successfully de-spreaded by a correlator, and obtain GPS information from acquired satellites. Tracking DLL channels 2330 are also fed by base-band converter 2335 and tracks each of already-acquired satellite using a DLL Post-Processor 2340. A hardware counters block 2350 counts chips/cycles and performs counter support functions for the other circuitry.

In FIG. 15, a structure and process for Satellite Time determination are situated in some embodiments as a hardware submodule of FIG. 12 or 12A in a block 2380 of FIG. 15. Block 2380 with such submodule is coupled along with a clock block 2375 to a system bus 2360 and accessible by a microprocessor 2370, or is implemented in firmware or software instead for execution by such microprocessor. A 32 kHz real time clock RTC 2385 is included and participates in local timekeeping such as for the process using RTC discussed hereinbelow with FIG. 16.

Figure 16:
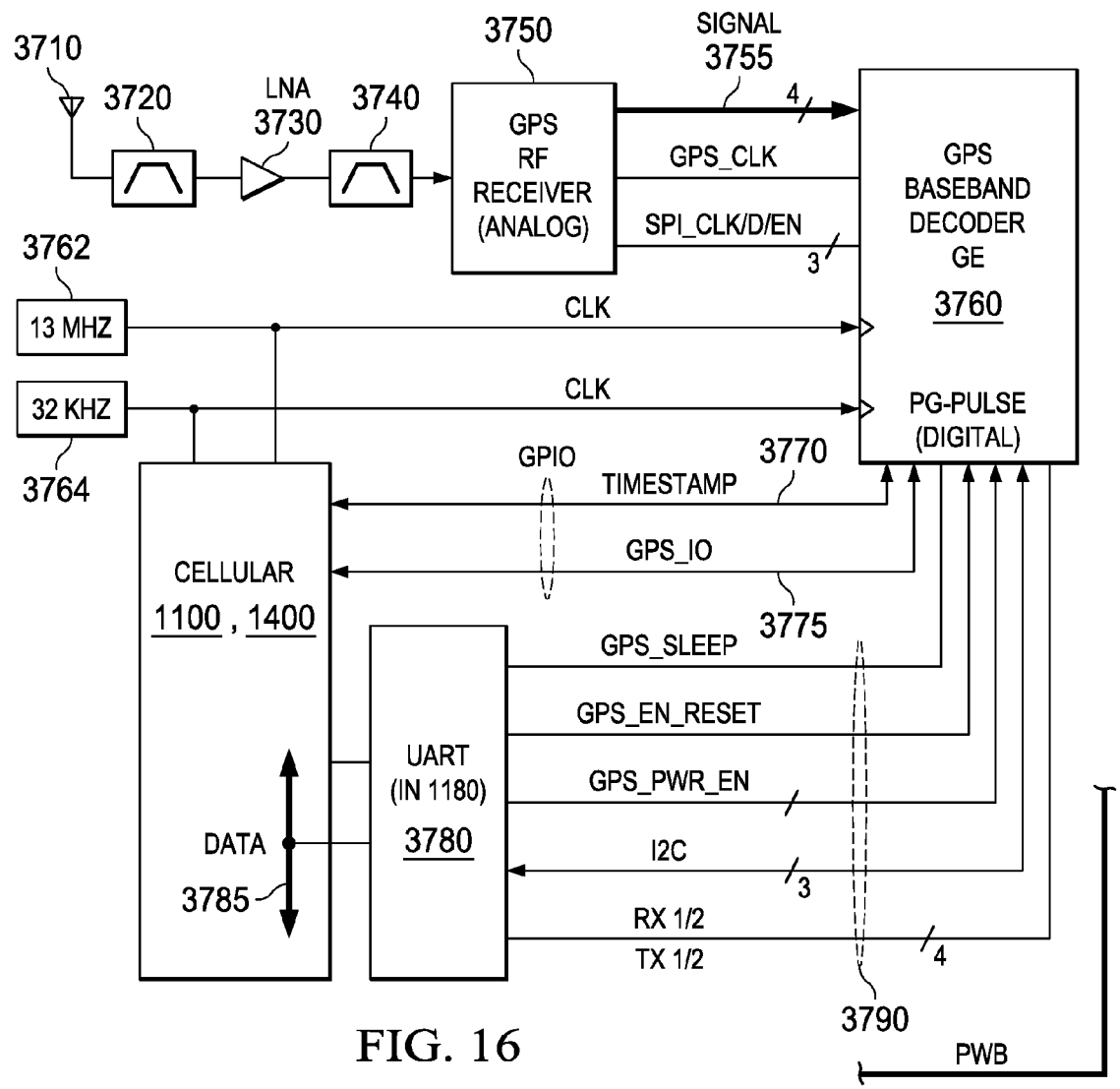
FIG. 16 is a block diagram of an inventive system including a satellite positioning engine such as a GPS receiver according to any of the inventive processes and circuits herein and further coupled with a processor integrated circuit for cellular communications and for timekeeping when the GPS receiver is asleep.

Turning to FIG. 16, some embodiments of the already-described Figures herein not only determine accurate Satellite Time $T_S$ but also include power saving mode control above 0.1 Hertz in FIG. 14 with power save operations that also occur substantially below 0.1 Hertz such as supported in FIG. 16 (sleep/wake either periodically or on-demand or otherwise non-deterministically) wherein the receiver is asleep for substantial periods of time and time keeping of local receiver time $t_R$ is performed by a cellular engine at least when the receiver is asleep. Then the cellular engine provides approximate local receiver time $t_R$ keyed to a TIMESTAMP strobe as in FIG. 16 (or timing edge of FIG. 12) when the receiver wakes up, so that the receiver then operates with a shorter time to first position fix (TTFF) as taught herein. For some background on the latter subject, see the incorporated published patent application 20090054075, "Satellite (GPS) Assisted Clock Apparatus, Circuits, Systems and Processes for Cellular Terminals on Asynchronous Networks," Ser. No. 11/844,006, filed Aug. 3, 2007.

In FIG. 16, GPS unit 1190 (1495) of FIG. 13 has an antenna 3710 (2105) for reception of satellite positioning signals. Antenna 3710 is coupled to a bandpass filter 3720 followed by a low noise receiver amplifier LNA 3730 followed by another bandpass filter 3740. A GPS RF section 3750 (2210 of FIG. 14) is provided as an analog or mixed-signal integrated circuit fed from bandpass filter 3740. RF section 3750 in turn supplies signals to a digital GPS baseband decoder 3760 integrated circuit in the GPS receiver, see also FIG. 15. Integrated circuit 3760 includes a power save mode controller as in FIG. 2 like 2290 in FIG. 14. RF section 3750 (2210) supplies signal output lines 3755 to the GPS baseband decoder 3760. Lines for SPI (serial port interface) clock, data, and enable and a further GPS clock line connect RF 3750 and GPS baseband decoder 3760 and couple power management controls from decoder 3760 power save mode controller to RF section 3750 as shown in FIGS. 2 and 14.

GPS baseband decoder 3760 utilizes an accumulate-and-dump AD satellite positioning process of FIG. 15 for supplying GPS information or other satellite positioning information. GPS baseband decoder 3760 is coupled to integrated circuit 1100 (or 1400) of FIG. 13 by lines TIMESTAMP 3770 and GPS_IO 3775. Processor integrated circuit 1100 (or 1400) is used for approximate local timekeeping when the GPS receiver 100 is asleep. The timekeeping is updated from the cellular network by a processor in hardware, or in hardware combined with software or in hardware combined with firmware associated with, and/or integrated into, a communications modem including digital baseband DBB 1100, analog baseband ABB 1200 and RF transmitter/receiver TX/RX 1300 of FIG. 13. In FIG. 16, cellular communications circuitry acts as a cellular engine CE for processing time information derived from the cellular communications network. Ongoing time is maintained by using the local high-speed clock, and supplemented by the RTC (32 kHz real-time clock) 3764 (2385) when the high-speed clock is asleep. Processor 1100 (or 1400) is coupled by a UART 3780 in interfaces 1180 of FIG. 13 to control the integrated circuit having GPS baseband decoder 3760. When GPS is powered on and a timing edge is obtained by the GPS receiver to convey TIMESTAMP, then cellular time at the TIMESTAMP timing edge is returned on GPS_IO from the cellular engine to the GPS decoder 3760 for use as approximate local receiver time $t_R$.

In FIG. 16, a first clock 3762 has a frequency illustratively between 10 and 100 MHz or higher, that during reception is continually (or selectively) locked to or synchronized with clocks present in cellular base stations or other network base stations. Between receptions the first clock (e.g., 13 MHz) is switched off or is left to run depending on the operating mode. A second clock 3764 has a lower frequency, e.g., below 1 MHz. such as at 32 KHz). The second clock 3764 is on and operative between receptions when the first clock 3762 is turned off for power saving. Relatively-accurate, but nevertheless-approximate, subsequent global time for use as approximate local receiver time $t_R$ herein is determined and maintained as a sum of products and ratios of time intervals and counter values representing numbers of clock beats according to Equation (48):

$$t_R = t_0 + [n_1 + (n_2/RCP0) + n_3(X_{RTC}/RCP0)]T_{cellular} \qquad (48)$$

where
$t_0$ is a first GPS-based local time corresponding to a TIMESTAMP strobe sent from cellular engine to GPS engine. This strobe is keyed to a time of arrival signal from a cellular network $t_R$ is the relatively-accurate subsequent time from time projection, for use as approximate local receiver time $t_R$ herein at a timing edge TIMESTAMP sent from GPS receiver to cellular engine when GPS receiver wakes up. Cellular engine responds and sends its time value $t_R$ to the GPS receiver.

$T_{cellular}$ is the time interval between time of arrival signals from a cellular network, RCP0 is number of first clock 3762 counts in the time interval $T_{cellular}$, $X_{RTC}$ is number of first clock 3762 counts between cycles of second clock 3764, $n_1$ is a number of received instances of the time interval $T_{cellular}$, $n_2$ is the number of first clock counts distinct from periods counted with $n_1$, and $n_3$ is the number of second clock 3764 periods distinct from periods counted with $n_1$ and $n_2$.

A variety of embodiments are provided for spread-spectrum communications systems at base stations, gateways, handsets, and any applicable devices for mobile, portable, and/or fixed use. Such systems suitably support any one or more of global positioning system GPS and other location-determining or positioning systems, cellular voice and data, code division multiple access CDMA, wireless local area network WLAN, industrial, scientific, and medical communications, cordless telephones, and any other spread-spectrum communications systems. A somewhat overlapping category of embodiments are provided for receivers employing coherent signal accumulation in spread-spectrum or other types of communications systems.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors, and other nanoelectronics and other structures. Photonic integrated circuit blocks, components, and interconnects are also suitably applied in various embodiments.

Various embodiments of integrated circuit systems and processes as described herein are manufactured according to a suitable process of manufacturing that prepares RTL (register transfer language) and netlist and/or other integrated design information for a desired embodiment such as one including, or respectively including, one or more integrated circuits for an accumulate and dump receiver and/or spread spectrum receiver with accurate and fast Satellite Time determination as described herein. Such embodiment is verified in simulation electronically on the RTL and netlist. Place and route operations are performed to establish the physical layout of each integrated circuit, and the layout is verified. In this way, the contents and timing of the memory, of the receivers and processor hardware and of the GPS decoder are verified. The operations are verified pertaining to the similarity comparison and other operations of the communications unit and the GPS unit as described. Verification evaluation determines whether the verification results are currently satisfactory and the verified design of integrated circuit chips and such other structures as form an embodiment herein is fabricated in a wafer fab and packaged to produce resulting manufactured integrated circuit(s) First-silicon and production samples are verified such as by using scan chain and tracing methodology on the hardware until the chips are satisfactory. A printed wiring board (PWB) of a system embodiment uses the integrated circuit(s). Software and parameters as described in the various Figures herein are analogously coded and verified and loaded into flash or other nonvolatile memory for the system and verified. The system is powered up, and hot fix operations are verified on satellite simulations and with actual satellite reception with various signal powers and urban canyon scenarios.

Aspects (see explanatory notes at end of this section)

12A. The process claimed in claim 12 wherein the satellite transmission parameters include ephemeris parameters and the predicted parameters include predicted ephemeris parameters.

12B. The process claimed in claim 12 further comprising performing the searching and identifying across satellite transmission parameters from two or more visible satellites.

12C. The process claimed in claim 12 further comprising imposing a sleep and wake process onto the extracting, searching and using.

19A. The electronic circuit claimed in claim 19 wherein said processor is operable to execute the parameter matching software to perform a similarity comparison of plural estimated parameters with at least one received parameter from the one or more satellite signals.

19A1. The electronic circuit claimed in claim 19A wherein the similarity comparison includes a count of bits.

19B. The electronic circuit claimed in claim 19 wherein the determination of a match includes a cumulative probability value applicable to a comparison of an estimated parameter and a received parameter.

19C. The electronic circuit claimed in claim 19 wherein the parameter matching software includes a conditional probability value applicable to a comparison of an estimated parameter and a received parameter.

19D. The electronic circuit claimed in claim 19 wherein the parameter matching software includes a conditional probability value that a particular estimated parameter is the correct match given that a comparison of that estimated parameter with a received parameter matches to the extent of a particular number of most significant bits.

19E. The electronic circuit claimed in claim 19 wherein the parameter matching software includes a pre-stored function representing conditional probability that a comparison of an estimated parameter given a received value of that same parameter matches to a particular number of most significant bits.

19F. The electronic circuit claimed in claim 19 wherein the parameter matching software includes a combined function of counts of matching bits of an estimated parameter with received parameters that correspond to each other from plural satellite signals.

19G. The electronic circuit claimed in claim 19 wherein the parameter matching software includes a test of whether a similarity metric exceeds a threshold value.

19H. The electronic circuit claimed in claim 19 wherein the parameter matching software includes a test of whether a largest similarity value of an estimated parameter compared to a received parameter exceeds a threshold value and a separation between that largest similarity value to the next largest similarity computed for another estimated parameter exceeds another threshold value.

19I. The electronic circuit claimed in claim 19 wherein the parameter matching software includes at least two different threshold values respective to comparison of two different respective estimated parameters with the received parameter.

19J. The electronic circuit claimed in claim 19 wherein the parameter matching software includes at least one similarity threshold value that depends on the age of an estimated parameter.

19K. The electronic circuit claimed in claim 19 wherein the parameter matching software is further accessible by said processor around a subsequent time to generate a satellite time bit-pattern representing that subsequent time and to bit-wise correlate that satellite time bit-pattern with a received noisy bit sequence somewhere including that satellite time bit-pattern and thereby find the position of the bit-pattern in that bit sequence.

19K1. The electronic circuit claimed in claim 19K wherein said processor is operable to correct a local time to more accurately correspond to the thus-found position of the bit-pattern in that bit sequence.

19K2. The electronic circuit claimed in claim 19K wherein the bit-wise correlation is advanced to commence sooner than the receiver's estimate of the subsequent arrival time of the said satellite time bit-pattern, whereby to more likely find the satellite time bit-pattern in the received noisy bit sequence.

24A. The power management process claimed in claim 24 further comprising imposing a duty cycle of activity and inactivity onto the supplying and operating, whereby power is saved.

24B. The power management process claimed in claim 24 further comprising selectively transitioning instead to a different application program after the position fix, whereby applications performance is enhanced.

24C. The power management process claimed in claim 24 further comprising starting reception around a later time with a satellite time bit-pattern representing that later time, and bit-wise correlating that satellite time bit-pattern with a received noisy bit sequence somewhere including that satellite time bit-pattern to find the position of the bit-pattern in that bit sequence.

24C1. The power management process claimed in claim 24 further comprising correcting a local time to more accurately correspond to the thus-found position of the bit-pattern in that bit sequence.

24C1A. The power management process claimed in claim 24C1 further comprising returning to a lower-power mode upon correcting the local time and until a subsequent still-later time.

26A. The process claimed in claim 26 wherein the electronic computing of the word position includes:

establishing low and high range-end word positions whereby to specify a range of an estimated parameter set, and electronically computing word positions modulo relative to beginning of frame for the low range-end position and high range-end position, wherein due to the modulo operation, sometimes the low range-end position may produce a higher position value in the frame than the high range-end position modulo value;

computing a word position $k_F$ in a frame for the received word based on a highest similarity metric electronically evaluated between estimated parameters in the estimated parameter set and a parameter extracted from the received word, thereby signifying that the $k_F$-th word in a frame is ascertained as the received word;

electronically computing an expected frame number $n'_F$ for the frame of the received word based on the approximate time, wherein the expected frame number $n'_F$ may be one frame away from the actual frame number $n_F$ of the frame in which the received word is actually situated;

electronically providing the actual frame number $n_F$ equal to the expected frame number $n'_F$ unless at least one inequality involving the range-end positions and the computed word position is satisfied whereupon the actual frame position $n_F$ is established by adjusting the expected frame position $n'_F$ up or down by one.

27A. The process claimed in claim 27 wherein the approximate time is maintained substantially as a receiver local time lagged back by an estimated propagation time of the at least one satellite signal.

28A. The process claimed in claim 28 wherein the alternative electronic process includes a process to infer the satellite time from at least one received ephemeris datum of the satellite signal.

29A. The process claimed in claim 29 wherein the electronically providing of the more-accurate satellite time includes the true grand total word count multiplied times the word duration.

29B. The process claimed in claim 29 further comprising electronically computing an uncertainty in the grand total word count as a second ratio of an estimated time uncertainty divided by the word duration, the second ratio rounded to an integer, and defining the set of the estimated parameters for the comparisons using that uncertainty in the grand total word count.

30A. The process claimed in claim 30 wherein the approximate time is maintained substantially as a local time lagged back by an estimated propagation time of the at least one satellite signal.

30B. The process claimed in claim 30 further comprising providing an estimated time uncertainty pertaining to the approximate time and using that estimated time uncertainty to restrict the number of estimated parameters used in the similarity metric evaluation.

30C. The process claimed in claim 30 wherein the word position of the received word in a frame is obtained from an index of the predicted words by accessing a look up table that maps the index of a matched predicted word to the word position in a frame.

31A. The process claimed in claim 31 further comprising demodulating the at least one satellite signal to obtain incoming bits in the stream of words, and when a predetermined number of the incoming bits have been received that are sufficient to perform the parity checking, then commencing the hypothesizing of a word alignment possibility.

31B. The process claimed in claim 31A further comprising hypothesizing another such different word alignment possibility when an additional incoming bit is received.

31C. The process claimed in claim 31 wherein said parity-checking includes an electronic computation involving a number of bits of an hypothesized word along with a smaller number of bits next-previous to the hypothesized word.

31D. The process claimed in claim 31 further comprising verifying the word alignment possibility that satisfies the parity-checking for a first satellite signal by additionally parity-checking that word alignment possibility on at least a second satellite signal, whereby confidence about the word alignment possibility is increased.

31E. The process claimed in claim 31 further comprising also parity-checking using at least one word successive to the hypothesized word to determine the word alignment, provided parity-checking involving the hypothesized word has already been satisfied.

31F. The process claimed in claim 31 further comprising also parity-checking at least one further hypothesized alignment on a set of bits subsequent to the hypothesized alignment to cross-check the word alignment.

31G. The process claimed in claim 31 further comprising computing a word position as a function of a local time and obtaining a predicted parameter corresponding to that word position, and given that word position extracting a predetermined number of bits from the word possibility with an hypothesized word alignment, and comparison-checking whether the extracted bits match corresponding bits of the predicted parameter as well as said parity-checking being satisfied before determining the word alignment as being the hypothesized word alignment.

31G1. The process claimed in claim 31G wherein the parity-checking includes toggling a bit in an hypothesized word alignment that matches but fails to satisfy parity, and if toggling the bit satisfies parity then determining the word alignment as the hypothesized word alignment.

31H. The process claimed in claim 31 wherein the comparison-checking includes toggling a bit that fails to exactly match, before the parity-checking of an hypothesized word alignment.

33A. The process claimed in claim 33 further comprising electronically supplying a value representing uncertainty in the time difference and disqualifying the association if the uncertainty in the time difference is more than a predetermined fraction of the duration of a bit.

33B. The process claimed in claim 33 wherein the association between the bit edges from different satellites is established prior to the hypothesizing of word alignment possibilities, for word alignment across multiple satellites.

34A. The process claimed in claim 34 wherein the electronic providing includes electronically computing an expected frame number $n'_F$ for frame of the received word based on the approximate time wherein the expected frame number $n'_F$ may be one frame away from the actual frame number $n_F$ of the frame in which received word $W_X$ is actually situated;

electronically computing word positions modulo relative to beginning of frame for the low range-end position and high range-end position, wherein due to the modulo operation, sometimes the low range-end position may produce a higher position value in the frame than the high range-end position modulo value;

computing, as a function of the expected frame number $n'_F$, an expected satellite number $S'_A$ of the particular actual satellite $S_A$ to which almanac pertains; and electronically providing the actual satellite number $S_A$ equal to the expected satellite number $S'_A$ unless at least one inequality involving the range-end positions and a given almanac word position in the range is satisfied whereupon the actual satellite number $S_A$ is established by adjusting the expected satellite number $S'_A$ up or down by one.

34A1. The process claimed in claim 34A further comprising determining if an estimated almanac parameter is to be included in the estimated parameter set by whether a given word position in the range has a word position in the frame where GPS almanac parameters are located.

35A. The process claimed in claim 35 for use with a satellite system having a total number of satellites, wherein the function for said computing includes the frame number $n_F$, modulo the total number of satellites, for computing the satellite number of the particular actual satellite $S_A$.

36A. The process claimed in claim 36 wherein the signal periodically includes a satellite time word, and the process further comprises recovering from an error in determining the unknown word position using the satellite time word subsequently.

36B. The process claimed in claim 36 further comprising computing a position solution and a metric of quality of the position solution, and if the metric of quality thus computed departs from an acceptable level, then performing the word-position determining for the subsequent received word as aforesaid.

36C. The process claimed in claim 36 further comprising evaluating such inconsistency of word position determinations substantially by comparing their word position difference for substantial equality in duration with a time-of-arrival difference between the received word and the subsequent received word.

36D. The process claimed in claim 36 further comprising hypothesizing that the received word and the subsequent received word respectively correspond to a pair of estimated parameters having adjacent positions and applying the similarity metric as a function combining numbers of matching bits between the pair of estimated parameters and the received word and subsequent received word.

39A. The mobile satellite receiver device claimed in claim 39 wherein said data processor is operable to execute ephemeris prediction software and compare estimated parameters derived therefrom with the received ephemeris data to infer the satellite time.

Notes: Aspects are description paragraphs that might be offered as claims in patent prosecution. The above dependently-written Aspects have leading digits and may have internal dependency designations to indicate the claims or aspects to which they pertain. The leading digits and alphanumerics indicate the position in the ordering of claims at which they might be situated if offered as claims in prosecution.

A few preferred embodiments have been described in detail hereinabove. It is to be understood that the scope of the invention comprehends embodiments different from those described, as well as described embodiments, yet within the inventive scope. Specific values pertaining to GPS (e.g., 30 second frames, 0.6 second words etc.) have been used by way of example and not of limitation, and the embodiments are applicable to GNSS systems in general. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams and block diagrams herein are representative of flows and/or structures for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A word-position error recovery process for a GNSS receiver wherein a signal stream having a sequence of words, the process comprising:
    initially determining an unknown word-position of a word from the sequence of words received from the signal stream;
    performing the word-position determining for at least one subsequent word of the sequence of words received from the signal stream to determine a subsequent word position, and if inconsistent word positions result then adopting a more-probable word position; and
    using the determination of the unknown word-position to compute a GNSS position solution and a metric of quality of the GNSS position solution, and if the metric of quality thus computed departs from an acceptable level, then performing the word-position determining for the subsequent word received from the signal stream.

2. The process claimed in claim 1 wherein the initially determining of the unknown word-position includes comparing estimated parameters with the word received from the signal stream, and the process further comprises a test to determine whether two of the estimated parameters are both similar to the word received from the signal stream and in such case comparing for the subsequent word received from the signal stream.

3. The process claimed in claim 1 further comprising determining the more-probable word position by determining the word position of the estimated parameter with a maximum similarity metric value by comparison with its corresponding word, and with the maximum thus taken across different words respectively predicted by their different estimated parameters.

4. The process claimed in claim 1 wherein the signal stream periodically includes a satellite time word, and the process further comprises recovering from an error in determining the unknown word position using the satellite time word subsequently.

5. The process claimed in claim 1 further comprising evaluating such inconsistency of word position determinations substantially by comparing their word position difference for substantial equality in duration with a time-of-arrival difference between the word received from the signal stream and the subsequent word received from the signal stream.

6. The process claimed in claim 1 further comprising hypothesizing that the word received from the signal stream and the subsequent word received from the signal stream respectively correspond to a pair of estimated parameters having adjacent positions and applying the similarity metric as a function combining numbers of matching bits between the pair of estimated parameters and the word and subsequent word.

\* \* \* \* \*